(12) United States Patent
Sakai et al.

(10) Patent No.: US 7,787,391 B2
(45) Date of Patent: Aug. 31, 2010

(54) COMMUNICATION DEVICE, COMMUNICATION SYSTEM, COMMUNICATION METHOD, COMMUNICATION PROGRAM, AND COMMUNICATION CIRCUIT

(75) Inventors: Koji Sakai, Osaka (JP); Hitoshi Naoe, Nara (JP); Fumihiro Fukae, Sakurai (JP); Shohei Osawa, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 894 days.

(21) Appl. No.: 11/628,040

(22) PCT Filed: Jan. 25, 2006

(86) PCT No.: PCT/JP2006/301106

§ 371 (c)(1),
(2), (4) Date: Nov. 30, 2006

(87) PCT Pub. No.: WO2006/080330

PCT Pub. Date: Aug. 3, 2006

(65) Prior Publication Data

US 2008/0291941 A1    Nov. 27, 2008

(30) Foreign Application Priority Data

| Jan. 28, 2005 | (JP) | ............................. 2005-022209 |
| Jan. 31, 2005 | (JP) | ............................. 2005-023901 |
| Jan. 31, 2005 | (JP) | ............................. 2005-023929 |
| Apr. 13, 2005 | (JP) | ............................. 2005-116096 |
| May 25, 2005 | (JP) | ............................. 2005-152910 |
| Jun. 30, 2005 | (JP) | ............................. 2005-192903 |
| Aug. 5, 2005 | (WO) | ................. PCT/JP2005/014446 |
| Sep. 16, 2005 | (JP) | ............................. 2005-271234 |

(51) Int. Cl.
*H04B 17/00* (2006.01)

(52) U.S. Cl. ..................... 370/252; 370/310; 370/469; 714/748
(58) Field of Classification Search .................... None
See application file for complete search history.

(56) References Cited

U.S. PATENT DOCUMENTS

| 4,957,348 A | 9/1990 | May |
| 5,448,561 A | 9/1995 | Kaiser et al. |
| 5,450,412 A | 9/1995 | Takebayashi et al. |
| 5,509,121 A | 4/1996 | Nakata et al. |
| 5,515,508 A | 5/1996 | Pettus et al. |
| 5,557,634 A | 9/1996 | Balasubramanian et al. |
| 5,563,943 A | 10/1996 | Takebayashi et al. |

(Continued)

FOREIGN PATENT DOCUMENTS

CN    1167380 A    12/1997

(Continued)

OTHER PUBLICATIONS

Standardization Proposal of High Efficiency Protocols by using Infrared Data Association (IEICE Communications Society Conference 2005; Technical Reports published on Sep. 7, 2005).

(Continued)

*Primary Examiner*—Chi H. Pham
*Assistant Examiner*—Shick Hom
(74) *Attorney, Agent, or Firm*—Birch, Stewart, Kolasch & Birch, LLP

(57) ABSTRACT

In a client device (1) including OBject EXchange protocol (OBEX), a lower layer processing section (13) below an OBEX processing section (12) generates a pseudo response command for a request command, and notifies the pseudo response command to the OBEX layer processing section (12). This makes it possible for the client device (1) to communicate, via object exchange, with a server device having no transmitting function.

17 Claims, 55 Drawing Sheets

U.S. PATENT DOCUMENTS

| | | |
|---|---|---|
| 5,585,952 A | 12/1996 | Imai et al. |
| 5,638,373 A | 6/1997 | Takebayashi et al. |
| 5,706,110 A | 1/1998 | Nykanen |
| 5,764,643 A | 6/1998 | Takebayashi et al. |
| 6,006,294 A | 12/1999 | Kurihara |
| 6,034,962 A | 3/2000 | Ohno et al. |
| 6,154,298 A | 11/2000 | Tamagawa |
| 6,178,181 B1* | 1/2001 | Glitho ........................ 370/467 |
| 6,188,431 B1 | 2/2001 | Oie |
| 6,256,296 B1 | 7/2001 | Ruziak et al. |
| 6,297,802 B1 | 10/2001 | Fujioka |
| 6,411,813 B1 | 6/2002 | Sano |
| 6,629,373 B1 | 10/2003 | Donaldson |
| 6,735,245 B1 | 5/2004 | Palm |
| 6,754,451 B1 | 6/2004 | Nakamura |
| 6,839,564 B2* | 1/2005 | Sutinen et al. .............. 455/502 |
| 6,842,433 B2 | 1/2005 | West et al. |
| 6,865,687 B1 | 3/2005 | Ichimi |
| 6,907,013 B1 | 6/2005 | Ruziak |
| 6,944,483 B1 | 9/2005 | Motohashi |
| 7,069,059 B2 | 6/2006 | Osawa |
| 7,363,534 B1 | 4/2008 | Krishnamurthy et al. |
| 7,366,532 B2 | 4/2008 | Khawand et al. |
| 7,403,543 B2 | 7/2008 | Lee et al. |
| 7,411,974 B2 | 8/2008 | Attar et al. |
| 2001/0007137 A1 | 7/2001 | Suumaki et al. |
| 2001/0032326 A1 | 10/2001 | Haneda |
| 2001/0044914 A1 | 11/2001 | Nakano et al. |
| 2002/0065065 A1 | 5/2002 | Lunsford et al. |
| 2002/0196782 A1 | 12/2002 | Furukawa et al. |
| 2002/0196812 A1 | 12/2002 | Yamaguchi et al. |
| 2003/0107651 A1 | 6/2003 | Chen et al. |
| 2003/0114107 A1 | 6/2003 | Aoyagi |
| 2003/0169744 A1 | 9/2003 | Elzur |
| 2004/0042487 A1 | 3/2004 | Ossman |
| 2004/0054796 A1 | 3/2004 | Kikuchi et al. |
| 2004/0080537 A1 | 4/2004 | Adler |
| 2004/0081436 A1 | 4/2004 | Tada et al. |
| 2004/0111535 A1 | 6/2004 | Boucher et al. |
| 2004/0170134 A1 | 9/2004 | Furuyama et al. |
| 2004/0186928 A1 | 9/2004 | Fukunaga et al. |
| 2004/0218209 A1 | 11/2004 | Hamaguchi et al. |
| 2004/0228332 A1* | 11/2004 | Seguin et al. ............... 370/352 |
| 2005/0014468 A1 | 1/2005 | Salokannel et al. |
| 2005/0025188 A1 | 2/2005 | Numakura et al. |
| 2005/0071733 A1 | 3/2005 | Fukae et al. |
| 2005/0083885 A1 | 4/2005 | Ikeda et al. |
| 2005/0091412 A1 | 4/2005 | Pinkerton et al. |
| 2005/0097191 A1 | 5/2005 | Yamaki et al. |
| 2005/0138226 A1 | 6/2005 | Tateyama et al. |
| 2005/0254456 A1 | 11/2005 | Sakai et al. |
| 2005/0271022 A1 | 12/2005 | Osawa et al. |
| 2006/0250973 A1 | 11/2006 | Trott |
| 2006/0291502 A1 | 12/2006 | Kalofonos |
| 2007/0064733 A1 | 3/2007 | Osawa et al. |
| 2008/0008165 A1 | 1/2008 | Ikeda et al. |
| 2008/0126554 A1 | 5/2008 | Sakai et al. |
| 2008/0145058 A1 | 6/2008 | Fukae et al. |
| 2008/0189422 A1 | 8/2008 | Naoe et al. |
| 2008/0279560 A1 | 11/2008 | Osawa et al. |
| 2008/0279562 A1 | 11/2008 | Naoe et al. |
| 2008/0291941 A1 | 11/2008 | Sakai et al. |
| 2008/0313518 A1* | 12/2008 | Naoe et al. .................. 714/748 |
| 2009/0190502 A1 | 7/2009 | Mameda et al. ............. 370/255 |

FOREIGN PATENT DOCUMENTS

| | | |
|---|---|---|
| CN | 1394029 A | 1/2003 |
| EP | 0 584 464 A1 | 3/1994 |
| EP | 0 886 410 A2 | 12/1998 |
| EP | 0886410 A2 | 12/1998 |
| EP | 1 780 984 A1 | 5/2007 |
| JP | 58-56200 A | 4/1983 |
| JP | 62-029238 A | 2/1987 |
| JP | 10-98435 A | 4/1989 |
| JP | 1-164140 A | 6/1989 |
| JP | 2-16847 | 1/1990 |
| JP | 02-041050 A | 2/1990 |
| JP | 2-281830 A | 11/1990 |
| JP | 3-70059 A | 3/1991 |
| JP | 03-070059 A | 3/1991 |
| JP | 3-98338 A | 4/1991 |
| JP | 03-098338 A | 4/1991 |
| JP | 3-139935 A | 6/1991 |
| JP | 4-839 A | 1/1992 |
| JP | 4-269031 A | 9/1992 |
| JP | 4-271567 A | 9/1992 |
| JP | 4-291556 A | 10/1992 |
| JP | 5-30150 A | 2/1993 |
| JP | 05-030150 A | 2/1993 |
| JP | 5-175985 A | 7/1993 |
| JP | 05-260124 A | 8/1993 |
| JP | 5-260124 A | 10/1993 |
| JP | 6-70383 A | 3/1994 |
| JP | 06-152687 A | 5/1994 |
| JP | 7-15485 A | 1/1995 |
| JP | 07-15485 A | 1/1995 |
| JP | 07-046292 A | 2/1995 |
| JP | 7-46292 A | 2/1995 |
| JP | 08-191271 A | 7/1996 |
| JP | 8-195785 A | 7/1996 |
| JP | 8314831 | 11/1996 |
| JP | 09-135210 A | 5/1997 |
| JP | 9-154176 A | 6/1997 |
| JP | 9-224069 A | 8/1997 |
| JP | 9-284696 A | 10/1997 |
| JP | 9-312674 A | 12/1997 |
| JP | 10-98435 A | 4/1998 |
| JP | 10-107737 A | 4/1998 |
| JP | 10-126758 A | 5/1998 |
| JP | 10-145452 A | 5/1998 |
| JP | 10-290348 A | 10/1998 |
| JP | 10-308791 A | 11/1998 |
| JP | 11-4306 A | 1/1999 |
| JP | 11-154908 A | 6/1999 |
| JP | 11317724 | 11/1999 |
| JP | 2000-010745 | 1/2000 |
| JP | 2000-31993 A | 1/2000 |
| JP | 2000-32000 A | 1/2000 |
| JP | 2000069403 A | 3/2000 |
| JP | 2000-101605 A | 4/2000 |
| JP | 2000-196622 A | 7/2000 |
| JP | 2000-196654 A | 7/2000 |
| JP | 2000-332688 A | 11/2000 |
| JP | 2000-349782 A | 12/2000 |
| JP | 2001-60912 A | 3/2001 |
| JP | 2001-69297 A | 3/2001 |
| JP | 2001-083948 A | 3/2001 |
| JP | 2001-145164 A | 5/2001 |
| JP | 2001-202281 A | 7/2001 |
| JP | 2001-308955 A | 11/2001 |
| JP | 2002-509378 A | 3/2002 |
| JP | 2002-135260 A | 5/2002 |
| JP | 2002-158730 A | 5/2002 |
| JP | 2002-223466 A | 8/2002 |
| JP | 2002-232507 A | 8/2002 |
| JP | 2003-69610 A | 3/2003 |
| JP | 2003-508728 A | 3/2003 |
| JP | 2003-101554 A | 4/2003 |
| JP | 2003-110579 A | 4/2003 |
| JP | 2003-218936 A | 7/2003 |
| JP | 2003-258880 A | 9/2003 |
| JP | 2003-263403 A | 9/2003 |
| JP | 2004-41375 A | 2/2004 |

| | | | |
|---|---|---|---|
| JP | 2004-64533 A | 2/2004 |
| JP | 2004-94555 A | 3/2004 |
| JP | 2004-104441 A | 4/2004 |
| JP | 2004177586 A | 6/2004 |
| JP | 2004-236108 A | 8/2004 |
| JP | 2004-343246 A | 12/2004 |
| JP | 2004-64533 A | 9/2005 |
| JP | 2005-354652 A | 12/2005 |
| JP | 2006-211425 | 8/2006 |
| WO | WO-99/31814 A1 | 6/1999 |
| WO | WO-0223885 A1 | 3/2002 |
| WO | WO-2006080357 | 8/2006 |

OTHER PUBLICATIONS

High Efficiency Protocols (IrSimple) Using Infrared Communication (IEICE Communications Society Conference 2005; Technical Reports published on Sep. 7, 2005).

Infrared Data Association Serial Infrared Physical Layer Specification Version 1.4 (May 30, 2001).

Infared Data Association Serial Infrared Link Access Protocol (IrLAP) Version 1.1 (Jun. 16, 1996).

Infrared Data Association Link Management Protocol Version 1.1 (Jan. 23, 1996).

Infrared Data Association 'Tiny TP': A Flow-Control Mechanism for use with IrLMP Version 1.1 (Oct. 20, 1996).

Infrared Data Association® (IrDA®) Object Exchange Protocol OBEX™ Version 1.3 (Jan. 3, 2003).

IrDA Serial Infrared Sequence Management Protocol for IrSimple Version 1.00 (Oct. 14, 2005).

IrDA Serial Infrared Link Management Protocol Specification for IrSimple Addition Errata to IrLMP Version 1.1 Version 1.00 (Oct. 14, 2005).

IrSimple (Infrared Simple) Profile Version 1.00 (Oct. 14, 2005).

IrDA Serial Infrared Link Access Protocol Specification for IrSimple Addition Errata to IrLAP Version 1.1 Version 1.00 (Oct. 14, 2005).

Matsumoto et al., Technical Report of IEICE, The Institute of Electronics, Information and Communication Engineers, pp. 1-7, (Jan. 28, 2000).

H. Naoe et al., "Standardization of IrSimple, a High-Speed Infrared Communications Protocol", Sharp Technical Journal, Feb. 2007, vol. 95, pp. 63-68 URL; http://www.sharp.co.jp/corporate/rd/30/pdf/95_13.pdf, Partial Trans.

H. Naoe et al., "IrDA Next Generation High-Speed Infrared Communications Standards 'IrSimple'", The Institute of Image Electronics Engineers of Japan, vol. 35, pp. 598-602 (2006), Partial Trans.

Hitoshi Naoe et al., "Standardization of IrSimple, a High-Speed Infrared Communications Protocol", Sharp Technical Journal, vol. 95, pp. 63-68 Feb. 2007 URL: <http://www.sharp.co.jp/corporate/rd/03/pdf/95_13.pdf>, Part Trans.

Hitoshi Naoe et al., "IrDA Next Generation High-Speed Infrared Communications Standards "IrSimple"", Technical Report of IEICE, The Institute of Image Electronics Engineers of Japan, vol. 35, pp. 598-602, 2006, Part Trans.

Mitsuji Matsumoto et al., "An Evaluation of the Optical Wireless System in the Mobile Environment in the Room", Technical Report of IEICE, The Institute of Electronics, Information and Communication Engineers, pp. 1-7, Jan. 28, 2000, Part Trans.

Hitoshi Naoe et al., "Standardization Proposal of High Efficiency Protocols by using Infrared Data Association", B-10-54, Conference Presentation, Institute of Electronics Information and Communication Engineers (IEICE), p. 344, Technical Reports published Sep. 7, 2005; with PowerPoint Presentation, Mar. 2005.

Hitoshi Naoe et al., "High Efficiency Protocols (IrSimple) Using Infrared Communication—IrSimple Profile and Protocols at Infrared Data Association", B-15-14, Conference Presentation, Institute of Electronics, Information and Communication Engineers (IEICE), 1 page. Technical Reports published Sep. 7, 2005; with PowerPoint Presentation, Mar. 2005.

"Infrared Data Association Serial Infrared Physical Layer Specification", Version 1.4, pp. i-iv & 1-60, May 30, 2001.

Timothy Willliams et al., "Infrared Data Association Serial Infrared Link Access Protocol (IrLAP)", Version 1.1, pp. 1-116, Jun. 16, 1996.

Andy Seaborne et al., "Infrared Data Association Link Management Protocol (IrLAP)", Version 1.1, pp. 1-98, Jan. 23, 1996.

Stuart Williams et al., "Infrared Data Association 'Tiny TP': A Flow-Control Mechanism for use with IrLMP" Version 1.1, pp. 1-17, Oct. 20, 1996.

Pat Megowan et al., "Infrared Data Association® (IrDA®) Object Exchange Protocol OBEX™ ", Version 1.3, pp. 1-95, Jan. 3, 2003.

Hitoshi Naoe et al., "Infrared Data Association IrDA Serial Infrared Sequence Management Protocol for IrSimple", Version 1.00, pp. 1-64, Oct. 14, 2005.

Hitoshi Naoe et al., "Infrared Data Association IrDA Serial Infrared Link Management Protocol Specification for IrSimple Addition-Errata to IrLMP Version 1.1", Version 1.00, pp. 1-27, Oct. 14, 2005.

Hitoshi Naoe et al., Infrared Data Association IrSimple (Infrared Simple) Profile, Version 1.00, pp. 1-30, Oct. 14, 2005.

Hitoshi Naoe et al., "Infrared Data Association IrDA Serial Infrared Link Access Protocol Specification for IrSimple Addition-Errata to IrLAP Version 1.1", Version 1.00, pp. 1-65, Oct. 14, 2005.

Kuniko Yamaguchi et al., "Implementation of IrSimple for Mobile Phones", B-15-15, Paper for Institute of Electronics, Information and Communication Engineers (IEICE), Communication Society Conference, 2005 p. 618.

Hitoshi Naoe et al., "IrSimple Profile and Protocols at Infrared Data Association", B-15-4, IECE Society Conference Abstracts, p. 617, 2005, Part Trans.

Glade Diviney et al., "Infrared Data Association IrLAP Fast Connect (Application Note)" Version 1.0, Nov. 27, 2002, pp. 1-17.

Kitazumi et al., A Proposal of next generation proximity infrared communication—Optimization of IrDA protocol by IrSimple—The Institute of Image Electronics Engineers of Japan, Nov. 18, 2005.

\* cited by examiner

FIG. 6

BACKGROUND ART

BACKGROUND ART

FIG. 33
MOBILE PHONE                          MOBILE PHONE
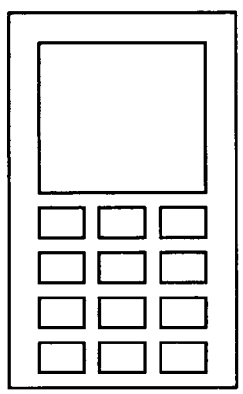
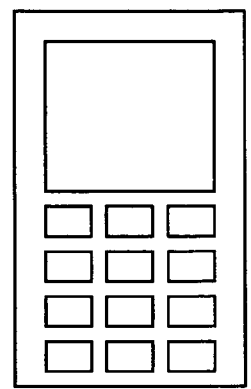
MOBILE PHONE A                        MOBILE PHONE B
FIG. 34
MOBILE PHONE                          DISPLAY DEVICE
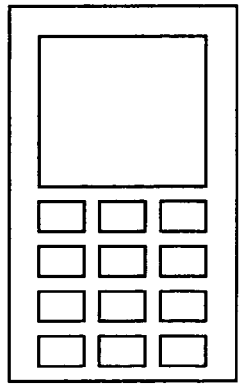
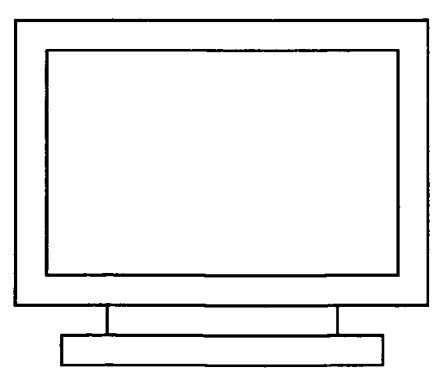
MOBILE PHONE A                        DISPLAY DEVICE B FIG. 35
MOBILE PHONE
PRINTING DEVICE
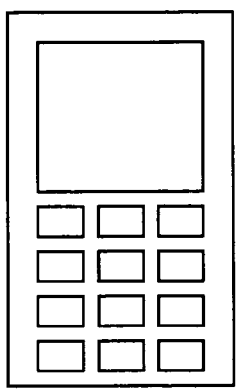
MOBILE PHONE A
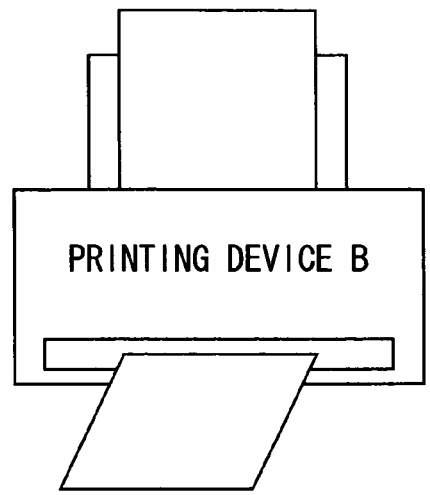
PRINTING DEVICE B
FIG. 36
MOBILE PHONE
RECORDING DEVICE
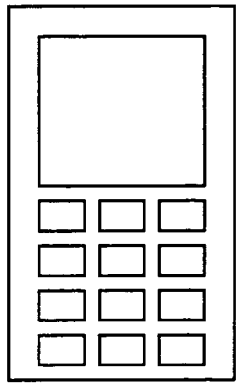
MOBILE PHONE A
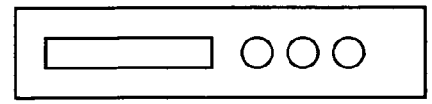
RECORDING DEVICE B

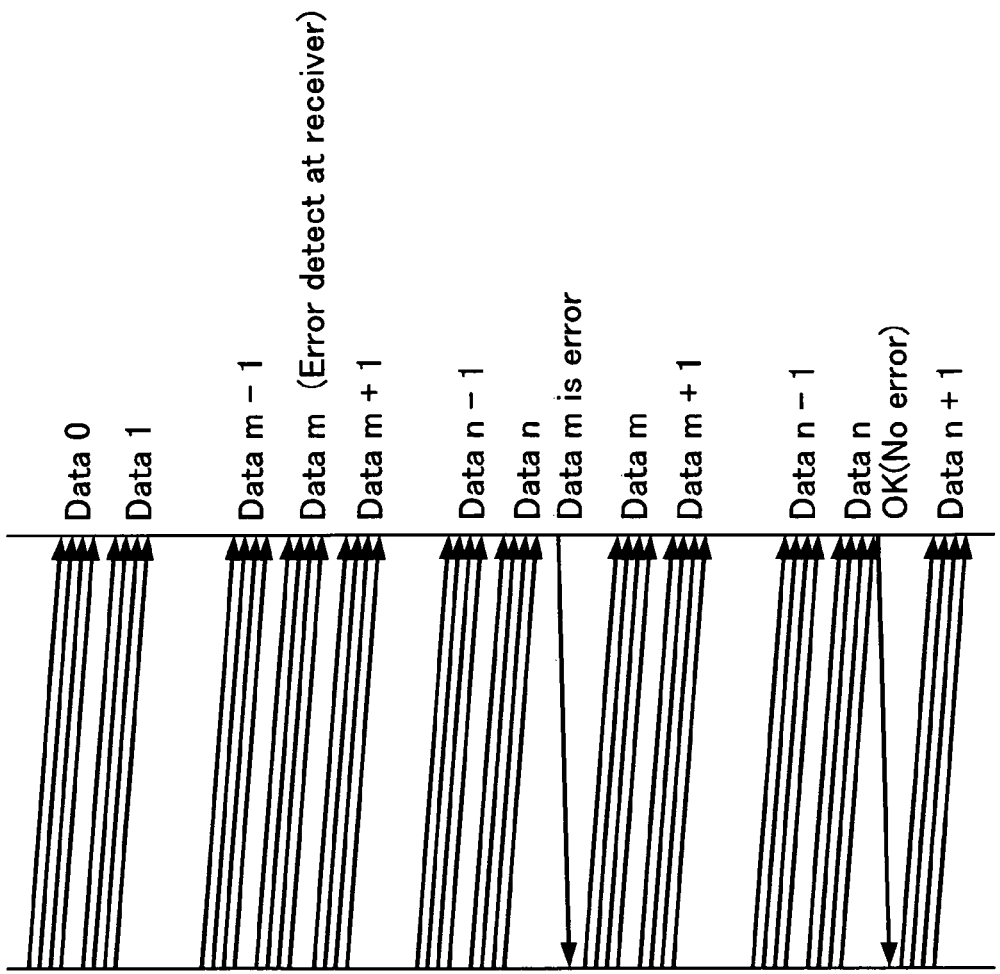
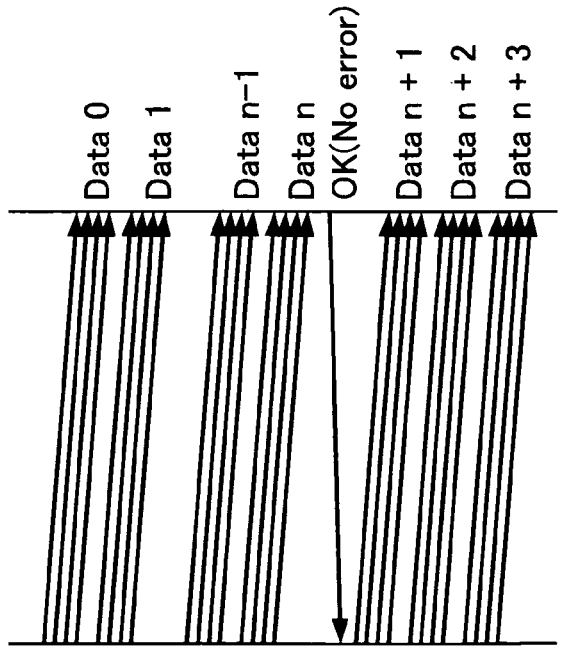
FIG. 39 (b)
FIG. 39 (a)

FIG. 40 (a)

IrDA DATA FRAME (I FRAME)

| Addr | Nr/Ns | LSAP | TTP Header | OBEX Data |

FIG. 40 (b)

DATA FRAME OF THE PRESENT INVENTION (UI FRAME)

| Addr | UI | LSAP | sending right Sequential Number | OBEX Data |

COMMUNICATION DEVICE, COMMUNICATION SYSTEM, COMMUNICATION METHOD, COMMUNICATION PROGRAM, AND COMMUNICATION CIRCUIT

TECHNICAL FIELD

The present invention relates to a communication device, a communication system, a communication method, a communication program, and a communication circuit, each of which is for use in exchanging and/or transferring data by transmitting and receiving the data.

BACKGROUND ART

OBEX (OBject EXchange protocol) is well known as a communication protocol for transmitting and receiving data, i.e., for exchanging objects. OBEX is a protocol by which a procedure of transmitting and receiving data via an infrared port was standardized in the form of "object exchange". The wording "object" refers to general data entity such as a file. (See Patent document 1).

Application software adopting OBEX can exchange various objects with other application software adopting OBEX, irrespective of differences in communication devices and/or communication methods. Thus, OBEX is adopted in a wide range of fields, as (i) not only a session protocol for the IrDA (Infra Red Data Association) communication method using an infrared ray, but also (ii) a session protocol for the Bluetooth® communication method using radio (2.4 GHz band).

Examples of such an object include a general file, device diagnostic, name card, bank statement, electrocardiogram, bill-payment receipt, and the like. Therefore, for example, OBEX allows exchanges of address book data and/or name card data among laptop personal computers, mobile phones, and PDAs (mobile information communication devices), each of which has a communication function using either IrDA or Bluetooth®. Further, OBEX can be also used in transmitting data of an image captured by a mobile phone or a digital still camera, to a television, a monitor, and/or a kiosk in a town. In addition, OBEX can be used for control of a television receiver or a VTR (video tape recorder).

OBEX is a high level IrDA protocol of a layer corresponding to the session layer of the OSI (Open System Interconnection) Reference Model. OBEX has a function similar to that of HTTP (Hyper Text Transform Protocol) used in the Internet. However, OBEX does not require resource as much as HTTP. This is a feature of OBEX.

FIG. 7 illustrates the standard IrDA protocol stack. The IrDA protocol stack includes: IrPHY (IrDA Physical Layer), IrLAP (IrDA Link Access Protocol), IrLMP (IrDA Link Management Protocol), and TinyTP (Transport Protocol). IrPHY defines a modulation method, signal intensity, directivity, and the like. IrLAP defines an error control function, transparent transmission, and flow control, each of which is in accordance with the multipurpose HDLC (High level Data Link Control). Moreover, IrLAP defines (i) a function of making negotiations with its counterpart about communication speed and/or a maximum data size before starting communication therebetween; (ii) a procedure of searching and finding an unspecified external device to which the device is to be connected; and the like. IrLMP provides a multiplexing/demultiplexing function corresponding to the port number used in TCP or UDP of TCP/IP protocol. Tiny TP is used for flow control in an individual logic link. OBEX is a protocol of a layer just above the layer using the transport protocol, i.e., Tiny TP.

In OBEX, a device making a request for a command is called "client device", and a device making a response to the device in reply to the request is called "server device". Usually, OBEX is in compliant with the client/server model in which the client device issues a request command such as a PUT or GET command to the server device and in which the server device sends a response command to the client device in reply to the request command.

Generally, examples of such a request command defined by OBEX include: (i) a CONNECT command for connecting the client device to the server device with which the client device is to communicate; (ii) a DISCONNECT command for disconnecting the client device from the server device with which the client device is being communicated; (iii) the PUT command for sending an object such as a file; (iv) the GET command for receiving an object such as a file; (v) a SET-PATH command for changing a path (current path), to which an object is to be sent, of the sever device; and (vi) an ABORT command for forcefully aborting transmission and/or reception of an object.

FIG. 8 illustrates a basic case where the client device sends such a request command to the server device and where the client device sends such a response command to the client device in reply. When the client device receives an object exchange request from a user, the client device sends the CONNECT command to the server device in order to establish a connection with the server device. The CONNECT command represents the connection request.

The server device receives the CONNECT command, and sends a SUCCESS response command to the client device in cases where the server device is connectable to the client device. The client device receives the SUCCESS response command, with the result that connection is established between the client device and the server device.

After the connection is established, the client device starts exchanging objects with the server device. Specifically, the client device sends, to the server device, a PUT command for sending an object. When the server device receives normally the PUT command from the client device, the server device sends a CONTINUE response command to the client device. The client device receives the CONTINUE response command from the server device, and therefore confirms that the server device has received the PUT command normally. Thereafter, the client device sends a next PUT command to the server device. The client device sends PUT commands to the server device until the client device finishes sending all the objects. When the server device has finished receiving these PUT commands normally up to the final PUT command, the server device sends a SUCCESS response command to the client device.

The client device receives the SUCCESS response command from the server device, and then sends the DISCONNECT command to the server device so as to carry out a process for disconnecting the client device from the server device. The DISCONNECT command represents a disconnection request.

When the server device receives the DISCONNECT command, the server device sends, to the client server, a SUCCESS response command, which represents permission for the disconnecting. The client device receives the SUCCESS response command, with the result that the client device is disconnected from the server device. In this way, the series of the object exchange between the client device and the server device are completed.

As such, the object exchange using OBEX is carried out in such a manner that: the client device sends a request command to the server device, and the server device sends a response command to the client device in reply.

Further, as is the case with the aforementioned IrDA protocol stack, communication protocols in a hierarchical structure such as OSI respectively are used in layers, each of which defines header information independent from those respectively defined by the other layers. Therefore, in each of the layers, such header information is rendered to data to be sent from one computer to another. The rendering of the header information is carried out in the layers in order from the uppermost layer to the bottom layer. On the other hand, received data is passed on one by one from the bottom layer to the uppermost layer, after removing corresponding header information therefrom in each of the layers.

Specifically, see FIG. 9. In the client device, a request command generated in the OBEX layer is passed on one by one to the lower layers, i.e., the Tiny TP layer, the IrLMP layer, and the IrLAP layer, after rendering header information to the request command in each of the layers. The header information is independent from those of the other layers. On the other hand, in the server device, the data received from the client device is passed on one by one from the bottom layer to the uppermost layer, after removing corresponding header information therefrom in each of the layers. Therefore, the data passed to the OBEX layer of the server device is the request command (the CONNECT command, the PUT command, the DISCONNECT command, or the like) from which the header information corresponding to each of the layers below the OBEX layer have been removed.

Patent document 1: Japanese Unexamined Patent Publication Tokukai 2000-196622 (published on Jul. 14, 2000)

As described above, OBEX allows exchange of various objects, irrespective of the differences in communication devices and/or communication methods. Thus, OBEX is adopted as a protocol for object exchange in IrDA, Bluetooth®, and the like, and OBEX is therefore used in various devices such as a mobile terminal. Examples of the mobile terminal include a mobile phone, a PDA, and the like.

However, for realization of the object exchange between the client device and the server device each using OBEX, the server device inevitably needs to have a function of transmitting a response command to the client device. However, rendering of such a transmitting function to the server device causes increases in device cost and in development difficulty. Accordingly, there arises a demand for realizing object exchange in which the server device has only a minimally required receiving function.

Further, as described above, during the object exchange using the PUT commands of OBEX, the server device sends the CONTINUE response commands to the client device in reply to the PUT commands sent from the client device, respectively. The SUCCESS response command sent in reply to the final PUT command is required so as to notify the client device that the object exchange has been surely done. However, the CONTINUE response commands, each of which serves to notify the client device of progress in the object exchange, are not necessarily required in consideration of a band used for the transmission of the CONTINUE response commands.

Further, as described above, OBEX is currently used in various devices, so that it is not easy to change its specification. If the specification of OBEX is changed, existing resources cannot be used any more.

DISCLOSURE OF INVENTION

An object of the present invention is to provide a communication device, a communication system, a communication method, a communication program, and a communication circuit, in which or by which a server device does not need to send a response command in reply to either a specific request command or all the request commands from a client device, in communication using a protocol for use in exchanging an object.

To achieve the object, a communication device, according to the present invention, which serves as a primary station having an object exchange layer for issuing a request command and receiving a response command for the request command so as to transmit an object to an object exchange layer of a secondary station, the communication device including: an object exchange layer processing section for processing a communication protocol of the object exchange layer; and a lower layer processing section for processing a communication protocol of a lower layer positioned below the object exchange layer, the lower layer processing section, including: a response generating section for generating a pseudo response command practically serving as the response command from the secondary station, and for notifying the pseudo response command to the object exchange layer processing section; and a lower layer control section for controlling, upon reception of a request command generation notification from the object exchange layer processing section, the request generating section such that the request generating section generates the pseudo response command for the request command and notifies the pseudo response command to the object exchange layer processing section.

A communication method, according to the present invention, adopted in a primary station having an object exchange layer for issuing a request command and receiving a response command for the request command so as to transmit an object to an object exchange layer of a secondary station, the method including the step of: a lower layer below the object exchange layer, (i) generating, upon reception of a request command generation notification from the object exchange layer, a pseudo response command practically serving as the response command from the secondary station and (ii) notifying the pseudo response command to the object exchange layer.

According to the structure and the method, the lower layer below the object exchange layer in the primary station (e.g., client device) generates the pseudo response command and notifies the generated pseudo response command to the object exchange layer.

This makes it possible for the primary station to exchange an object with a secondary station (e.g., server device) having no transmitting function but having a minimally required receiving function, even though the communication protocol for object exchange using a request command and a response command is not changed. Further, because the communication protocol (object exchange use protocol) of the object exchange layer does not need to be changed to attain the transmission and the reception between the first and secondary stations as such, existing resources can be still used.

Further, a communication system according to the present invention includes: the communication device serving as the primary station; and a communication device serving as a secondary station that receives an object from the communication device.

According to the communication system, even in cases where the secondary station is incapable of transmitting the response command, the primary station generates the pseudo response command and notifies the generated pseudo response command to the object exchange layer. This makes it possible for the primary station to exchange an object with a secondary station having no transmitting function but having a minimally required receiving function, even though the conventional communication protocol for object exchange using a request command and a response command is not changed.

Further, a communication device, according to the present invention, which serves as a secondary station having an object exchange layer for receiving a request command from a primary station and issuing a response command for the request command so as to receive an object from an object exchange layer of the primary station, the communication device including: an object exchange layer processing section for processing a communication protocol of the object exchange layer; and a lower layer processing section for processing a communication protocol of a lower layer positioned below the object exchange layer processing section, when the lower layer processing section receives the response command issued by the object exchange processing section, the lower layer processing section operating such that the response command is not to be transmitted to the primary station.

Further, a communication method, according to the present invention, adopted in a secondary station having an object exchange layer for receiving a request command from a primary station and issuing a response command for the request command so as to receive an object from an object exchange layer of the primary station, the method including the step of: a lower layer below the object exchange layer, operating, upon reception of the request command issued by the object exchange layer, such that the response command is not to be transmitted to the primary station.

According to the structure and the method, even when the object exchange layer of the secondary station issues an unnecessary response command, the unnecessary response command is not transmitted from the secondary station. For example, in cases where the object exchange layer of the secondary station (e.g., server device) is so configured as to always send a response command in reply to a request command but where the request command from the primary station (e.g., client device) does not require any response command, the lower layer of the secondary station never transmits the response command generated by the object exchange layer.

This makes it possible to reduce electric power required for the transmission of the response command from the secondary station. Further, if such a response command that the primary station does not require is transmitted, the response command is likely to collide with a next request command from the primary station. Thus, the method and the structure allow prevention of such collision.

Further, a communication system according to the present invention includes: the communication device serving as the secondary station; and a communication device serving as a primary station that transmits an object to the communication device.

According to the communication system, when the request command from the primary station requires no response command, the layer below the object exchange layer of the secondary station does not transmit the response command issued by the object exchange layer.

With this, even when the object exchange layer of the secondary station uses a conventional communication protocol for object exchange using a request command and a response command, it is possible to carry out object exchange with the primary station which only receives a minimally required response command. That is, the communication protocol is not modified, but the object exchange with such a primary station is attained.

Note that the communication device may be realized by a computer. In this case, the present invention encompasses (i) a communication program of the communication device, which program realizes the communication device by causing a computer to operate as the sections of the communication device, and (ii) a computer-readable recording medium storing the communication program.

Further, the communication device may be realized by a communication circuit functioning as the sections of the communication device.

Further, the communication device is suitable for a mobile phone that carries out communication with the use of the communication device. According to such a mobile phone, communication can be carried out with high transfer efficiency by using the object exchange protocol (inclusive of OBEX).

Further, the communication device is suitable for a display device that carries out display in accordance with data received by the communication device. According to such a display device, communication can be carried out with high transfer efficiency by using the object exchange protocol (inclusive of OBEX).

Further, the communication device is suitable for a printing device for carrying out printing in accordance with data received by the communication device. According to such a printing device, communication can be carried out with high transfer efficiency by using the object exchange protocol (inclusive of OBEX).

Further, the communication device is suitable for a recording device storing data received by the communication device. According to such a recording device, communication can be carried out with high transfer efficiency by using the object exchange protocol (inclusive of OBEX).

Additional objects, features, and strengths of the present invention will be made clear by the description below. Further, the advantages of the present invention will be evident from the following explanation in reference to the drawings.

BRIEF DESCRIPTION OF DRAWINGS

FIG. 6 is a sequence diagram illustrating a procedure of a data transferring process in Embodiment 2.

FIG. 33 is a diagram illustrating an example of communication between mobile phones in a communication system of Embodiment 11 according to the present invention.

FIG. 34 is a diagram illustrating an example of communication between a mobile phone and a display device in a communication system of Embodiment 12 according to the present invention.

FIG. 35 is a diagram illustrating an example of communication between a mobile phone and a printing device in a communication system of Embodiment 13 according to the present invention.

FIG. 36 is a diagram illustrating an example of communication between a mobile phone and a recording device in a communication system of Embodiment 14 according to the present invention.

FIG. 38($b$) is a sequence diagram illustrating another connection establishing in the embodiment of the present invention. FIG. 38($c$) illustrates a format of a packet used for the connection establishing in the embodiment of the present invention.

FIG. 39($a$) is a diagram illustrating a data exchange sequence in the embodiment of the present invention. FIG. 39($b$) is a diagram illustrating another data exchange sequence in the embodiment of the present invention.

FIG. 40($a$) is a diagram illustrating a packet format used in data exchange in IrDA. FIG. 40($b$) is a diagram illustrating a packet format used in data exchange in the present invention.

FIG. 41($b$) is a diagram illustrating another data exchange sequence in the embodiment of the present invention.

FIG. 42($b$) is a diagram illustrating another disconnection sequence in the embodiment of the present invention. FIG. 42($c$) illustrates a packet format used in the disconnection sequence in the present invention.

FIG. 44($b$) is a diagram illustrating a change of data in the functions among the layers in the embodiment of the present invention.

FIG. 50(*b*) is an explanatory diagram illustrating a change of data in the functions among the layers in the embodiment of the present invention.

REFERENCE NUMERALS

Figure 1:
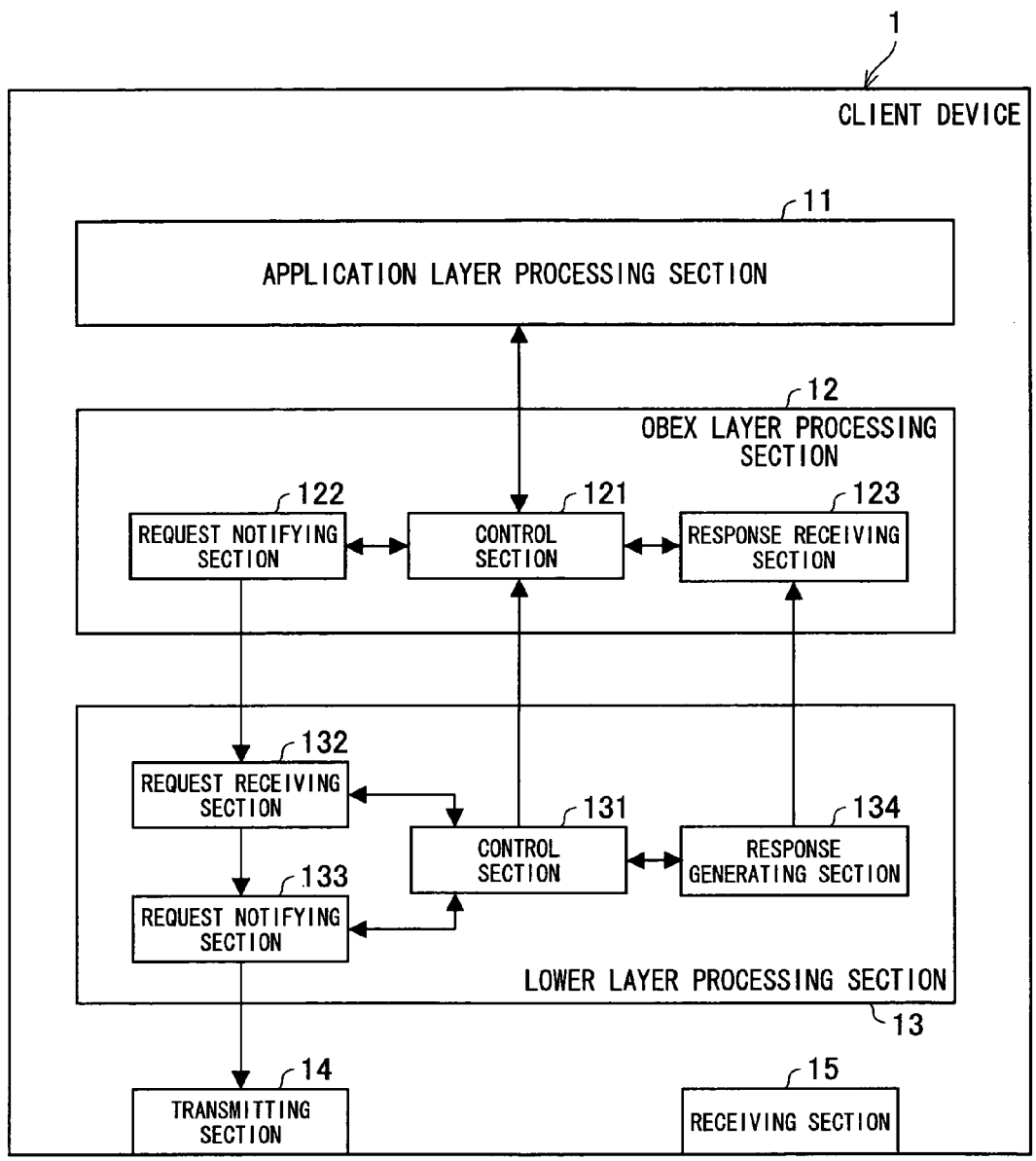
FIG. 1 is a block diagram illustrating a structure of a client device of a communication system of Embodiment 1 according to the present invention.
Figure 2:
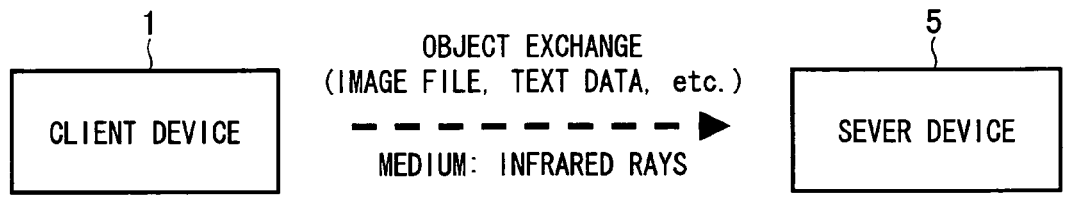
FIG. 2 is a block diagram illustrating a structure of the communication system.

1 Client device (communication device, primary station)
11 Application layer processing section
12 OBEX layer processing section (Object exchange layer processing section)
121 Control section
122 Request notifying section
123 Response receiving section
13 Lower layer processing section
131 Control section (Lower layer control section)
132 Request receiving section
133 Request notifying section
134 Response generating section
14 Transmitting section
15 Receiving section
2 Client device (communication device, primary station)
21 Application layer processing section
22 OBEX layer processing section (Object exchange layer processing section)
221 Control section
222 Request notifying section
223 Response receiving section
23 Lower layer processing section
231 Control section (Lower layer control section)
232 Request receiving section
233 Request notifying section
234 Response receiving section
235 Response notifying section
236 Response generating section
237 Multiplexer
238 Timer
24 Transmitting section
25 Receiving section
3 Client device (communication device, primary station)
31 Application layer processing section
32 OBEX layer processing section (Object exchange layer processing section)
321 Control section
322 Request notifying section
323 Response receiving section
23 Lower layer processing section
331 Control section (Lower layer control section)
332 Request receiving section
333 Request notifying section
334 Response receiving section
335 Response notifying section
336 Response generating section
337 Multiplexer
34 Transmitting section
35 Receiving section
4 Client device (communication device, primary station)
41 Application layer processing section
42 OBEX layer processing section (Object exchange layer processing section)
421 Control section
422 Request notifying section
423 Response receiving section
43 Lower layer processing section
431 Control section (Lower layer control section)
432 Request receiving section
433 Request notifying section
434 Response receiving section
435 Response notifying section
436 Response generating section
437 Multiplexer
438 Header information analyzing section
44 Transmitting section
45 Receiving section
5 Server device (communication device, secondary station)
51 Application layer processing section
52 OBEX layer processing section (Object exchange layer processing section)
521 Control section
525 Request analyzing section
53 Lower layer processing section
531 Control section
535 Request analyzing section
54 Transmitting section
55 Receiving section
1000 Server device (communication device, secondary station)

1010 Application layer processing section
1020 OBEX layer processing section (Object exchange layer processing section)
1021 Control section
1022 Response notifying section
1025 Request analyzing section
1030 Lower layer processing section
1031 Control section (Lower layer control section)
1032 Response receiving section
1035 Request analyzing section
1050 Receiving section
1100 Server device (communication device, secondary station)
1110 Application layer processing section
1120 OBEX layer processing section (Object exchange layer processing section)
1121 Control section
1122 Response notifying section
1125 Request analyzing section
1130 Lower layer processing section
1131 Control section (Lower layer control section)
1132 Response receiving section
1135 Request analyzing section
1140 Transmitting section
1150 Receiving section
1300 Client device (communication device, primary station)
1310 Application layer processing section
1320 OBEX layer processing section (Object exchange layer processing section)
1321 Control section
1322 Request notifying section
1323 Response receiving section
1324 Communication direction selecting section
1330 Lower layer processing section
1340 Transmitting section
1350 Receiving section
1500 Server device (communication device, secondary station)
1510 Application layer processing section
1520 OBEX layer processing section (Object exchange layer processing section)
1521 Control section
1522 Response notifying section
1523 Request analyzing section
1530 Lower layer processing section
1540 Transmitting section
1550 Receiving section

BEST MODE FOR CARRYING OUT THE INVENTION

[Overview]

Each of embodiments below fully explains respective structures and operations of a client device (primary station) and a server device (secondary station) of a communication system according to the present invention, in accordance with the OSI7 hierarchical model. The OSI7 hierarchical model herein refers to so-called "OSI Reference Model" or "OSI Hierarchical Model".

In the OSI7 hierarchical model, for realization of data communication between different types of device, a communication function that a computer should have is divided into seven layers, in each of which a standard function module is defined.

Specifically, the first layer (physical layer) serves to perform electrical conversion, mechanical operation etc. required to output data into the communication line. The second layer (data link layer) secures physical communication paths, and detects error of data being transmitted in each of the communication paths. The third layer (network layer) selects a communication path, and supervises addresses in the communication path. The fourth layer (transport layer) carries out data compression, error detection, retransmission control etc. The fifth layer (session layer) establishes/releases a virtual path (connection) for carrying out data transmission/reception between plural communication programs. The sixth layer (presentation layer) converts the data received from the fifth layer into a different format suitable for the user and converts the data transmitted from the seventh layer into a format suitable for transmission. The seventh layer (application layer) provides various available services using data communication to a person or to a program.

Each of the communication layers according to the embodiments has the same function as that of corresponding layer in the OSI7 hierarchical model. However, it should be noted that the foregoing communication system has a six-layered structure in which the session layer and the presentation layer are unified. Explained in each of Embodiments is an example in which such a communication layer obtained by unifying the session layer and the presentation layer is realized by using OBEX (OBject EXchange protocol). A communication layer just below such an OBEX layer is assumed to be the transport layer. In the transport layer, a lower layer processing section (described later) is provided. However, the lower layer processing section may be provided in either the network layer or the data link layer. Note that no explanation for the application layer is made.

The present invention is widely applicable to a communication system in which a transmitter and a receiver communicate with each other via respective established connections between (i) a plurality of communication layers of the transmitter and (ii) a plurality of communication layers of the receiver. That is, the communication function of the present invention may be divided unlike the OSI7 hierarchical model. Further, the number of the communication layers can be selected arbitrarily as long as the communication layers to be connected with each other are plural.

For ease of explanation, each of the embodiments describes "IrSimple", one application example of the present invention. However, the present invention is not limited to IrSimple. IrSimple is made by partly modifying the function of conventional IrDA. Note that the present invention is effective in not only the wireless communication using an infrared ray, but also other wireless communications and wired communications.

Note that, in each of the embodiments, the data link layer, the network layer, the transport layer, and the session/presentation layer may be referred to as LAP, LMP, SMP, and OBEX, respectively.

Figure 59:
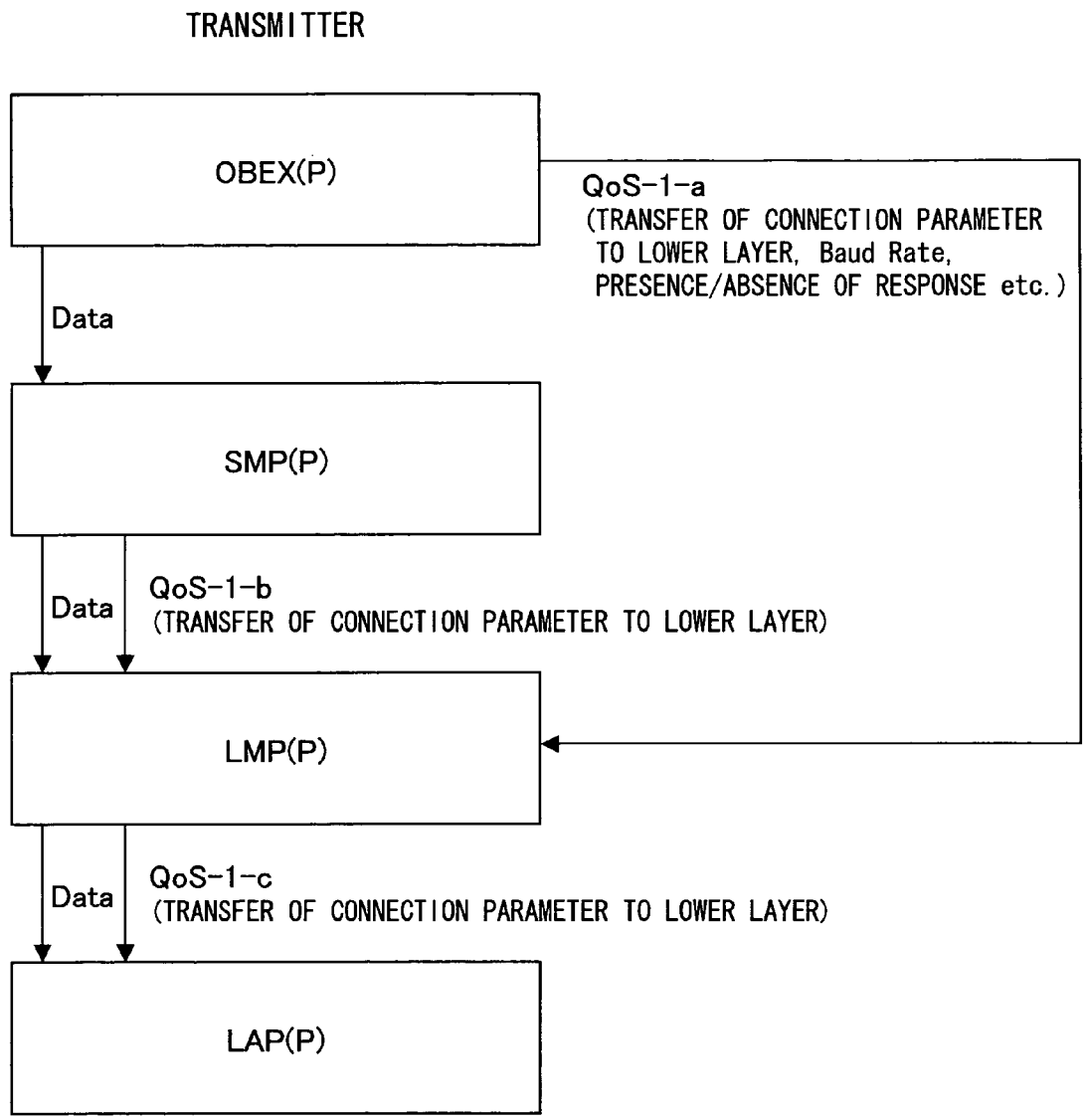
FIG. 59 is a diagram schematically illustrating a modified example of the embodiment, i.e., illustrating how data of a connection request function and a connection parameter are transferred in the primary station in cases where the layers separately send connection parameters to the lower layer.

With reference to FIG. 1 through FIG. 59, the following explains embodiments of a communication method, a communication program, a recording medium, a communication device, and a communication system according to the present invention. FIG. 7 through FIG. 9, FIG. 14, FIG. 21, FIG. 22, FIG. 27, and FIG. 28 are explanatory diagrams for conventional techniques.

Assume that the communication device according to the present invention is in compliant with, e.g., the IrDA transferring method (transmitting method), by which a client device (communication device) 1 serving as a communication device carries out object exchange with a target device, a server device 5, via an infrared ray as a medium. However, the present invention is not limited to this.

Examples of the client device 1 include a computer, a mobile phone, a mobile information terminal (PDA), a digital camera, and the like. Examples of the server device 5 include a television (TV), a printer, a projector, a computer, a mobile phone, a mobile communication terminal (PDA), a digital camera, and the like.

Examples of the medium include (i) an infrared ray; (ii) a radio wave, which is used for communication using mobile phones or the like and which falls within a range from 100 MHz to 5 GHz or the like; (iii) visible light whose transmission channel is an optical fiber. Examples of data to be exchanged as an object include an image file, text data, and the like.

Embodiment 1

A client device 1 serving as Embodiment 1 according to the present invention will be explained below with reference to FIG. 1. Note that wordings (inclusive of a member and a function) defined in the other embodiments are used in the same manner in the present embodiment, unless otherwise noted.

FIG. 1 is a block diagram illustrating a structure of the client device 1 of a communication system according to the present embodiment. As shown in FIG. 1, the client device 1 includes an application layer processing section 11, an OBEX layer processing section (object exchange layer processing section) 12, a lower layer processing section 13, a transmitting section 14, and a receiving section 15. The application layer processing section 11, the OBEX layer processing section 12, and the lower layer processing section 13 are provided in this order from top to bottom, thereby constituting a hierarchical structure. The application layer processing section 11, the OBEX layer processing section 12, and the lower layer processing section 13 uses different types of communication protocol.

In response to a user's instruction inputted via an operation section (not shown), the application layer processing section 11 requests the OBEX layer processing section 12 to issue a request command for making communication with outside. Further, when the application layer processing section 11 is notified by the OBEX layer processing section 12 that a response command has been received, the application layer processing section 11 carries out a predetermined process in accordance with the received response command.

The OBEX layer processing section 12 includes a control section 121, a request notifying section 122, and a response receiving section 123. In response to a request from the application layer processing section 11, the control section 121 notifies (controls) the request notifying section 122 to generate a request command and issue the request command to the layer below the OBEX layer processing section 12. Further, when the control section 121 is notified of a response command reception result from the response receiving section 123, the control section 121 notifies the application layer processing section 11 of the response command reception result.

When the request notifying section 122 is notified by the control section 121 such that the request notifying section 122 issues a request command, the request notifying section 122 generates the request command, and sends the request command to the lower layer processing section 13. The response receiving section 123 receives a response command from the lower layer processing section 13, and analyzes the received response command, and notifies the control section 121 of (i) a result of the command analysis, and (ii) the reception of the response command.

The lower layer processing section 13 includes a control section (lower layer control section) 131, a request receiving section 132, a request notifying section 133, and a response generating section 134. The control section 131 controls the respective blocks, i.e., the request receiving section 132, the request notifying section 133, and the response generating section 134. Details thereof will be explained later.

The request receiving section 132 receives the request command from the OBEX layer processing section 12, and analyzes the request command, and notifies the control section 131 of (i) a result of the command analysis and (ii) the reception of the request command. Further, the request receiving section 132 sends the request command, which is the received data, to the request notifying section 133.

The control section 131 sends, to the request notifying section 133, a request command issue notification obtained in accordance with (i) the result of the command analysis and (ii) the notification of the reception of the request command. Upon the reception of the request command issue notification, the request notifying section 133 regenerates a request command by rendering necessary header information to the request command, which is the data received from the request receiving section 132. Then, the request notifying section 133 sends the regenerated request command to the transmitting section 14.

The transmitting section 14 receives the request command from the lower layer processing section 13, and sends the request command to outside via an infrared communication path. The receiving section 15 receives a response command from the target device (server device). The response command indicates that the server device has received the request command. Then, the receiving section 15 sends the received response command to the lower layer processing section 13.

Figure 3:
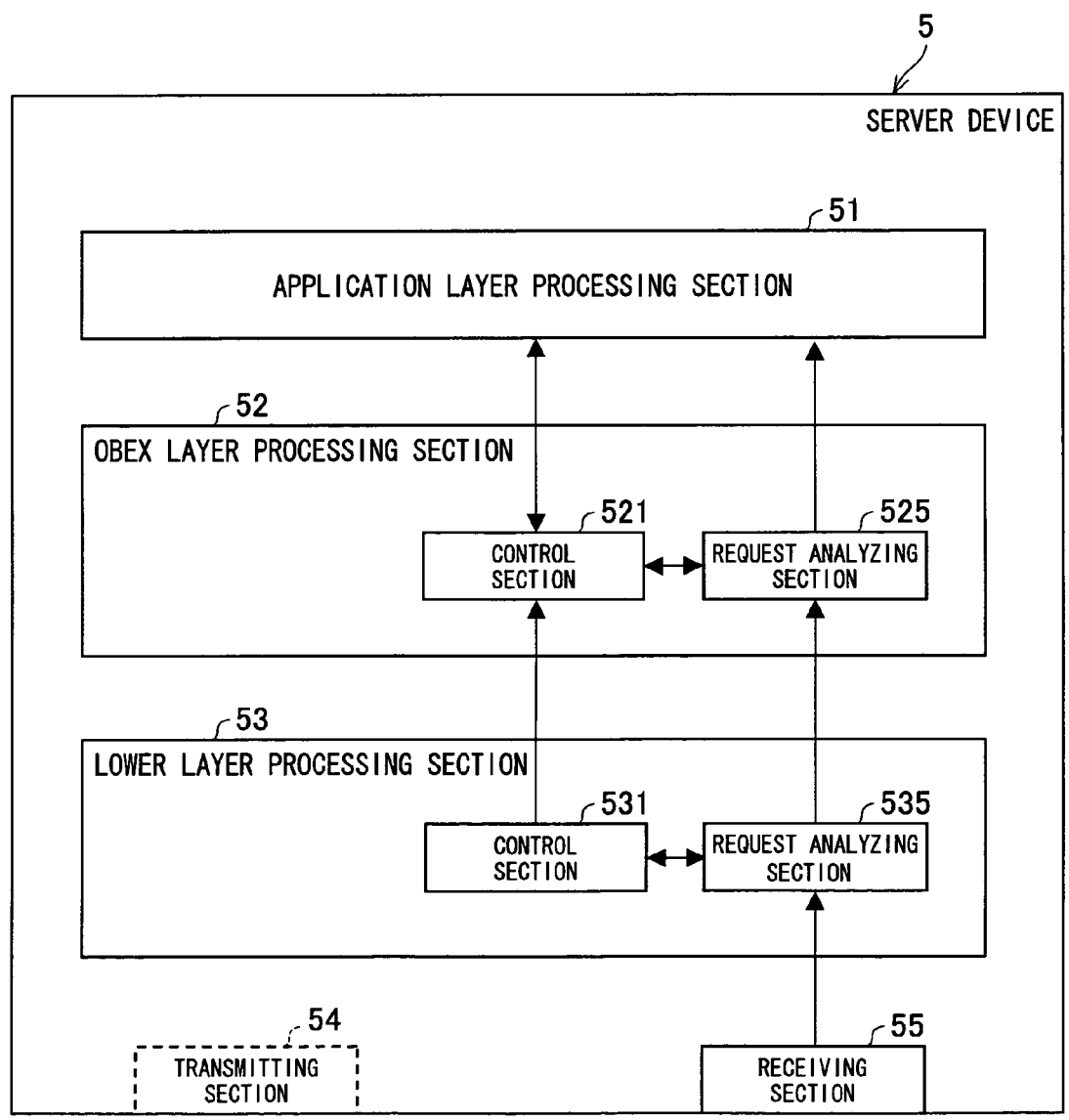
FIG. 3 is a block diagram illustrating an example of a structure of a server device of the communication system.

See FIG. 3. The server device 5 cannot send the response command in the following cases (1) and (2): (1) a case where the server device 5 does not have any transmitting section, and (2) a case where the server device does not have at least a part of a section, such as a response notifying section or a response transmitting section, for generating such a response command to be sent in reply to the request command sent from the transmitting section 14 to the server device 5. In such cases, the client device 1 cannot carry out the object exchange with the server device 5 in the data communication with the server device 5. This is inconvenient.

In order to avoid such inconvenience, in the present embodiment, the response generating section 134 is provided in the lower layer processing section 13 of the client device 1. The response generating section 134 receives a response command generation notification from the control section 131, and generates a pseudo response command. The response command generation notification is obtained in accordance with (i) the result of the command analysis carried out by the request receiving section 132, and (ii) the notification that the request receiving section 132 has received the request command. The pseudo response command is equivalent to the response command. The pseudo response command thus generated is sent to the layer just above the lower layer, i.e., to the OBEX layer processing section 12 via the response receiving section 123.

With this, in the present embodiment, even though the server device 5 cannot send any response command, i.e., even though no response command is actually received from the server device 5, the pseudo response command is notified to the upper layer processing section. As such, even in compliance with the conventional communication protocol, the communication between the client device 1 and the server device 5 can be maintained and objects can be sent from the client device 1 to the server device 5.

The following explains such a server device 5 with reference to FIG. 3. The server device 5 at least includes an application layer processing section 51, an OBEX layer processing section 52, a lower layer processing section 53, and a receiving section 55.

The application layer processing section 51 receives application data (image data, text data, or the like) from the OBEX layer processing section 52, and carries out a predetermined process. The OBEX layer processing section 52 includes a control section 521 and a request analyzing section 525. The request analyzing section 525 analyzes a request command sent from the lower layer processing section 53, and notifies the control section 521 of a result (command type or the like) of the analysis.

Further, the request analyzing section 525 removes an OBEX header from the received request command, and sends the thus obtained application data to the application layer processing section 51 in accordance with an instruction sent from the control section 521. The control section 521 notifies the application layer processing section 51 of the analysis result notified to the control section 521 by the request analyzing section 525. Further, in accordance with the analysis result, the control section 521 instructs the request analyzing section 525 to transfer the application data to the application layer processing section 51.

The lower layer processing section 53 includes a control section 531 and a request analyzing section 535. The request analyzing section 535 analyzes the request command sent from the client device 1 via the receiving section 55, and notifies the control section 531 of a result (command type or the like) of the analysis.

Further, the request analyzing section 535 removes, from the received request command, header information added in the lower layers of the client device 1. Then, the request analyzing section 535 extracts an OBEX packet therefrom, and sends the extracted OBEX packet data to the OBEX layer processing section 52 in accordance with a transferring instruction sent from the control section 531.

The control section 531 notifies the OBEX layer processing section 52 of the analysis result notified to the control section 531 by the request analyzing section 535. Further, in accordance with the analysis result, the control section 531 instructs the request analyzing section 535 to transfer, to the OBEX layer processing section 52, the extracted OBEX packet data.

Figure 4:
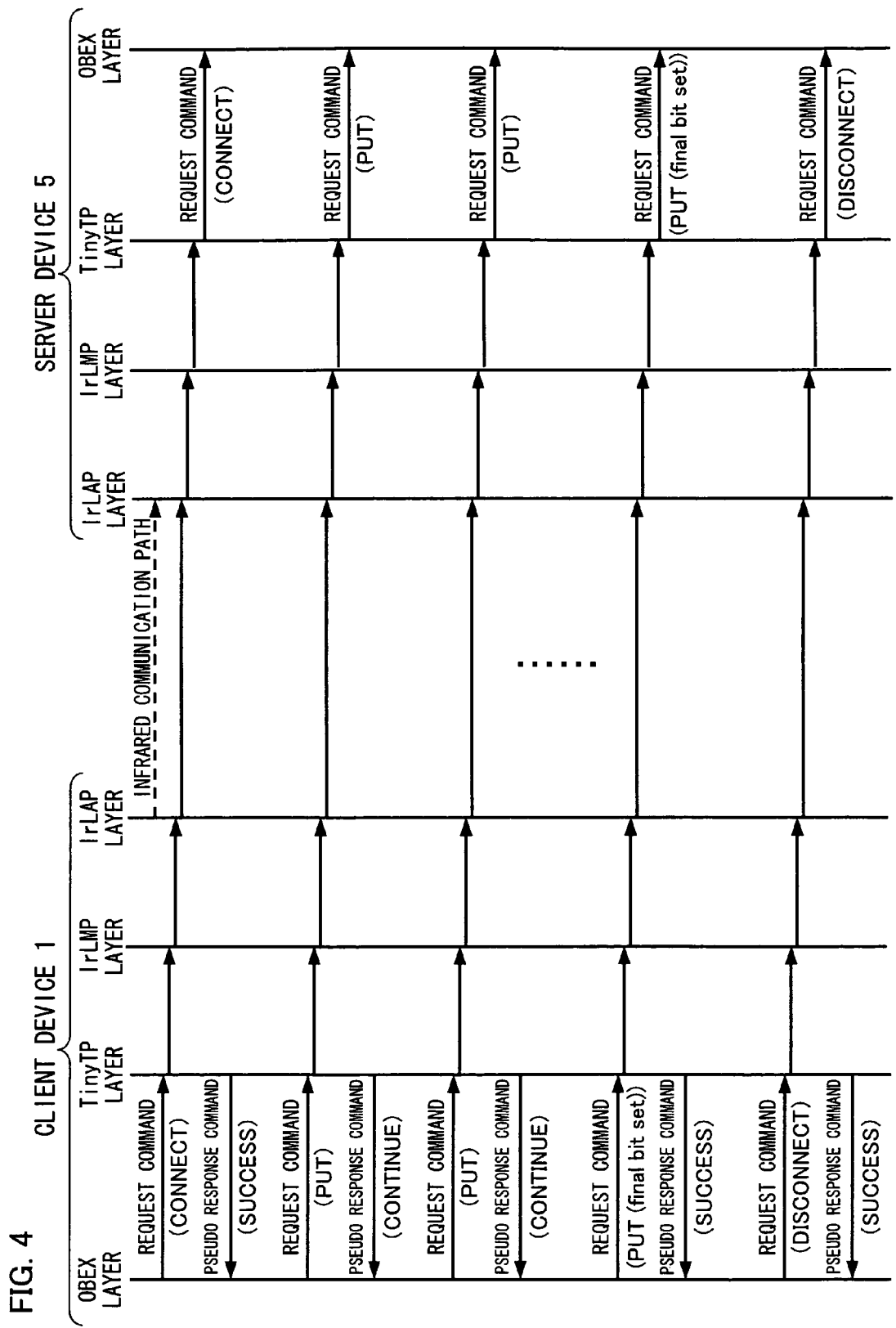
FIG. 4 is a sequence diagram illustrating a procedure of a data transferring process in Embodiment 1.

Explained next is a procedure (communication method) of the data transferring process between the client device and the server device in the embodiment of the present invention, with reference to (i) a sequence shown in FIG. 4 and (ii) FIG. 1. Note that FIG. 4 illustrates a case of carrying out connecting, data transfer, and a transferring process upon disconnecting, in the IrDA protocol stack.

When the application layer processing section 11 of the client device 1 receives an object exchange instruction from a user, the application layer processing section 11 requests the OBEX layer processing section 12 to connect to the server device 5, the target device with which the client device 1 is to communicate.

In response to the connection request from the application layer processing section 11, the control section 121 of the OBEX layer processing section 12 instructs the request notifying section 122 to generate a connection request command and to issue the connection request command to the lower layer processing section 13.

In response to the instruction given from the control section 121 for the sake of generating the connection request command, the request notifying section 122 generates a CONNECT command, which serves as the connection request command. Then, the request notifying section 122 sends the CONNECT command to the lower layer processing section 13. The CONNECT command thus sent from the OBEX layer processing section 12 is received by the request receiving section 132 provided in the lower processing section 13. Then, the request receiving section 132 notifies the control section 131 that the connection request command has been received. Then, the request receiving section 132 sends such received data to the request notifying section 133.

When the control section 131 is notified by the request receiving section 132 that the connection request command has been received, the control section 131 instructs the request notifying section 133 to issue the connection request command. When the request notifying section 133 is instructed by the control section 131 to issue the connection request command, the request notifying section 133 renders header information to the data received from the request receiving section 132, and sends the connection request command to the transmitting section 14, and notifies the control section 131 that the sending of the connection request command has been done.

When the control section 131 is notified by the request notifying section 133 that the sending of the connection request command has been done, the control section 131 instructs the response generating section 134 to issue a pseudo response command, which serves as a response to the CONNECT command and which is equivalent to the response command.

When the response generating section 134 is thus instructed by the control section 131 to issue the pseudo response command for the CONNECT command, the response generating section 134 generates the pseudo response command, which is equivalent to a SUCCESS command that is the response command for the CONNECT command, and that is in compliance with the OBEX standard, i.e., the standard of the layer above the lower layer processing section 13. Then, the response generating section 134 sends the pseudo response command to the OBEX layer processing section 12.

The response receiving section 123 provided in the OBEX layer processing section 12 receives the pseudo response command equivalent to the SUCCESS command from the lower layer processing section 13, and recognizes the pseudo response command as a normal response command that is in compliance with the OBEX standard and that serves as a response to the CONNECT command. Then, the response receiving section 123 notifies the control section 121 that the response command for the connection request has been received.

When the control section 121 is notified by the response receiving section 123 that the response command for the connection request has been received, the control section 121 notifies the layer above the OBEX layer, i.e., the application layer processing section 11 that connecting with the server device 5 is completed. In this way, the application layer processing section 11 can confirm the completion of the connecting with the server device 5, and therefore can start the object exchange therewith.

In the description herein, the Tiny TP layer, the IrLMP layer, and the IrLAP layer are expressed as one block, i.e., the lower layer processing section 13. However, each layer may constitute one block. Further, in FIG. 4, the pseudo response command to be sent to the OBEX layer processing section 12 is generated in the Tiny TP layer just below the OBEX layer processing section 12. However, the pseudo response command may be generated in other layer such as the IrLMP layer or the IrLAP layer.

However, it is preferable that the pseudo response command to be sent to the OBEX layer processing section 12 be generated in the Tiny TP layer just below the OBEX layer processing section 12, because extra header information does not need to be rendered to the pseudo response command, and does not need to be removed therefrom. Specifically, in cases where the pseudo response command equivalent to (substantially identical to) the response command and in compliant with the OBEX standard is generated in the Tiny TP layer, the generated pseudo response command is merely notified to the OBEX layer processing section 12. On the other hand, in cases where such a pseudo response command is generated in a layer other than the layer just below the OBEX layer, the pseudo response command needs to be transparent up to the OBEX layer processing section 12. Therefore, as shown in Table 1, it is necessary to render, to the pseudo response command, header information respectively suitable to the layers positioned between the OBEX layer and the layer in which the pseudo response command is generated.

TABLE 1

| IrLAP Layer Header Information | IrLMP Layer Header Information | Tiny TP Layer Header Information | OBEX Pseudo Response Command |
|---|---|---|---|

After the establishment of the connection, PUT commands are sent from the client device 1 to the target device for the sake of sending the object data to the target device, and a DISCONNECT command is sent thereto for the sake of carrying out a process of disconnecting the client device 1 from the target device. As is the case with the above CONNECT command, pseudo response commands equivalent to CONTINUE commands and SUCCESS commands responding to the PUT commands and to the DISCONNECT command are generated in the lower layer processing section 13 just below the OBEX layer processing section 12. This makes it possible to transfer the object data from the client device 1 to the target device, i.e., the server 5, and makes it possible to carry out the process of disconnecting the client device 1 from the server device 5. This is so apparent that further explanation thereof is omitted here.

As described above, the client device 1 of the present embodiment uses communication protocols in a hierarchical structure, so as to carry out communication. The client device 1 is used in such a communication system that adopts an object exchange use protocol for exchanging objects in the following manner: the client device 1, which is a side making a request for a command, sends a request command to the server device, and receives a response command from the server device, which is a side making a response in reply to the request command. The client device 1 has such a function that: when receiving a request command issued from a layer using the object exchange use protocol, a pseudo response command complying with the object exchange use protocol and corresponding to the request command is generated in a layer below the layer using the object exchange use protocol, and is notified to the upper layer, i.e., the layer using the object exchange use protocol.

This makes it possible to exchange objects with the server 5 having no transmitting function but having a minimum receiving function, even though the protocol for carrying out the object exchange by using the request commands and the response commands is not modified. Further, the object exchange use protocol does not need to be modified as such, so that existing resources can be used.

Explained next is an example of a data structure complying with the aforementioned communication protocol. Note that the data structure is applicable to those of embodiments described below. Firstly, Table 2 below shows a data structure of the connection request command.

TABLE 2

| Byte 0 | Bytes 1 and 2 | Byte 3 | Byte 4 | Bytes 5 and 6 | Bytes 7 to n |
|---|---|---|---|---|---|
| Opcode 0x80 | connect packet length | OBEX version number | flags | maximum OBEX packet length | optional headers |

Next, Table 3 below shows a data structure of the response command to be sent in reply to the connection request.

TABLE 3

| Byte 0 | Bytes 1 and 2 | Byte 3 | Byte 4 | Bytes 5 and 6 | Bytes 7 to n |
|---|---|---|---|---|---|
| response code | connect response packet length | OBEX version number | flags | maximum OBEX packet length | optional headers |

(Explanation for the Respective Fields)

"Connect packet length" indicates the packet length of the connection request command, and "connect response packet length" indicates the packet length of the response command to be sent in reply to the connection request command.

"OBEX version number" indicates a version number of the OBEX protocol.

"Flags" indicates whether or not the server device accommodates to a plurality of IrLMP connections, in the case of the response command.

"Maximum OBEX packet length" indicates the maximum length of an OBEX packet that each of the devices can receive.

Next, Table 4 below shows respective examples of a connection command and a response command.

TABLE 4

| | Bytes | Meaning |
|---|---|---|
| | Client's request: | |
| Opcode | 0x80 | CONNECT |
| | 0x0007 | packet length of 7 |
| | 0x10 | Version 1.0 of OBEX |
| | 0x00 | no connect flags |
| | 0x2000 | 8k max packet size |
| | Server's response: | |
| response code | 0xA0 | SUCCESS |
| | 0x0007 | packet length of 7 |
| | 0x10 | Version 1.0 of OBEX |
| | 0x00 | no connect flags |
| | 0x0800 | 2K max packet size |

Next, Table 5 below shows a data structure of the request command for requesting data transfer.

TABLE 5

| Byte 0 | Bytes 1, 2 | Bytes 3 to n |
|---|---|---|
| Opcode 0x02 (0x82: the final PUT request) | packet length | sequence of headers |

Next, Table 6 below shows a data structure of the response command to be sent in reply to the data transfer request.

TABLE 6

| Byte 0 | Bytes 1, 2 | Bytes 3 to n |
|---|---|---|
| response code typical values 0x90 for Continue 0xA0 for Success | Response packet length | optional response headers |

Next, explanation for the respective fields of Tables 5 and 6 is described as follows:

"Packet length" indicates the packet length of the data transfer command, and "Response packet length" indicates the packet length of the response command to be sent in reply to the data transfer command.

Table 7 through Table 9 below show examples of the request command and the response command respectively shown in Table 5 and Table 6.

TABLE 7

| | Bytes | Meaning |
|---|---|---|
| Client's request: | | |
| Opcode | 0x02 | PUT |
| | 0x0422 | 1058 bytes is length of packet |
| | 0x01 | Header ID for Name header |
| | 0x0017 | Length of Name header |
| | JUMAR.TXT | name of object |
| | 0xC3 | Header ID for Length header |
| | 0x00001000 | Length of object is 4K bytes |
| | 0x48 | Header ID for Object Body Chunk header |
| | 0x0403 | Length of Body header (1k) plus Header ID and Header length |
| | 0x... | 1k bytes of body |
| Server's response: | | |
| response code | 0x90 | CONTINUE |
| | 0x0003 | length of response packet |

TABLE 8

| | Bytes | Meaning |
|---|---|---|
| Client's request: | | |
| Opcode | 0x02 | PUT |
| | 0x0406 | 1030 bytes is length of packet |
| | 0x48 | Header ID for Object Body Chunk |

TABLE 8-continued

| | Bytes | Meaning |
|---|---|---|
| | 0x0403 | Length of Body header (1k) plus Header ID and Header length |
| | 0x... | next 1k bytes of body |
| Server's response: | | |
| response code | 0x90 | CONTINUE |
| | 0x0003 | length of response packet |

TABLE 9

| | Bytes | Meaning |
|---|---|---|
| Client's request: | | |
| Opcode | 0x82 | PUT |
| | 0x0406 | 1030 bytes is length of packet |
| | 0x49 | Header ID for End-of-Body Chunk |
| | 0x0403 | Length of Body header (1k) plus Header ID and Header length |
| | 0x... | last 1k bytes of body |
| Server's response: | | |
| response code | 0xA0 | SUCCESS |
| | 0x0003 | length of response packet |

Next, Table 10 below shows a data structure of the request command for requesting disconnection in the data communication. Hereinafter, such a request command is also referred to as "data disconnection request command".

TABLE 10

| Byte 0 | Bytes 1, 2 | Bytes 3 to n |
|---|---|---|
| Opcode 0x81 | packet length | optional headers |

Next, Table 11 below shows a data structure of the response command to be sent in response to the data disconnection request command.

TABLE 11

| Byte 0 | Bytes 1, 2 | Bytes 3 to n |
|---|---|---|
| response code 0xA0 or 0xD3 | response packet length | optional response headers |

Next, explanation for the respective fields of Tables 10 and 11 is described as follows:

"Packet length" indicates the packet length of the data disconnection request command, and "Response packet length" indicates the packet length of the response command to be sent in reply to the data disconnection request command.

Table 12 below shows examples of the request command and the response command respectively shown in Table 10 and Table 11.

TABLE 12

|  | Bytes | Meaning |
|---|---|---|
| Client's request: | | |
| Opcode | 0x81 | DISCONNECT |
|  | 0x0003 | packet length of 3 |
| Server's response: | | |
| response code | 0xA0 | SUCCESS |
|  | 0x0003 | packet length of 3 |

Finally, Tables 13 through 15 shows representative Opcodes, Headers, and Response Codes in OBEX, respectively.

TABLE 13

OBEX Operations and Opcode definitions

| Opcode | Definition | Meaning |
|---|---|---|
| 0x80 | Connect | choose your partner, negotiation capabilities |
| 0x81 | Disconnect | signal the end of the session |
| 0x02 (0x82) | Put | send an object |

TABLE 14

OBEX Headers

| Header ID | Header name | Description |
|---|---|---|
| 0x01 | Name | name of the object (often a file name) |
| 0xC3 | Length | the length of the object in bytes |
| 0x48 | Body | a chuck of the object body |
| 0x49 | End of Body | the final chunk of the object body |

TABLE 15

Response Code values

| OBEX response code | Definition |
|---|---|
| 0x10 (0x90) | Continue |
| 0x20 (0xA0) | OK, Success |
| 0x53 (0xD3) | Service Unavailable |

Embodiment 2

Figure 5:
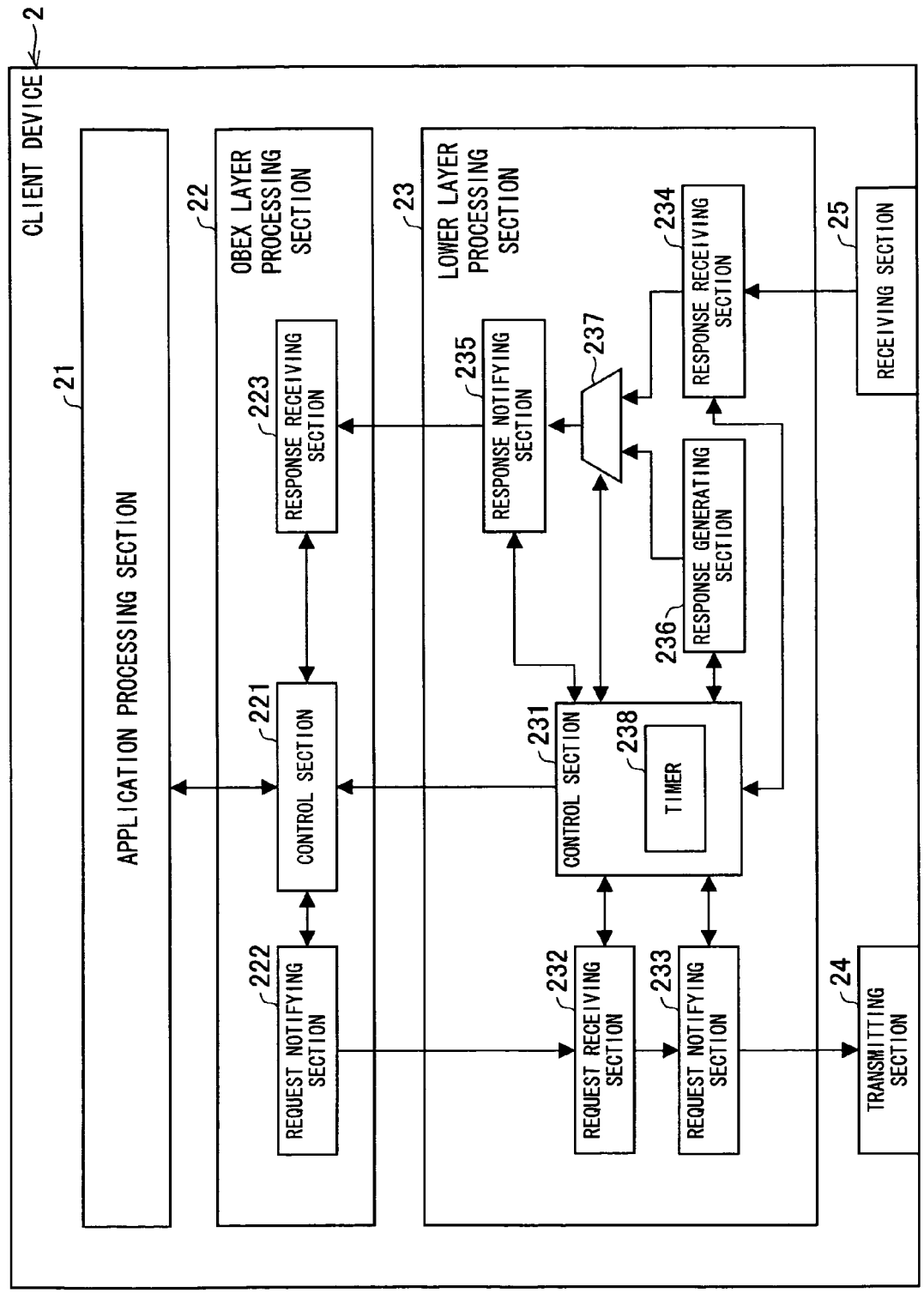
FIG. 5 is a block diagram illustrating a structure of a client device of a communication system of Embodiment 2 according to the present invention.
Figure 7:
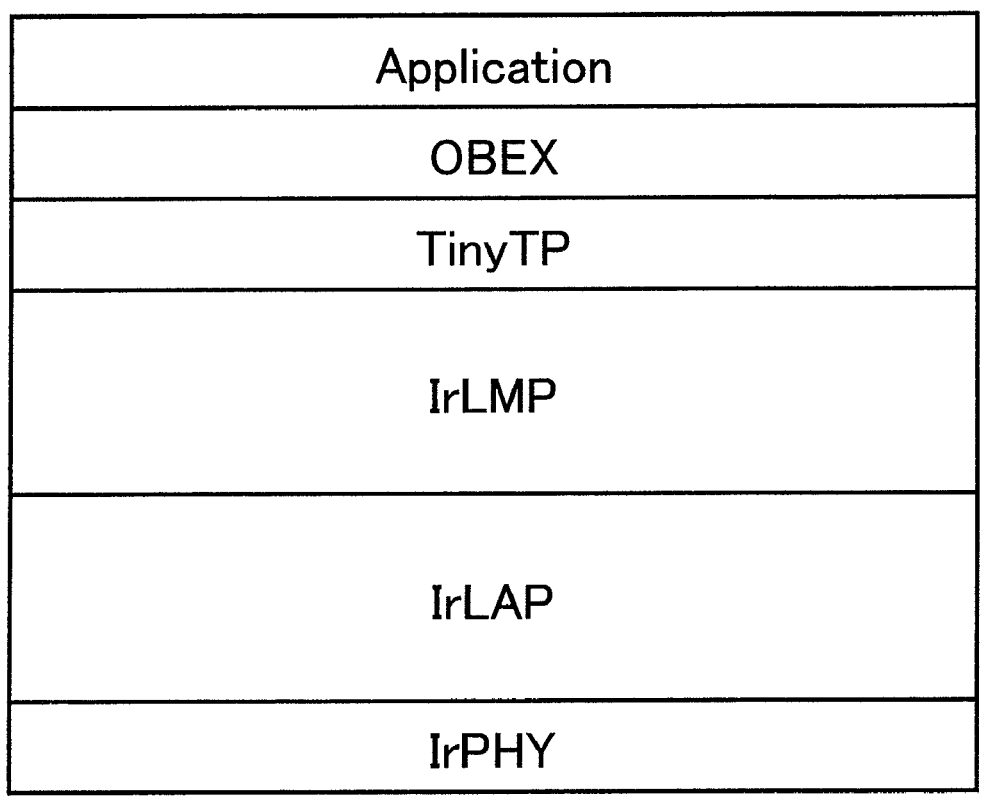
FIG. 7 is a schematic diagram illustrating the IrDA protocol stack.
Figure 8:
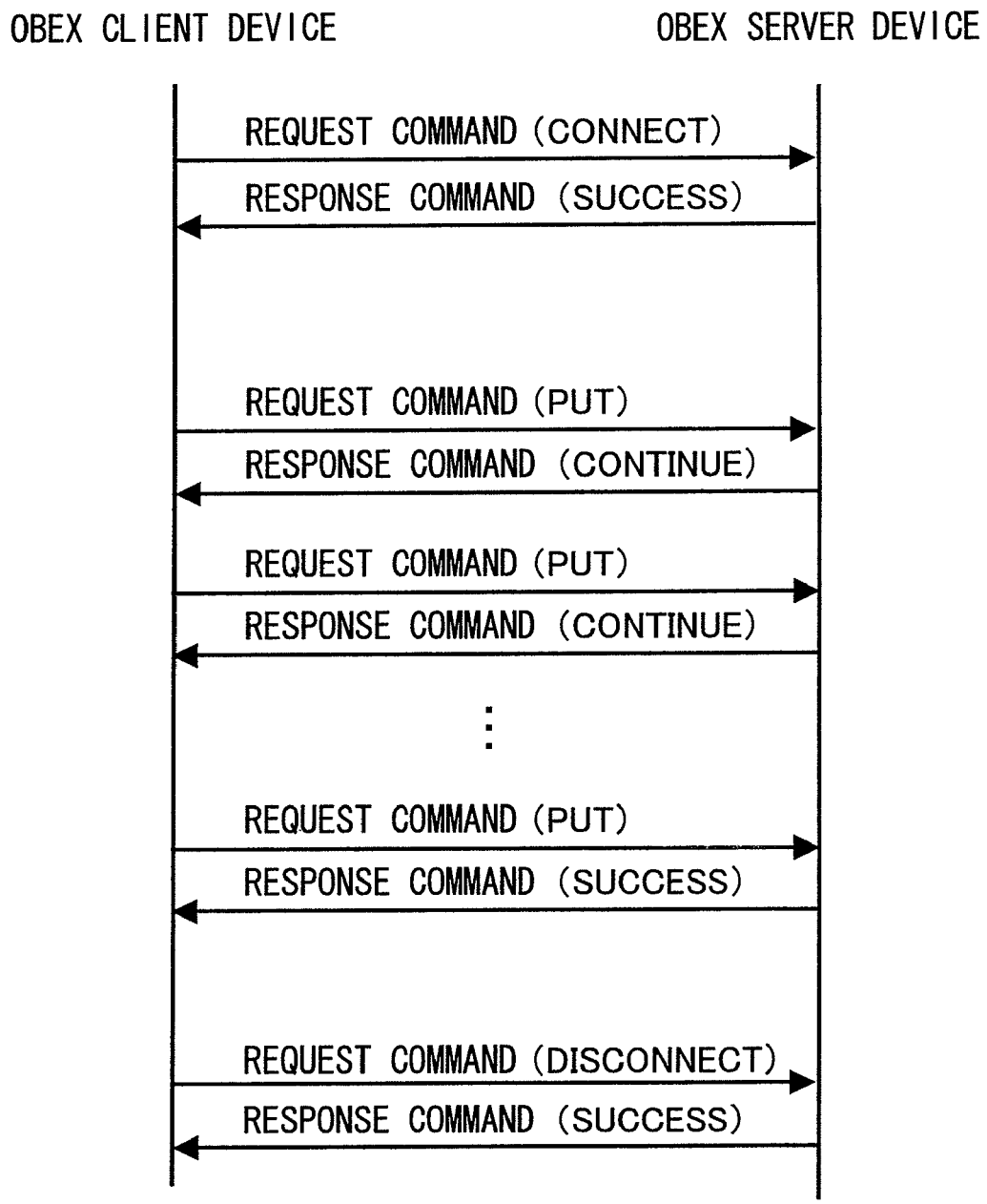
FIG. 8 is a sequence diagram illustrating a basic procedure of exchanging a request command and a response command in the OBEX communication standard.
Figure 9:
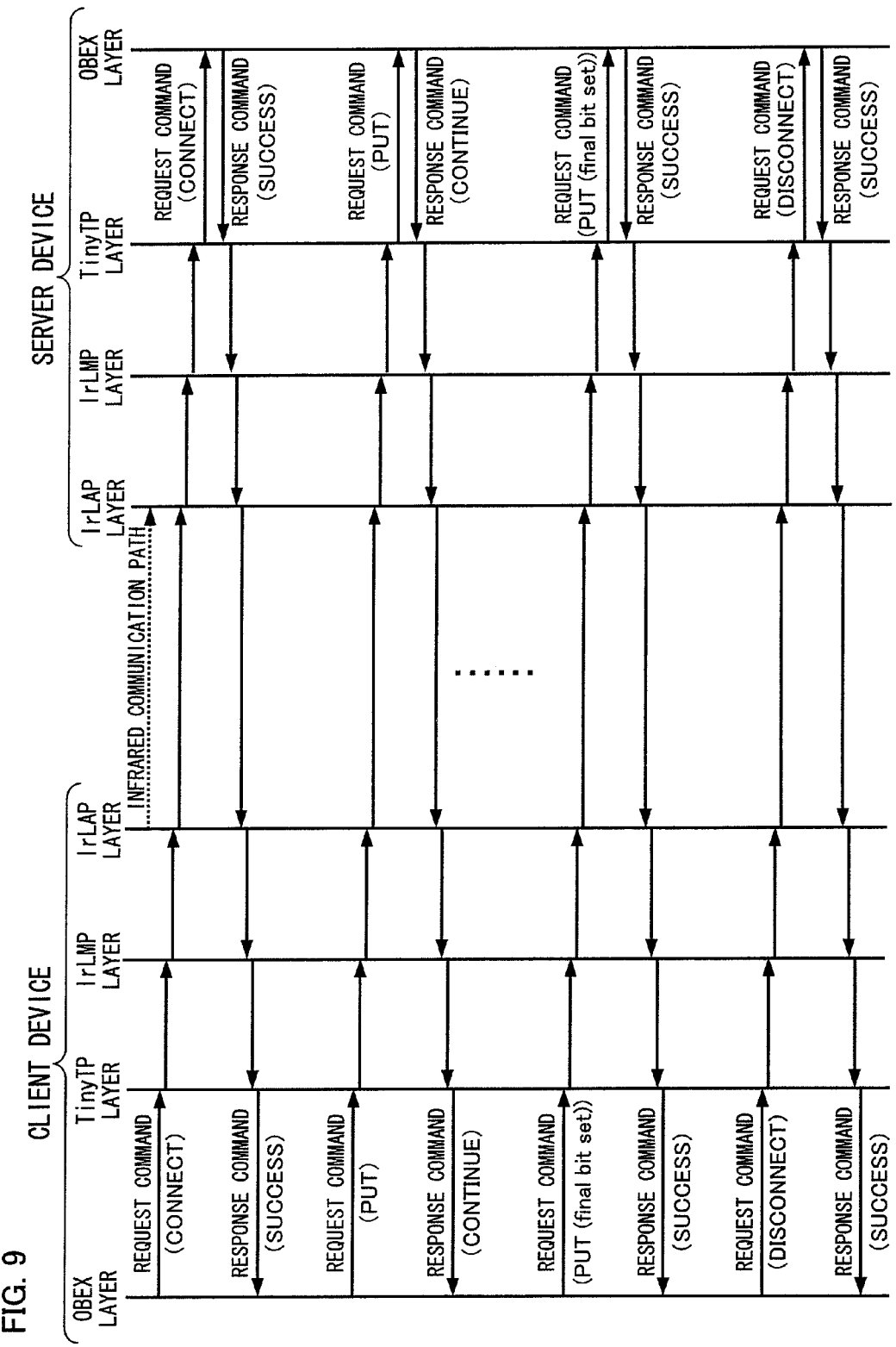
FIG. 9 is a sequence diagram illustrating a general procedure of data transfer in the OBEX communication standard.

The following explains a client device (communication device) of a data transferring system (communication system) according to Embodiment 2 of the present invention, with reference to FIG. 5. Note that wordings (inclusive of a member and a function) defined in the other embodiments are used in the same manner in the present embodiment, unless otherwise noted.

FIG. 5 is a block diagram illustrating a structure of the client device of the present embodiment. As shown in FIG. 5, such a client device 2 includes an application layer processing section 21, an OBEX layer processing section (object exchange layer processing section) 22, a lower layer processing section 23, a transmitting section 24, and a receiving section 25, which have the same functions as those of the client device 1 shown in FIG. 1, respectively.

In response to a user's instruction inputted via an operation section (not shown), the application layer processing section 21 requests the OBEX layer processing section 22 to issue a request command. Further, when the application layer processing section 21 is notified by the OBEX layer processing section 22 that a response command has been received, the application layer processing section 21 carries out a predetermined process in accordance with the received response command.

The OBEX layer processing section 22 includes a control section 221, a request notifying section 222, and a response receiving section 223. In response to a request from the application layer processing section 21, the control section 221 notifies the request notifying section 222 to generate a request command and issue the request command to the layer below the OBEX layer processing section 22. Further, when the control section 221 is notified of a response command reception result from the response receiving section 223, the control section 221 notifies the response command reception result to the application layer processing section 21.

When the request notifying section 222 is notified by the control section 221 to issue a request command, the request notifying section 222 generates a request command, and sends the request command to the lower layer processing section 23. The response receiving section 223 receives a response command from the lower layer processing section 23, and analyzes the received response command, and notifies the control section 221 of (i) a result of the command analysis, and (ii) the reception of the response command.

The lower layer processing section 23 includes a control section (lower layer control section) 231, a request receiving section 232, a request notifying section 233, a response receiving section 234, a response notifying section 235, a response generating section 236, a multiplexer 237, and a timer 238.

The control section 231 controls the respective blocks, i.e., the request receiving section 232, the request notifying section 233, the response receiving section 234, the response notifying section 235, the response generating section 236, the multiplexer 237, and the timer 238. Details thereof will be explained later.

The request receiving section 232 receives the request command from the OBEX layer processing section 22, and analyzes the request command, and notifies the control section 231 of (i) a result of the command analysis and (ii) the reception of the request command. When being notified, the control section 231 activates the timer 238. The timer 238 measures time from the activation.

Further, the request receiving section 232 sends the received data to the request notifying section 233. In response to a request command issue notification from the control section 231, the request notifying section 233 renders necessary header information to the received data so as to generate a request command. The request command thus generated is sent to the transmitting section 24.

When the response receiving section 234 receives data from the receiving section 25 provided below the lower layer processing section 23, the response receiving section 234 analyzes the received data. Then, the response receiving section 234 notifies the control section 231 of (i) a result of the command analysis and (ii) the reception of the response command. Further, the response receiving section 234 removes header information from the received response command, and sends the response command to the multiplexer 237.

The multiplexer 237 receives the response command, and sends the response command to the response notifying section 235, and the response notifying section 235 sends the response command to the OBEX layer processing section 22.

When the response generating section 236 receives a response command generation notification from the control section 231, the response generating section 236 generates the same pseudo response command as that of Embodiment 1, and sends the pseudo response command to the multiplexer 237.

In accordance with a control signal from the control section 231, the multiplexer 237 carries out switching such that either (i) the pseudo response command generated by the response generating section 236 or (ii) the response command sent from the layer below the lower layer processing section 23 via the response receiving section 234 will be sent to the response notifying section 235. The timer 238 measures a predetermined time for the sake of the control section 231.

That is, when the request receiving section 232 notifies the control section 231 of (i) the command analysis result and (ii) the reception of the request command, the control section 231 activates the timer 238 for the sake of measuring time from the activation. When the response receiving section 234 does not notify the control section 231 of (i) any command analysis result and (ii) any reception of a response command after the predetermined time has passed since the notification from the request receiving section 232, the control section 231 controls the response generating section 236 and the multiplexer 237 such that the pseudo response command is to be sent to the response notifying section 235.

The transmitting section 24 transmits, to outside via an infrared communication path, the request command received from the lower processing section 23. The receiving section 25 receives a response command from the target device (server device) via the infrared communication path. Then, the response command thus received is sent to the lower layer processing section 23.

Figure 6:
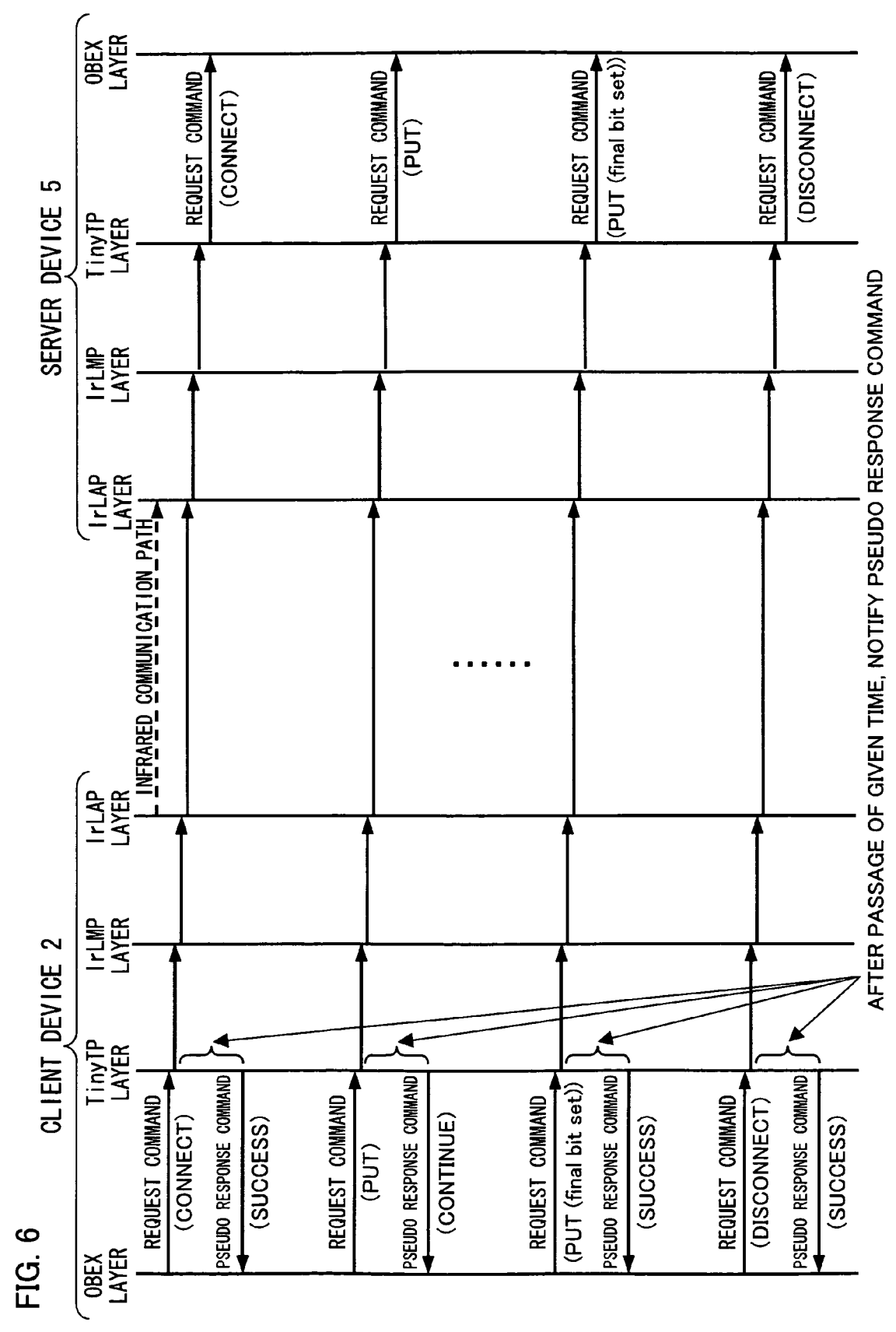

Explained next is a procedure (communication method) of a data transferring process between the client device and the server device in Embodiment 2 of the present invention, with reference to (i) a sequence shown in FIG. 6 and (ii) FIG. 5. Note that FIG. 6 illustrates a case of carrying out connecting, data transfer, and a transferring process upon disconnecting, in the IrDA protocol stack.

When the application layer processing section 21 of the client device 2 receives an object exchange instruction from a user, the application layer processing section 21 requests the OBEX layer processing section 22 to connect to the server device 5, the target device with which the client device 1 is to communicate.

In response to the connection request from the application layer processing section 21, the control section 221 of the OBEX layer processing section 22 instructs the request notifying section 122 to generate a connection request command and to issue the connection request command to the lower layer processing section 23.

In response to the instruction given from the control section 221 for the sake of generating the connection request command, the request notifying section 222 generates a CONNECT command, which serves as the connection request command. Then, the request notifying section 222 sends the CONNECT command to the lower layer processing section 23. The CONNECT command thus sent from the OBEX layer processing section 22 is received by the request receiving section 232 provided in the lower processing section 23. Then, the request receiving section 232 notifies the control section 231 that the connection request command has been received. Then, the request receiving section 232 sends such received data to the request notifying section 233.

When the control section 231 is notified by the request receiving section 232 that the connection request command has been received, the control section 231 instructs the request notifying section 233 to issue the connection request command. When the request notifying section 233 is instructed by the control section 231 to issue the connection request command, the request notifying section 233 renders header information to the data received from the request receiving section 232, and sends the connection request command to the transmitting section 24, and notifies the control section 231 that the sending of the connection request command has been done.

When the control section 231 is notified by the request notifying section 233 that the sending of the connection request command has been done, the control section 231 causes the timer 238 to start operating. When the predetermined time has passed since the timer 238 started measuring time, the control section 231 judges that no response command is sent from the server device 5. Then, the control section 231 instructs the response generating section 236 to issue a pseudo response command, which serves as a response to the CONNECT command, and the control section 231 instructs the multiplexer 237 such that the multiplexer 237 will send, to the response notifying section 235, the pseudo response command, which is to be sent from the response generating section 236 and which serves as a response to the CONNECT command.

When the response generating section 236 is thus instructed by the control section 231 to issue the pseudo response command for the CONNECT command, the response generating section 236 generates the pseudo response command, which is equivalent to a SUCCESS command that is the response command for the CONNECT command, and that is in compliance with the OBEX standard, i.e., the standard of the layer just above the lower layer processing section 23. Then, the response generating section 236 sends the pseudo response command to the multiplexer 237.

Meanwhile, in cases where a response command is sent from the server before the predetermined time has passed since the timer 238 started measuring time, the receiving section 25 receives the data (including the response command) from the server device, and sends the data to the lower layer processing section 23.

The data received from the receiving section 25 is subjected to data analysis carried out by the response receiving section 234 provided in the lower layer processing. Then, the response receiving section 234 notifies the control section 231 that the response command for the connection request has been received, and removes header information from the received data, and sends the data to the multiplexer 237.

When the response receiving section 234 notifies the control section 231 that the response command for the connection request has been received, the control section 231 controls the multiplexer 237 such that the multiplexer 237 will send, to the response notifying section 235, the data received from the response receiving section 234. In accordance with the control signal from the control section 231, the multiplexer 237 carries out switching such that the data from the response receiving section 234 or the response generating section 236 will be sent to the response notifying section 235. As a result, the data is sent to the response notifying section 235.

When being so notified by the control section 231 as to issue the response command, the response notifying section 235 sends the response command, received from the multiplexer 237, to the OBEX layer processing section 22 just above the lower layer processing section 23. From the layer just below the OBEX layer, the response receiving section 223 provided in the OBEX layer processing section 22 receives the response command for the CONNECT command, and notifies the control section 221 that the response command for the CONNECT command has been received.

When the response receiving section 223 thus notifies the control section 221 that the response command for the CONNECT command has been received, the control section 221 notifies the layer just above the OBEX layer, i.e., the application layer processing section 21 that the connecting with the target device has been done. In this way, the application layer processing section 21 confirms that the connecting with the target device (server device) has been attained, so that it is possible to start exchanging objects therewith.

In the description herein, the Tiny TP layer, the IrLMP layer, and the IrLAP layer are expressed as one block, i.e., the lower layer processing section 23. However, each layer may constitute one block. Further, in FIG. 6, the pseudo response command to be sent to the OBEX layer processing section 22 is generated in the Tiny TP layer just below the OBEX layer processing section 22. However, the pseudo response command may be generated in other layer such as the IrLMP layer or the IrLAP layer. However, as described above, it is preferable that the pseudo response command to be sent to the OBEX layer processing section 22 be generated in the Tiny TP layer just below the OBEX layer processing section 22, because extra header information does not need to be rendered to the pseudo response command, and does not need to be removed therefrom.

After the establishment of the connection, PUT commands are sent from the client device 2 to the target device for the sake of sending the object data to the target device, and a DISCONNECT command is sent thereto for the sake of carrying out a process of disconnecting the client device 2 from the target device. As is the case with the above CONNECT command, pseudo response commands for the PUT commands and the DISCONNECT command are generated in the layer below the OBEX layer. This makes it possible to transfer the object data from the client device 2 to the target device, and makes it possible to carry out the process of disconnecting the client device 2 from the target device. Further explanation thereof is omitted here.

As described above, the client device 2 of the present embodiment has such a function that: in cases where a predetermined time has passed since a request command was issued from (i) the layer using the object exchange use protocol to (ii) a layer below the layer and where no response to the request command is received from the server device that is a target device, a pseudo response command for the request command is generated, in the layer below the layer using the object exchange use protocol, so as to comply with the object exchange use protocol, and the pseudo response command is notified to the layer using the object exchange use protocol.

This makes it possible to exchange objects with a server having a transmitting function by using the conventional request command and the response command, and with the server 5 having no transmitting function in the following manner: the pseudo response command is generated in a lower layer of the client device 2, and the pseudo response command thus generated is notified to the layer above the lower layer, with the result that the communication starts and is maintained between the client device 2 and the server device 5. This makes it possible to carry out the object exchange therebetween.

Embodiment 3

Figure 10:
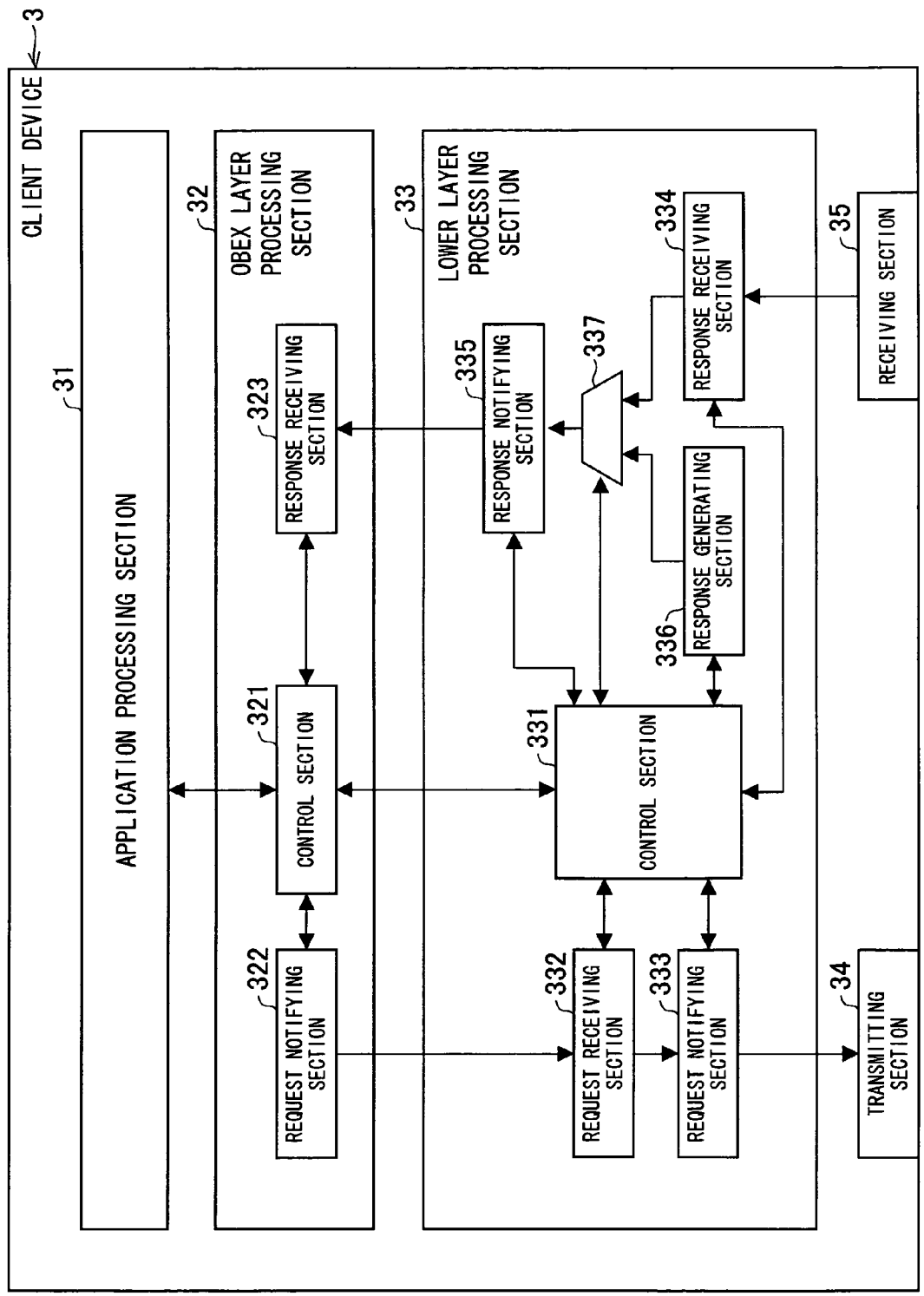
FIG. 10 is a block diagram illustrating a structure of a client device of a communication system of Embodiment 3 according to the present invention.

The following explains a client device (communication device) of a data transferring system (communication system) according to Embodiment 3 of the present invention, with reference to FIG. 10. Note that wordings (inclusive of a member and a function) defined in the other embodiments are used in the same manner in the present embodiment, unless otherwise noted.

FIG. 10 is a block diagram illustrating a structure of the client device of the present embodiment. As shown in FIG. 10, such a client device 3 includes an application layer processing section 31, an OBEX layer processing section (object exchange layer processing section) 32, a lower layer processing section 33, a transmitting section 34, and a receiving section 35, which have the same functions as those of the client device 1 shown in FIG. 1, respectively.

In response to a user's instruction inputted via an operation section (not shown), the application layer processing section 31 requests the OBEX layer processing section 32 to issue a request command. Further, when the application layer processing section 31 is notified by the OBEX layer processing section 32 that a response command has been received, the application layer processing section 31 carries out a predetermined process in accordance with the received response command.

The OBEX layer processing section 32 includes a control section 321, a request notifying section 322, and a response receiving section 323. In response to a request from the application layer processing section 31, the control section 321 notifies the request notifying section 322 to generate a request command and issue the request command (the connection request, the data transfer request, the final data transfer request, the disconnection request, or the like) to the lower layer processing section. Further, when the control section 321 is notified of a response command reception result from the response receiving section 323, the control section 321 notifies the response command reception result to the application layer processing section 31.

When the request notifying section 322 is notified by the control section 321 to issue a request command, the request notifying section 322 generates the request command, and sends the request command to the lower layer processing section 33. The response receiving section 323 receives a response command from the lower layer processing section 33, and analyzes the received response command, and notifies the control section 321 of (i) a result of the command analysis, and (ii) the reception of the response command.

The lower layer processing section 33 includes a control section (lower layer control section) 331, a request receiving section 332, a request notifying section 333, a response receiving section 334, a response notifying section 335, a response generating section 336, and a multiplexer 337.

The control section 331 controls the respective blocks, i.e., the request receiving section 332, the request notifying section 333, the response receiving section 334, the response notifying section 335, the response generating section 336, and the multiplexer 337. Details thereof will be explained later.

The request receiving section 332 receives the request command from the OBEX layer processing section 32, and analyzes the request command, and notifies the control section 331 of (i) a result of the command analysis and (ii) the reception of the request command.

Further, the request receiving section 332 sends the received data to the request notifying section 333. When receiving a request command issue notification from the control section 331, the request notifying section 333 renders necessary header information to the received data so as to generate a request command. The request command thus generated is sent to the transmitting section 34.

When the response receiving section 334 receives data from the receiving section 35 provided below the lower layer processing section 33, the response receiving section 334 analyzes the received data. Then, the response receiving section 334 notifies the control section 331 of (i) a result of the command analysis and (ii) the reception of the response command. Further, the response receiving section 334 removes header information from the received response command, and sends the response command to the multiplexer 337.

The multiplexer 337 receives the response command, and sends the response command to the response notifying section 335, and the response notifying section 335 sends the response command to the OBEX layer processing section 32.

When the response generating section 336 receives a response command generation notification from the control section 331, the response generating section 336 generates the same pseudo response command as that of each of Embodiments 1 and 2, and sends the pseudo response command to the multiplexer 337.

In accordance with a control signal from the control section 331, the multiplexer 337 carries out switching such that either (i) the pseudo response command generated by the response generating section 336 or (ii) the response command sent from the layer below the lower layer processing section 33 via the response receiving section 334 will be sent to the response notifying section 335.

In response to the request command issue notification from the OBEX layer processing section 32 above the lower layer processing section 33, the control section 331 determines whether (i) a response command for the request command is to be received from the server device, or (ii) a pseudo response command equivalent to the response command for the request command is to be so generated as to comply with the OBEX standard and is to be notified to the OBEX layer. In other words, in accordance with a type of request command (connection request, data transfer request, final data transfer request, disconnection request, etc.) to be issued in response to the request command issue notification from the OBEX layer processing section 32, the control section 331 carries out a process of selecting whether (i) a response command for the request command is to be received from the server device, or (ii) a response command generation notification is to be sent to the response generating section 336.

In cases where the control section 331 determines that a response command for the request command is to be received from the server device, the control section 331 controls the multiplexer 337 such that the response command to be sent from the server via the receiving section and the response receiving section 334 will be sent to the response notifying section 335. On the other hand, in cases where the control section 331 determines the generation of the pseudo response command, the control section 331 controls the response generating section 336 and the multiplexer 337 such that the pseudo response command will be sent to the response notifying section 335.

The transmitting section 34 receives the request command from the lower layer processing section 33, and transmits the response command to outside via an infrared communication path. The receiving section 35 receives the response command from the target device (server device) via the infrared communication path, and sends the received response command to the lower layer processing section 33.

Explained next is a procedure (communication method) of a data transferring process between the client device and the server device in Embodiment 3 of the present invention, with reference to (i) a sequence shown in FIG. 12 and (ii) FIG. 10.

Figure 12:
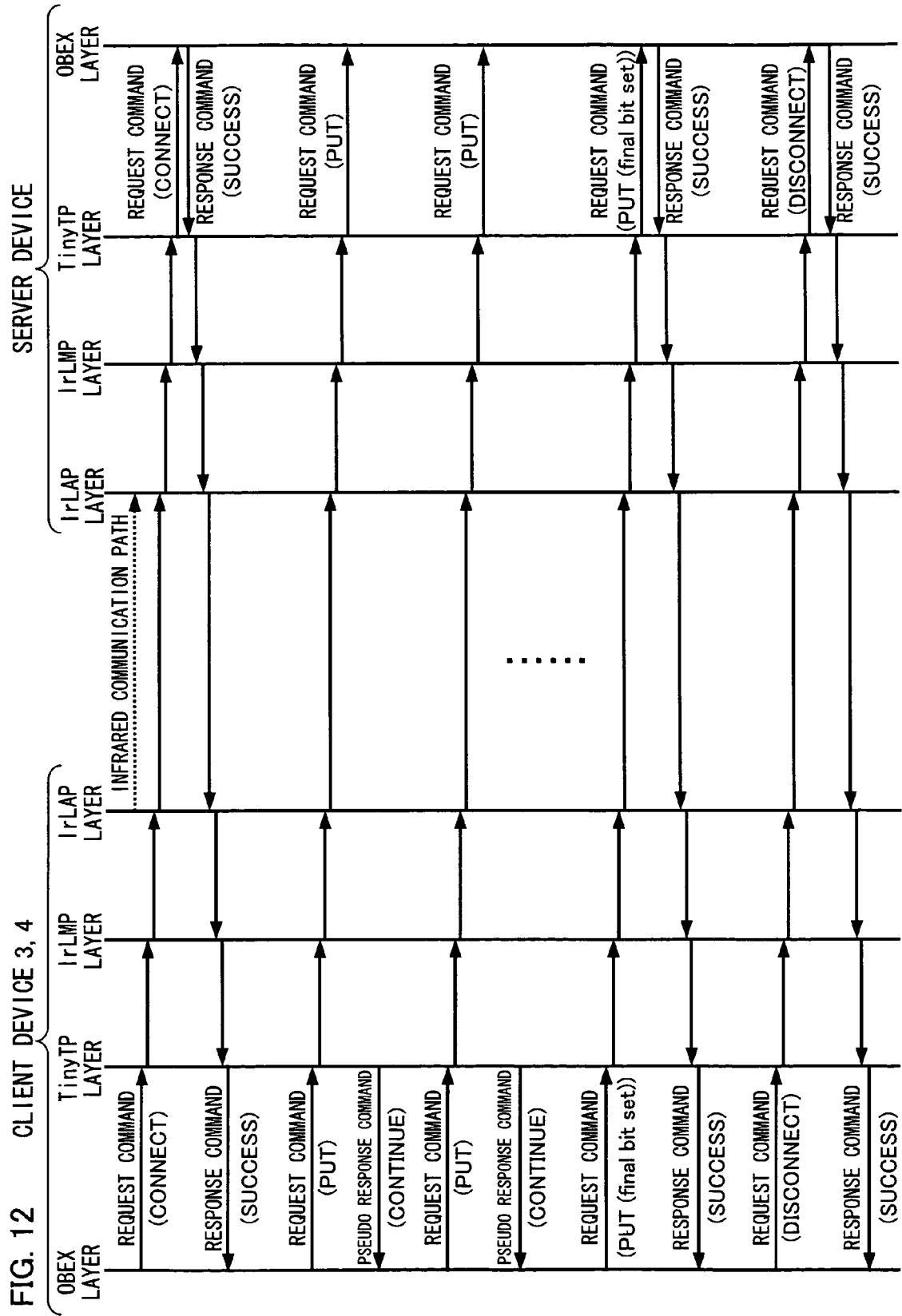
FIG. 12 is a sequence diagram illustrating a procedure of a data transferring process in each of Embodiments 3 and 4.

Note that FIG. 12 illustrates a case of carrying out connecting, data transfer, and a transferring process upon disconnecting, in the IrDA protocol stack.

When the application layer processing section 31 of the client device 3 receives an object exchange instruction from a user, the application layer processing section 31 requests the OBEX layer processing section 32 to sequentially carry out (i) connecting with the target device, i.e., the server device, (ii) data transferring thereto, and (iii) disconnecting therefrom.

In response to each of the requests from the application layer processing section 31, the control section 321 provided in the OBEX layer processing section 32 instructs the request notifying section 322 to generate a request command (connection request, data transfer request, final data transfer request, disconnection request, or the like) and to issue the generated request command to the lower layer processing section 33.

When the request notifying section 322 is thus instructed by the control section 321 to issue the request command, the request notifying section 322 generates the request command, and sends the request command to the lower layer processing section 33. The request receiving section 332 receives the request command from the OBEX layer processing section 32, and notifies the control section 331 that the request command has been received, and sends the received data to the request notifying section 333.

The control section 331 determines whether (i) a response command for the request command to be sent from the server device is to be received, or (ii) a pseudo response command equivalent to the response command is to be so generated as to comply with the OBEX standard and is to be notified to the OBEX layer. The determination is carried out in accordance with a control signal sent from the OBEX layer processing section 32. In this case, in accordance with a type of request command (connection request, data transfer request, final data transfer request, disconnection request, etc.) from the OBEX layer processing section 32, the control section 331 determines whether (i) a response command for the request command is to be received from the server, or (ii) a response command generation notification is to be sent to the response generating section 336.

In the present embodiment, the data transferring is carried out as follows. That is, in cases where a data transfer request sent from the layer above to the lower layer processing section 33 is not the final data transfer request, a pseudo response command equivalent to a response command for the request command is to be so generated as to comply with the OBEX standard and is to be notified to the OBEX layer. Specifically, in the case of the connection request command, the disconnection request command, and the final data transfer request command, the client device receives SUCCESS response commands from the server device in reply. On the other hand, in the case of the other request commands, the client device generates pseudo response commands respectively equivalent to CONTINUE response commands, and each of the pseudo response commands thus generated is notified to the OBEX layer.

When the control section 331 is notified by the request receiving section 332 that the request command has been received, the control section 331 instructs the request notifying section 333 to issue the request command to the request notifying section 333. When the request notifying section 333 is thus instructed by the control section 331 to issue the request command, the request notifying section 333 renders header information to the data received from the request receiving section 332, and sends the request command to the transmitting section 34. Then, the request notifying section 333 notifies the control section 331 that the sending of the request command has been done.

When the control section 331 is thus notified by the request notifying section 333 that the sending of the request command has been done and when the data transfer request notified from the layer above is not the final data transfer request, the control section 331 instructs the response generating 336 to issue a pseudo CONTINUE command for the PUT command. Then, the control section 331 controls the multiplexer 337 such that the pseudo CONTINUE command for the PUT command will be sent from the request generating section 336 to the response notifying section 335.

When the response generating section 336 is thus instructed by the control section 331 to issue the pseudo CONTINUE response command for the PUT command, the response generating section 336 generates the pseudo response command for the PUT command such that the pseudo response command is in compliant with the OBEX standard, i.e., the standard of the layer above the lower layer processing section 33.

On the other hand, in cases where the control section 331 receives the connection request, the disconnection request, and the final data transfer request, the control section 331 controls the multiplexer 337 such that the multiplexer 337 will carry out the normal receiving process, i.e., such that the multiplexer 337 will send, to the response notifying section 335, the request command received from the server device in reply to each of the request commands.

On this occasion, the request receiving section 334 provided in the lower layer processing section 33 analyzes the data received from the receiving section 35, and notifies the control section 331 that the response command for the request command has been received. Moreover, the request receiving section 334 removes header information therefrom, and sends the received data to the multiplexer 337.

When the response receiving section 334 notifies the control section 331 that the response command for the connection request has been received, the control section 331 controls the multiplexer 337 such that the multiplexer 237 will send, to the response notifying section 335, the data received from the response receiving section 234. In accordance with the control signal from the control section 331, the multiplexer 337 carries out switching such that the data from the response receiving section 334 or the response generating section 336 will be sent to the response notifying section 335. As a result, the data is sent to the response notifying section 335.

When being notified by the control section 331 to issue the response command, the response notifying section 335 sends the response command, received from the multiplexer 337, to the OBEX layer processing section 32 just above the lower layer processing section 33. From the layer just below the OBEX layer, the response receiving section 323 provided in the OBEX layer processing section 32 receives the response command for the request command, and notifies the control section 321 that the response command for the request command has been received.

When the control section 321 is thus notified by the response receiving section 323 that the response command for the request command has been received, the control section 321 notifies the application layer processing section 31, provided above the OBEX layer processing section 32, that the connecting with the target device, the data transferring thereto, or the disconnection therefrom has been done. In this way, the application layer processing section 31 confirms that the connecting with the target device (server device), the data transferring thereto, or the disconnection therefrom has been done. Thus, the object exchange with the server device is completed with such confirmation.

In the description herein, the Tiny TP layer, the IrLMP layer, and the IrLAP layer are expressed as one block, i.e., the lower layer processing section 33. However, each layer may constitute one block. Further, in FIG. 10, the pseudo response command to be sent to the OBEX layer processing section 32 is generated in the Tiny TP layer just below the OBEX layer processing section 32. However, the pseudo response command may be generated in other layer such as the IrLMP layer or the IrLAP layer. However, as described above, it is preferable that the pseudo response command to be sent to the OBEX layer processing section 12 be generated in the Tiny TP layer just below the OBEX layer processing section 32, because extra header information does not need to be rendered to the pseudo response command, and does not need to be removed therefrom.

As described above, the client device 3 of the present embodiment has a function of determining, according to a type of request command issued by the layer using the object exchange use protocol, whether (i) a response for a request command will be received from the target device or (ii) a pseudo response command equivalent to the response command for the request command will be so generated, in the layer below the layer using the object exchange use protocol, as to comply with the object exchange use protocol and will be notified to the layer using the object exchange use protocol.

With this, response commands are received from the server device only in reply to a connection request, a disconnection request, and a final data transfer request. By receiving such minimally required response commands from the server device, reliability of communication is secured. Further, it is not necessary to carry out a process of receiving response commands for data transfer requests except the final data transfer request. This allows reduction of a circuit scale of the client device.

Embodiment 4

Figure 11:
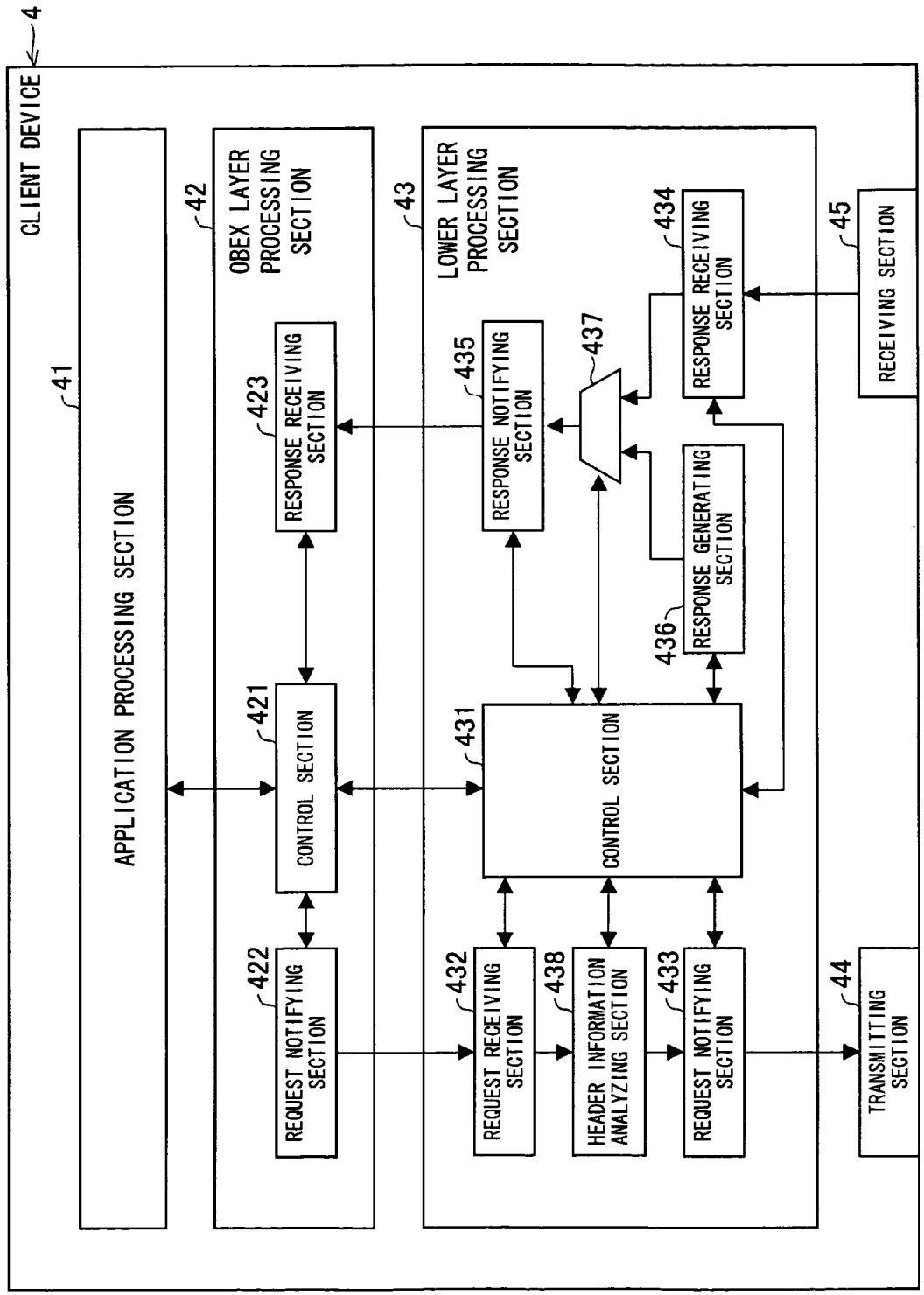
FIG. 11 is a block diagram illustrating a structure of a client device of a communication system of Embodiment 4 according to the present invention.

The following explains a client device (communication device) of a data transferring system (communication system) according to Embodiment 4 of the present invention, with reference to FIG. 11. Note that wordings (inclusive of a member and a function) defined in the other embodiments are used in the same manner in the present embodiment, unless otherwise noted.

FIG. 11 is a block diagram illustrating a structure of the client device of the present embodiment. As shown in FIG. 11, such a client device 4 includes an application layer processing section 41, an OBEX layer processing section (object exchange layer processing section) 42, a lower layer processing section 43, a transmitting section 44, and a receiving section 45, which have the same functions as those of the client device 1 shown in FIG. 1, respectively.

In response to a user's instruction inputted via an operation section (not shown), the application layer processing section 41 requests the OBEX layer processing section 42 to issue a request command. Further, when the application layer processing section 41 is notified by the OBEX layer processing section 42 that a response command has been received, the application layer processing section 41 carries out a predetermined process in accordance with the received response command.

The OBEX layer processing section 42 includes a control section 421, a request notifying section 422, and a response receiving section 423. In response to a request from the application layer processing section 41, the control section 421 notifies the request notifying section 422 to generate a request command and issue the request command to the lower layer processing section. Further, when the control section 421 is notified of a response command reception result from the response receiving section 423, the control section 421 notifies the response command reception result to the application layer processing section 41.

When the request notifying section 422 is notified by the control section 421 to issue a request command, the request notifying section 422 generates the request command, and sends the request command to the lower layer processing section 43. The response receiving section 423 receives a response command from the lower layer processing section 43, and analyzes the received response command, and notifies the control section 421 of (i) a result of the command analysis, and (ii) the reception of the response command.

The lower layer processing section 43 includes a control section (lower layer control section) 431, a request receiving section 432, a request notifying section 433, a response receiving section 434, a response notifying section 435, a response generating section 436, a multiplexer 437, and a header information analyzing section 438.

The control section 431 controls the respective blocks, i.e., the request receiving section 432, the request notifying section 433, the response receiving section 434, the response notifying section 435, the response generating section 436, the multiplexer 437, and the header information analyzing section 438. Details thereof will be explained later.

The request receiving section 432 receives the request command from the OBEX layer processing section 42, and analyzes the request command, and notifies the control section 431 of (i) a result of the command analysis and (ii) the reception of the request command. Further, the request receiving section 432 sends the received data to the header information analyzing section 438.

The header information analyzing section 438 analyzes header information of the request command received from the request receiving section 432, in order to judge whether (i) a response command is to be received from the server device in reply to the request command or (ii) a pseudo response command equivalent to the response command for the request command is to be so generated as to comply with the OBEX standard and is to be notified to the OBEX layer processing section 42 positioned above the lower layer processing section 43. Then, the header information analyzing section 438 notifies a result of the judgment to the control section 431. Moreover, the header information analyzing section 438 sends the received data to the request notifying section 433.

When receiving a request command issue notification from the control section 431, the request notifying section 433 renders necessary header information to the received data so as to generate a request command. The request command thus generated is sent to the transmitting section 44.

When the response receiving section 434 receives data from the receiving section 45, the response receiving section 434 analyzes the received data. Then, the response receiving section 434 notifies the control section 431 of (i) a result of the command analysis and (ii) the reception of the response command. Further, the response receiving section 434 removes header information from the received response command, and sends the response command to the multiplexer 437.

The multiplexer 437 receives the response command, and sends the response command to the response notifying section 435, and the response notifying section 435 sends the response command to the OBEX layer processing section 42.

When the response generating section 436 receives a response command generation notification from the control section 431, the response generating section 436 generates the same pseudo response command as that of Embodiment 1, and sends the pseudo response command to the multiplexer 437.

In accordance with a control signal from the control section 431, the multiplexer 437 carries out switching such that either (i) the pseudo response command generated by the response generating section 436 or (ii) the response command sent from the layer below the lower layer processing section 43 via the response receiving section 434 will be sent to the response notifying section 435.

The control section 431 is notified, by the request receiving section 432, of (i) the result of the command analysis and (ii) the reception of the request command. Further, the control section 431 is notified of the result of the judgment result) by the header information analyzing section 438. In cases where the judgment result thus notified indicates that a response command will be received from the server device in reply to the request command, the control section 431 controls the multiplexer 437 such that the response command to be received from the server device via the receiving section 45 and the response receiving section 434 will be sent to the response notifying section 435. On the other hand, in cases where the judgment result thus notified to the control section 431 indicates that a pseudo response command is to be generated, the control section 431 controls the response generating section 436 and the multiplexer 437 such that: the response generating section 436 generates the pseudo response command and the multiplexer 437 will sends the generated pseudo response command to the response notifying section 435. In other words, in accordance with the header information analyzed by the header information analyzing section 438, the control section 431 carries out a process of selecting whether (i) a response command is to be received from the server device in reply to the request command, or (ii) a pseudo response command equivalent to the response command for the request command is so generated as to comply with the OBEX standard and will be notified to the OBEX layer.

The transmitting section 44 receives the request command from the lower layer processing section 43, and transmits the response command to outside via an infrared communication path. The receiving section 45 receives a response command from the target device (server device) via an infrared communication path, and sends the received response command to the lower layer processing section 43.

Explained next is a procedure (communication method) of the data transferring process between the client device and the server device in Embodiment 4 of the present invention, with reference to (i) a sequence shown in FIG. 12 and (ii) FIG. 11. Note that FIG. 12 illustrates a case of carrying out connecting, data transfer, and a transferring process upon disconnecting, in the IrDA protocol stack.

When the application layer processing section 41 of the client device 4 receives an object exchange instruction from a user, the application layer processing section 41 requests the OBEX layer processing section 42 to sequentially carry out (i) connecting with the target device, i.e., the server device, (ii) data transferring thereto, and (iii) disconnecting therefrom.

In response to each of the requests from the application layer processing section 41, the control section 421 provided in the OBEX layer processing section 42 instructs the request notifying section 422 to generate a request command and to issue the generated request command to the lower layer processing section 43.

When the request notifying section 422 is thus instructed by the control section 421 to issue a request command, the request notifying section 422 generates the request command, and sends the request command to the lower layer processing section 43. The request receiving section 432 receives the request command from the OBEX layer processing section 42, and notifies the control section 431 that the request command has been received, and sends the received data to the header information analyzing section 438.

The header information analyzing section 438 analyzes the request command received from the request receiving section 432. For example, by analyzing the Opcode of each of the OBEX request commands shown in Table 13 above, the header information analyzing section 438 may judge whether (i) a response command is to be received from the server device in reply to the request command, or (ii) a pseudo response command equivalent to the response command for the request command is to be so generated as to comply with the OBEX standard and is to be notified to the OBEX layer. In this case, it is assumed that: response commands for a CONNECT command (0x80), a DISCONNECT command (0x81), and a PUT command (0x82) to be sent the last will be received from the server device, and a pseudo response command equivalent to a response command for each of PUT commands (0x02) other than the CONNECT command, the DISCONNECT command, and the PUT command to be sent the last is to be so generated as to comply with the OBEX standard and the pseudo response command is to be notified to the OBEX layer.

When the control section 431 is notified by the request receiving section 432 that the request command has been received, the control section 431 instructs the request notifying section 433 to issue the request command. When the request notifying section 433 is thus instructed by the control section 431 to issue the request command, the request notifying section 433 renders header information to the data received from the request receiving section 432, and sends the request command to the transmitting section 44. Then, the request notifying section 433 notifies the control section 431 that the sending of the request command has been done.

In cases where the control section 431 is thus notified by the request notifying section 433 that the sending of the request command has been done and where the control section 431 is notified by the header information analyzing section 438 that the pseudo response command equivalent to the response command for the request command is to be so generated as to be comply with the OBEX standard, i.e., in cases where each of the PUT commands (0x02) other than the PUT command to be sent the last is received from the OBEX layer, the control section 431 instructs the response generating section 436 to issue a CONTINUE response command (hereinafter, also referred to as "pseudo CONTINUE response command"), which is the pseudo response command for the PUT command, and controls the multiplexer 437 such that the multiplexer 437 will send, to the response notifying section 435, the pseudo CONTINUE response command that is sent from the response generating section 436 and that is the pseudo response command for the PUT command.

When the response generating section 436 is thus instructed by the control section 431 to issue the pseudo CONTINUE response command for the PUT command, the response generating section 436 generates the pseudo CONTINUE response command for the PUT command such that the pseudo CONTINUE response command is compliant with the OBEX standard, which is the standard of the layer above the lower layer processing section 43. Then, the response generating section 436 sends the generated pseudo CONTINUE response command to the multiplexer 437.

On the other hand, in cases where the control section 431 is notified by the header information analyzing section 438 that the response command is to be received from the server device, i.e., in cases where each of the CONNECT command, the DISCONNECT command, and the PUT command to be sent the last is received from the OBEX layer, the control section 431 controls the multiplexer 437 such that the multiplexer 437 carries out the normal receiving process.

On this occasion, the request receiving section 434 provided in the lower layer processing section 43 analyzes the data received from the receiving section 45, and notifies the control section 431 that the response command for the request command has been received. Moreover, the request receiving section 434 removes header information therefrom, and sends the received data to the multiplexer 437.

When the response receiving section 434 notifies the control section 431 that the response command for the connection request has been received, the control section 431 controls the multiplexer 437 such that the multiplexer 437 will send, to the response notifying section 435, the data received from the response receiving section 434. In accordance with the control signal from the control section 431, the multiplexer 437 carries out switching such that the data from the response receiving section 434 or the response generating section 436 will be sent to the response notifying section 435. As a result, the data is sent to the response notifying section 435.

When being notified by the control section 431 to issue the response command, the response notifying section 435 sends the response command, received from the multiplexer 437, to the OBEX layer processing section 42 just above the lower layer processing section 43. From the layer just below the OBEX layer, the response receiving section 423 provided in the OBEX layer processing section 42 receives the response command for the request command, and notifies the control section 421 that the response command for the request command has been received.

When the control section 421 is thus notified by the response receiving section 423 that the response command for the request command has been received, the control section 421 notifies the application layer processing section 41, provided above the OBEX layer processing section 42, that the connecting with the target device has been done. In this way, the application layer processing section 41 confirms that the connecting with the target device (server device), the data transferring thereto, or the disconnection therefrom has been done. Thus, the object exchange with the server device is completed with such confirmation.

In the description herein, the Tiny TP layer, the IrLMP layer, and the IrLAP layer are expressed as one block, i.e., the lower layer processing section 43. However, each layer may constitute one block. Further, in FIG. 12, the pseudo response command to be sent to the OBEX layer processing section 42 is generated in the Tiny TP layer just below the OBEX layer processing section 42. However, the pseudo response command may be generated in other layer such as the IrLMP layer or the IrLAP layer. However, as described above, it is preferable that the pseudo response command to be sent to the OBEX layer processing section 42 be generated in the Tiny TP layer just below the OBEX layer processing section 42, because extra header information does not need to be rendered to the pseudo response command, and does not need to be removed therefrom.

As described above, the client device 4 of the present embodiment has a function of determining, according to a request command type found with reference to header information of a request command issued by the layer using the object exchange use protocol, whether (i) a response command for the request command will be received from the target device or (ii) a pseudo response command equivalent to the response command for the request command will be so generated, in the layer below the layer using the object exchange use protocol, as to comply with the object exchange use protocol and will be notified to the layer using the object exchange use protocol.

With this, response commands are received from the server device only in reply to a connection request, a disconnection request, and a final data transfer request. By receiving such minimally required response commands from the server device, reliability of communication is secured. Further, it is not necessary to carry out a process of receiving response commands for data transfer requests except the final data transfer request. This allows reduction of a circuit scale of the client device.

Embodiment 5

Figure 13:
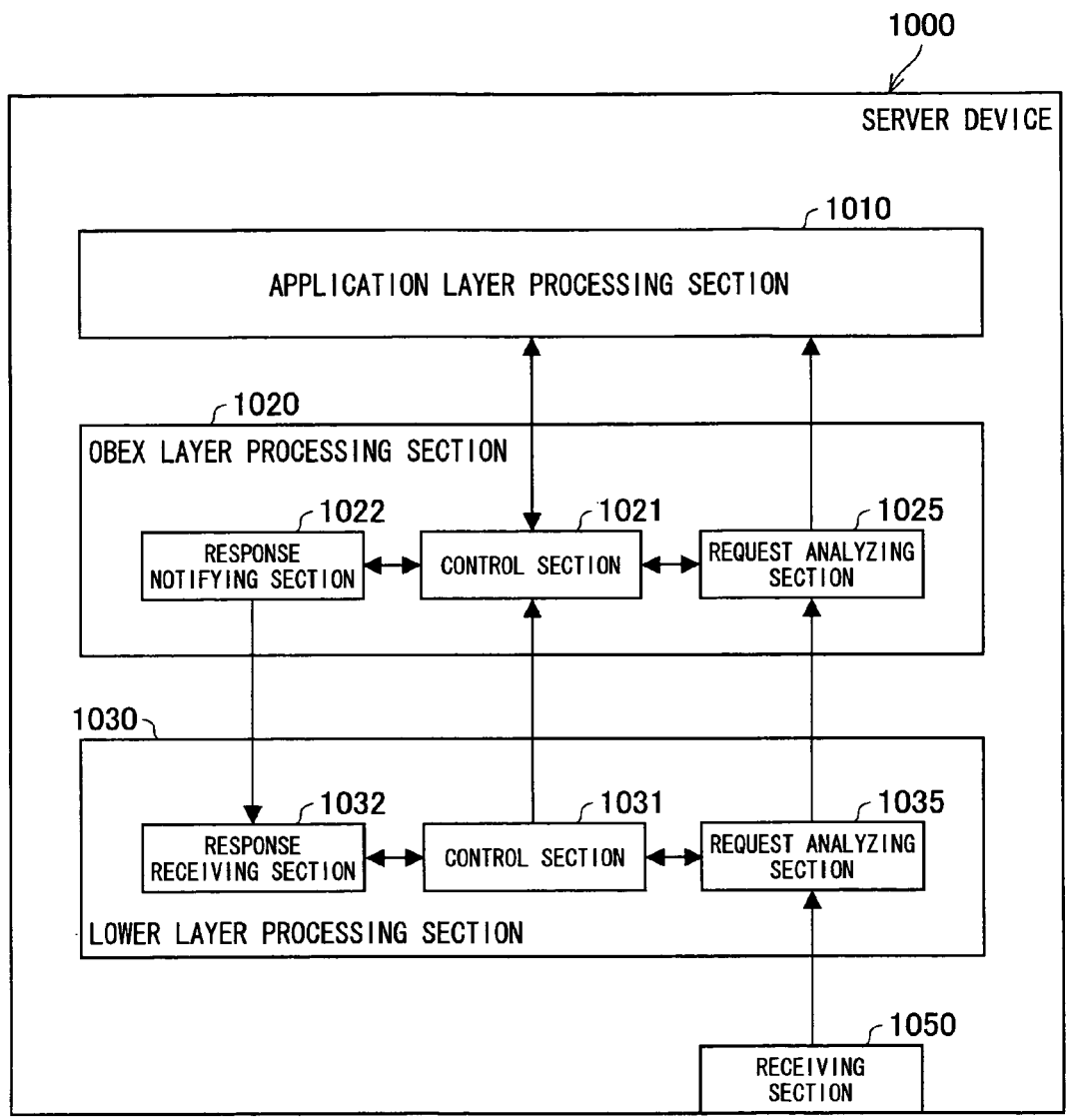
FIG. 13 is a block diagram illustrating a structure of a server device of a communication system of Embodiment 5 according to the present invention.
Figure 14:
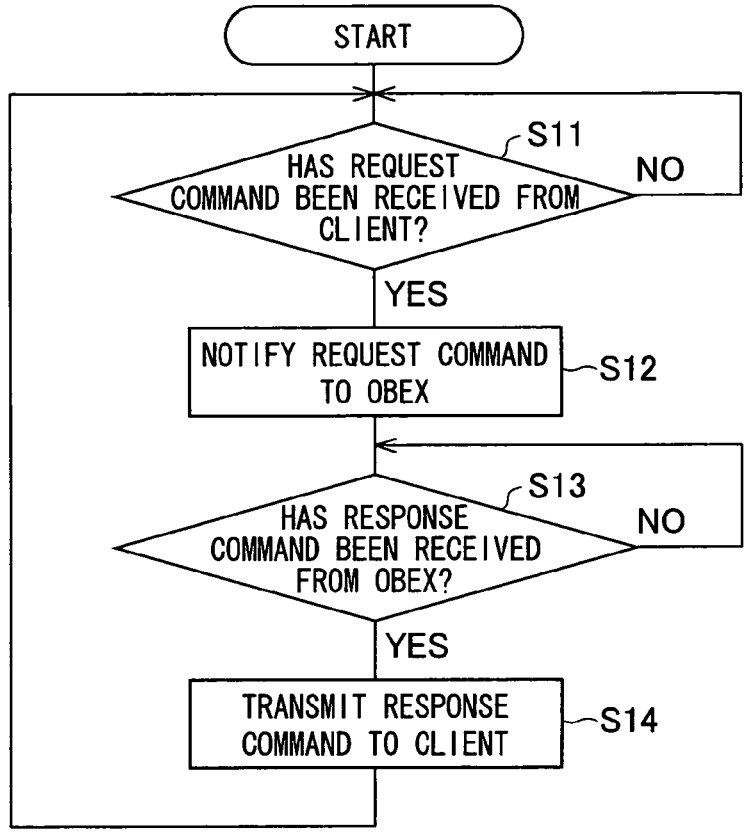
FIG. 14 is a flowchart illustrating an operation carried out by a lower layer processing section provided below an OBEX layer in a conventional server device.

The following explains a server device (communication device) of a data transferring system (communication system) according to Embodiment 5 of the present invention, with reference to FIG. 13. Note that wordings (inclusive of a member and a function) defined in the other embodiments are used in the same manner in the present embodiment, unless otherwise noted.

FIG. 13 is a block diagram illustrating a structure of the server device of the present embodiment. As shown in FIG. 13, such a server device (communication device) 1000 at least includes an application layer processing section 1010, an OBEX layer processing section (object exchange layer processing section) 1020, a lower layer processing section 1030, and a receiving section 1050.

In response to a user's instruction inputted via an operation section (not shown), the application layer processing section 1010 requests the OBEX layer processing section 1020 to process a request command. Further, when the application layer processing section 1010 is notified by the OBEX layer processing section 1020 that a request command has been received, the application layer processing section 1010 carries out a predetermined process in accordance with the received request command.

The OBEX layer processing section 1020 includes a control section 1021, a response notifying section 1022, and a request analyzing section 1025. In accordance with the request from the application layer processing section 1010 and an analysis result from the request analyzing section 1025, the control section 1021 notifies the response notifying section 1022 to generate a response command and to issue the response command to the layer below the OBEX layer processing section 1020. Further, when the control section 1021 is notified by the request analyzing section 1025 that a request command has been received, the control section 1021 notifies the request command reception result to the application layer processing section 1010.

When the response notifying section 1022 is notified by the control section 1021 to issue a response command, the response notifying section 1022 generates the response command and sends the generated response command to the lower layer processing section 1030. The request analyzing section 1025 receives a request command from the lower layer processing section 1030, and analyzes the request command thus received. Then, the request analyzing section 1025 notifies the control section 1021 of (i) a result of the command analysis and (ii) the reception of the request command.

The lower layer processing section 1030 includes a control section (lower layer control section) 1031, a response receiving section 1032, and a request analyzing section 1035.

The control section 1031 controls the response receiving section 1032 and the request analyzing section 1035. Details thereof will be described later.

The response receiving section 1032 receives a response command from the OBEX layer processing section 1020, and analyzes the command, and notifies the control section 1031 of (i) a result of the command analysis and (ii) the reception of the response command.

When the request analyzing section 1035 receives data transmitted from a client device via the receiving section 1050, the request analyzing section 1035 analyzes the received data. Then, the request analyzing section 1035 notifies the control section 1031 of (i) a result of the command analysis and (ii) the reception of the request command. Further, the request analyzing section 1035 removes header information from the received request command, and sends the request command to the OBEX layer processing section 1020.

Although the control section 1031 is notified of (i) the result of the command analysis and (ii) the reception of the response command by the response receiving section 1032, the received response command is never sent to the client device.

The receiving section 1050 receives a request command from the source device (client device) via an infrared communication path, and sends the received request command to the lower layer processing section 1030.

Explained next is an operation of a control section of a lower layer processing section below an OBEX layer, in a conventional server device. The explanation is made with reference to a flowchart shown in FIG. 14.

Step S11 is a step of judging whether or not a request command has been received from a client. In cases where it is judged that a request command has been received, the sequence goes to Step S12. On the other hand, in cases where it is judged that no request command has been received, the sequence goes to Step S11 again.

Step S12 is a step of notifying the received request command to the OBEX layer processing section. After finishing the notifying, the sequence goes to Step S13.

Step S13 is a step of judging whether or not a response command has been received from the OBEX layer processing section. In cases where it is judged that a response command has been received therefrom, the sequence goes to Step S14. On the other hand, in cases where it is judged that no response command has been received, the sequence goes to Step S13 again.

Step S14 is a step of transmitting, to the client device, the response command received form the OBEX layer. After finishing the transmitting, the sequence goes back to Step S11.

In this way, in the conventional server device, the lower layer processing section below the OBEX layer operates to send the request command to the OBEX layer and to receive the response command therefrom.

Such a lower layer processing section operating in the conventional manner performs the step of transmitting, to the client device, the response command received from the OBEX layer processing section. Therefore, in communication in which the transmission of the response command does not have to be carried out, the lower layer processing section wastes an electric power for the transmission of the response command.

Figure 15:
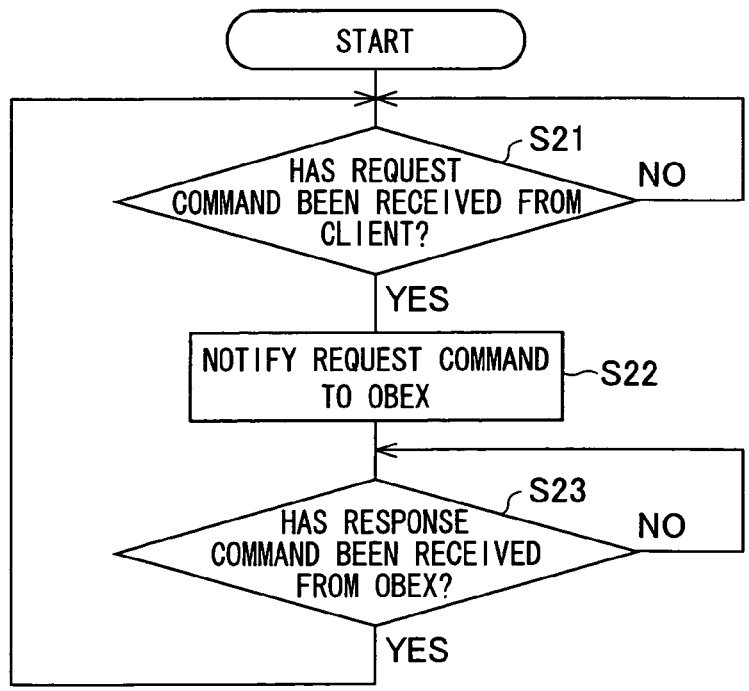
FIG. 15 is a flowchart illustrating an operation carried out by a lower layer processing section provided below an OBEX layer in the server device of the communication system of Embodiment 5.

In contrast, as shown in FIG. 15, the feature of the control section 1031 of the lower layer processing section 1030 of the present embodiment lies in that the control section 1031 does not have the step of transmitting the response command. With reference to a flowchart shown in FIG. 15, the following explains how the control section 1031 of the lower layer processing section 1030 of the present embodiment operates.

Step S21 is a step of judging whether or not a request command has been received from a client. In cases where it is judged that a request command has been received, the sequence goes to Step S22. On the other hand, in cases where it is judged that no request command has been received, the sequence goes to Step S21 again.

Step S22 is a step of notifying the received request command to the OBEX layer processing section 1020. After finishing the notifying, the sequence goes to Step S23.

Step S23 is a step of judging whether or not a response command has been received from the OBEX layer processing section 1020. In cases where it is judged that a response command has been received therefrom, the sequence goes to Step S21. On the other hand, in cases where it is judged that no response command has been received, the sequence goes to Step S23 again. Note that Step S23 may not be provided, and the sequence may go to Step S21 after the end of Step S22.

The control section 1031 operates as above. With this, the control section 1031 never causes the lower layer processing section 1030 to transmit any response command received from the OBEX layer processing section 1020. Further, as the OBEX layer processing section 1020, it is possible to use a conventional OBEX layer processing section that operates to issue a response command in reply to a request command. Therefore, existing resources can be still used.

Figure 16:
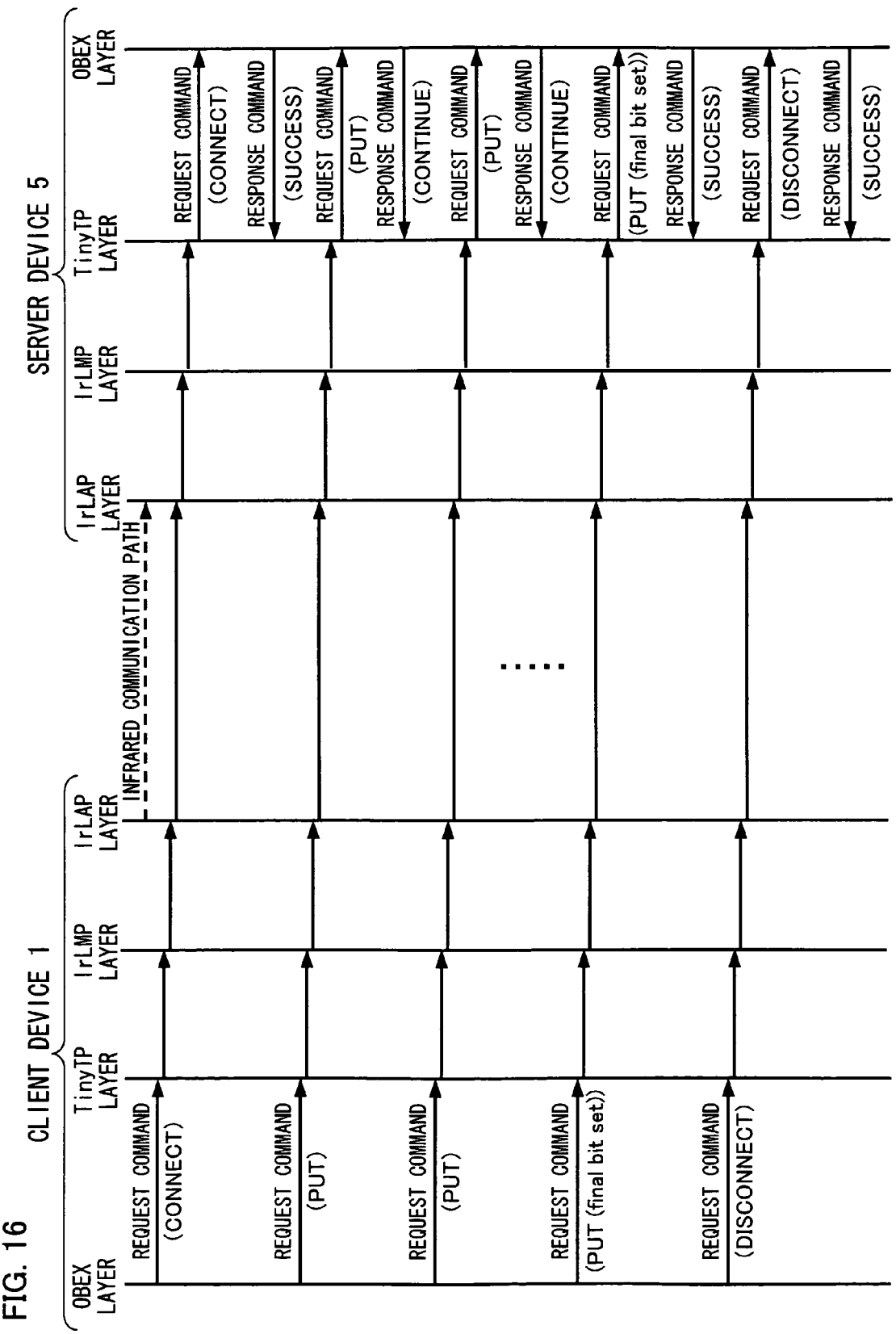
FIG. 16 is a sequence diagram illustrating a procedure of a data transferring process in Embodiment 5.

Next, FIG. 16 illustrates (i) sending of commands from the client device to the server device and (ii) how the server device reacts to the received commands, in the present embodiment.

As shown in FIG. 16, in the server device 1000, each response command for each request command sent from the client device is issued to the Tiny TP layer just below the OBEX layer processing section 1020, but the response command is never notified to the layers below the Tiny TP layer. With this, no response command is transmitted to the client device. Note that FIG. 16 describes the Tiny TP layer just below the OBEX layer as the lower layer processing section 1030 which carries out a process so as not to transmit the response command to the layers below the Tiny TP layer; however, the IrLMP layer or IrLAP layer each below the Tiny TP layer may be handled as the lower layer processing section 1030 which carries out the control.

Embodiment 6

The following explains a server device (communication device) of a data transferring system (communication system) according to Embodiment 6 of the present invention. Note that wordings (inclusive of a member and a function) defined in the other embodiments are used in the same manner in the present embodiment, unless otherwise noted.

Figure 17:
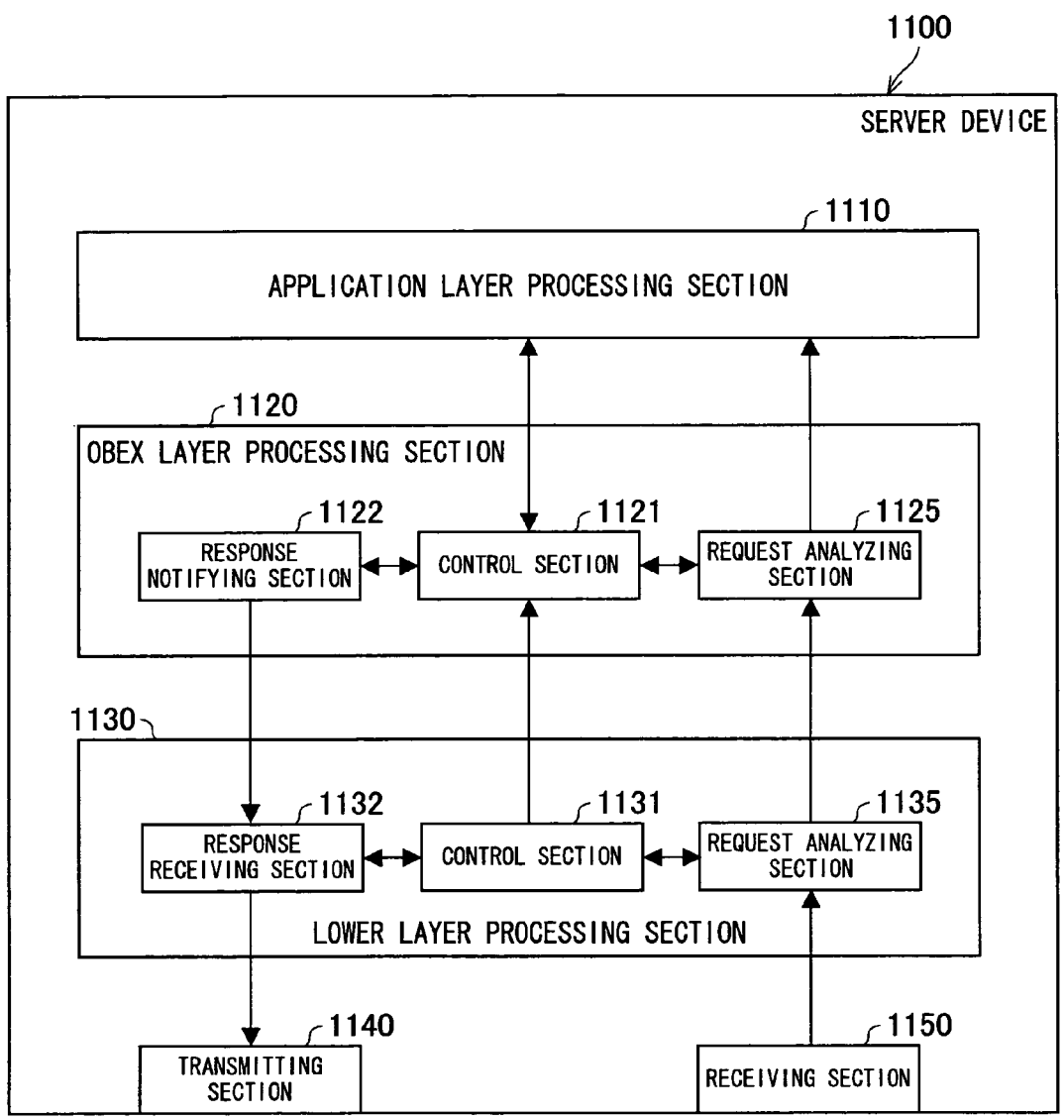
FIG. 17 is a block diagram illustrating a structure of a server device of a communication system of Embodiment 6 according to the present invention.

FIG. 17 is a block diagram illustrating a structure of the server device 1100 according to the present embodiment. The server device 1100 at least includes an application layer processing section 1110, an OBEX layer processing section 1120, a lower layer processing section 1130, a transmitting section 1140, and a receiving section 1150.

In response to a user's instruction inputted via an operation section (not shown), the application layer processing section 1110 requests the OBEX layer processing section 1120 to process a request command. Further, when the application layer processing section is notified by the OBEX layer processing section that a request command has been received, the application layer processing section 1110 carries out a predetermined process in accordance with the received request command.

The OBEX layer processing section 1120 includes a control section 1121, a response notifying section 1122, and a request analyzing section 1125. In accordance with the request from the application layer processing section and an analysis result from the request analyzing section 1125, the control section 1121 notifies the response notifying section 1122 to generate a response command and to issue the response command to the layer below the OBEX layer processing section 1120. Further, when the control section 1121 is notified by the request analyzing section 1125 that a request command has been received, the control section 1121 notifies the request command reception result to the application layer processing section 1110.

When the response notifying section 1122 is notified by the control section 1121 to issue a response command, the response notifying section 1122 generates the response command and sends the generated response command to the lower layer processing section 1130. The request analyzing section 1125 receives a request command from the lower layer processing section 1130, and analyzes the request command thus received. Then, the request analyzing section 1125 notifies the control section 1121 of (i) a result of the command analysis and (ii) the reception of the request command.

The lower layer processing section 1130 includes a control section (lower layer control section) 1131, a response receiving section 1132, and a request analyzing section 1135.

The control section 1131 controls the response receiving section 1132 and the request analyzing section 1135. Details thereof will be described later.

The response receiving section 1132 receives a response command from the OBEX layer processing section 1120, and analyzes the command, and notifies the control section 1131 of (i) a result of the command analysis and (ii) the reception of the response command.

When the request analyzing section 1135 receives data transmitted from a client device via the receiving section 1150, the request analyzing section 1135 analyzes the received data. Then, the request analyzing section 1135 notifies the control section 1131 of (i) a result of the command analysis and (ii) the reception of the request command. Further, the request analyzing section 1135 removes header information from the received request command, and sends the request command to the OBEX layer processing section 1120.

Although the control section 1131 is notified of (i) the result of the command analysis and (ii) the reception of the response command by the response receiving section 1132, the received response command is never sent to the client device.

The transmitting section 1140 receives the request command from the lower layer processing section 1130, and sends the request command to outside via an infrared path.

The receiving section 1150 receives a request command from the source device (client device) via the infrared communication path, and sends the received request command to the lower layer processing section 1130.

Figure 18:
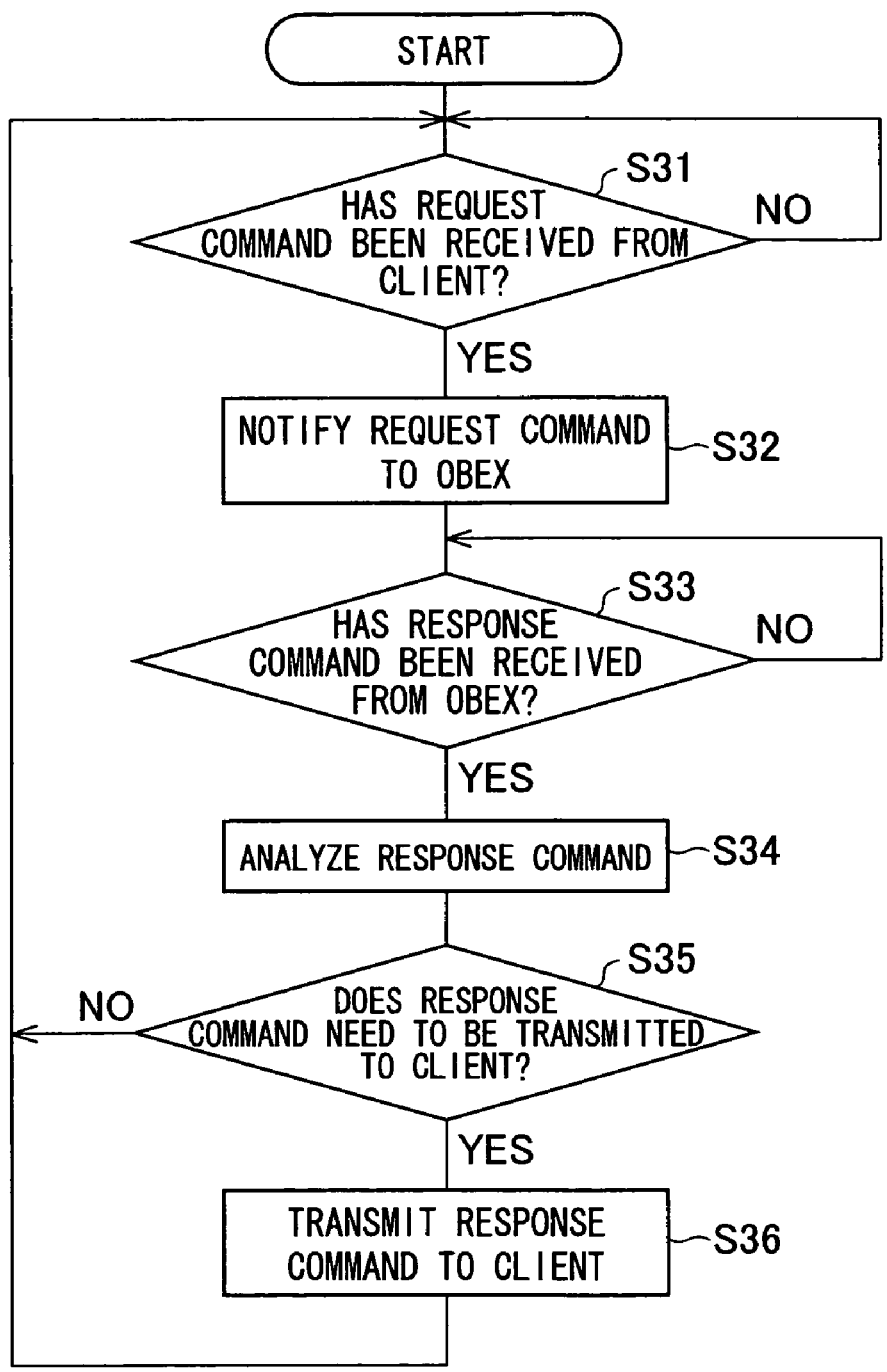
FIG. 18 is a flowchart illustrating an operation carried out by a lower layer processing section provided below an OBEX layer in the server device of the communication system of Embodiment 6.

With reference to a flowchart shown in FIG. 18, the following explains how the control section 1131 of the lower layer processing section 1130 of the present embodiment operates.

Step S31 is a step of judging whether or not a request command has been received from a client device. In cases where it is judged that a request command has been received, the sequence goes to Step S32. On the other hand, in cases where it is judged that no request command has been received, the sequence goes to Step S31 again.

Step S32 is a step of notifying the received request command to the OBEX layer processing section 1120. After finishing the notifying, the sequence goes to Step S33.

Step S33 is a step of judging whether or not a response command has been received from the OBEX layer processing section 1120. In cases where it is judged that a response command has been received therefrom, the sequence goes to Step S34. On the other hand, in cases where it is judged that no response command has been received, the sequence goes to Step S33 again.

Step S34 is a step of analyzing the response command received from the OBEX layer processing section 1120. After finishing the analysis, the sequence goes to Step S35.

Step S35 is a step of judging whether or not the result of the analysis in Step S34 indicates that the response command received from the OBEX layer processing section 1120 needs to be transmitted to the client. In cases where it is judged that transmission of the response command is required, the sequence goes to Step S36. On the other hand, in cases where it is judged that the transmission is not required, the sequence goes to Step S31. Therefore, carried out in Step S35 is selection by which, e.g., CONTINUE response commands for PUT commands in OBEX are not transmitted but only SUCCESS response commands are transmitted.

Step S36 is a step of transmitting the response command to the client device. After finishing the transmission, the sequence goes to Step S31.

The above process carried out by the lower layer processing section 1130 of the server 1100 makes it possible to carry out such a process as not to transmit only a particular response command. Further, it is possible to use the conventional OBEX layer processing section, which issues a response command for a request command. Therefore, existing resources can be still used.

Figure 19:
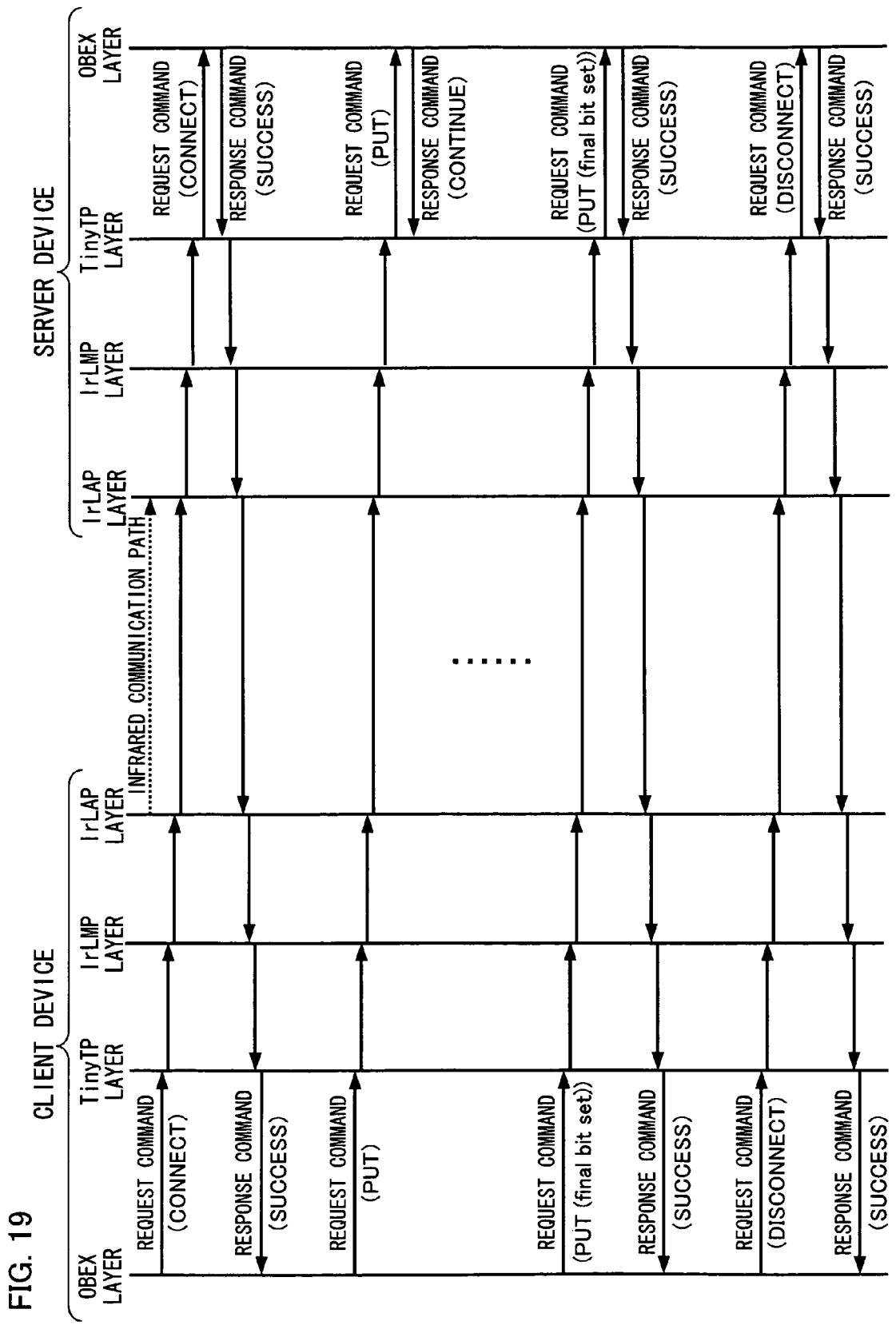
FIG. 19 is a sequence diagram illustrating a procedure of a data transferring process in Embodiment 6.

Next, FIG. 19 illustrates command exchange between the client device and the server device in the present embodiment.

As shown in FIG. 19, even though a particular response command (CONTINUE command shown in FIG. 19) for a request command sent from the client device is issued to the Tiny TP layer below the OBEX layer processing section 1120 of the server device 1100, the response command is not further notified from the Tiny TP layer to the layers below the Tiny TP layer. With this, such a particular response command is never sent to the client device. Note that FIG. 19 describes the Tiny TP layer just below the OBEX layer as the lower layer processing section 1130 which carries out such a process as not to transmit the particular response command to the layers below the Tiny TP layer; however, the IrLMP layer or IrLAP layer each below the Tiny TP layer may be handled as the lower layer processing section 1030 which carries out the control.

Further, another operation of the lower layer processing section 1130 will be described with reference to a flowchart of FIG. 20.

Step S41 is a step of judging whether or not a request command has been received from the client device. In cases where it is judged that a request command has been received, the sequence goes to Step S42. On the other hand, in cases where it is judged that no request command has been received, the sequence goes to Step S41 again.

Step S42 is a step of notifying the received request command to the OBEX layer processing section 1120. After finishing the notifying, the sequence goes to Step S43.

Step S43 is a step of judging whether or not a response command has been received from the OBEX layer processing section 1120. In cases where it is judged that a response command has been received therefrom, the sequence goes to Step S44. On the other hand, in cases where it is judged that no response command has been received, the sequence goes to Step S43 again.

Step S44 is a step of analyzing header of the response command received from the OBEX layer processing section 1120. Carried out in Step S34 is to judge whether or not, e.g., the response command is a CONTINUE response command for a non-final PUT command. Specifically, the judgment is carried out by judging whether the first byte of the response command received from the OBEX layer processing section 1120 is CONTINUE (0x10 or 0x90) or SUCCESS (0x20 or 0xA0). After finishing the analysis, the sequence goes to Step S45.

Step S45 is a step of judging whether or not the result of the analysis in Step S44 indicates that the response command received from the OBEX layer processing section 1120 needs to be transmitted to the client. In cases where it is judged that the transmission of the response data is required, the sequence goes to Step S46. On the other hand, in cases where it is judged that the transmission is not required, the sequence goes to Step S41. Therefore, carried out in Step S45 is selection by which, e.g., CONTINUE response commands for PUT commands in OBEX are not transmitted but only SUCCESS response commands are transmitted.

Step S46 is a step of transmitting the response command to the client device. After finishing the transmission, the sequence goes to Step S41.

The above process carried out by the lower layer processing section 1130 of the server device 1100 makes it possible to carry out such a process as not to transmit only a particular response command. Further, it is possible to use the conventional OBEX layer processing section, which issues a response command for a request command. Therefore, existing resources can be still used.

Figure 20:
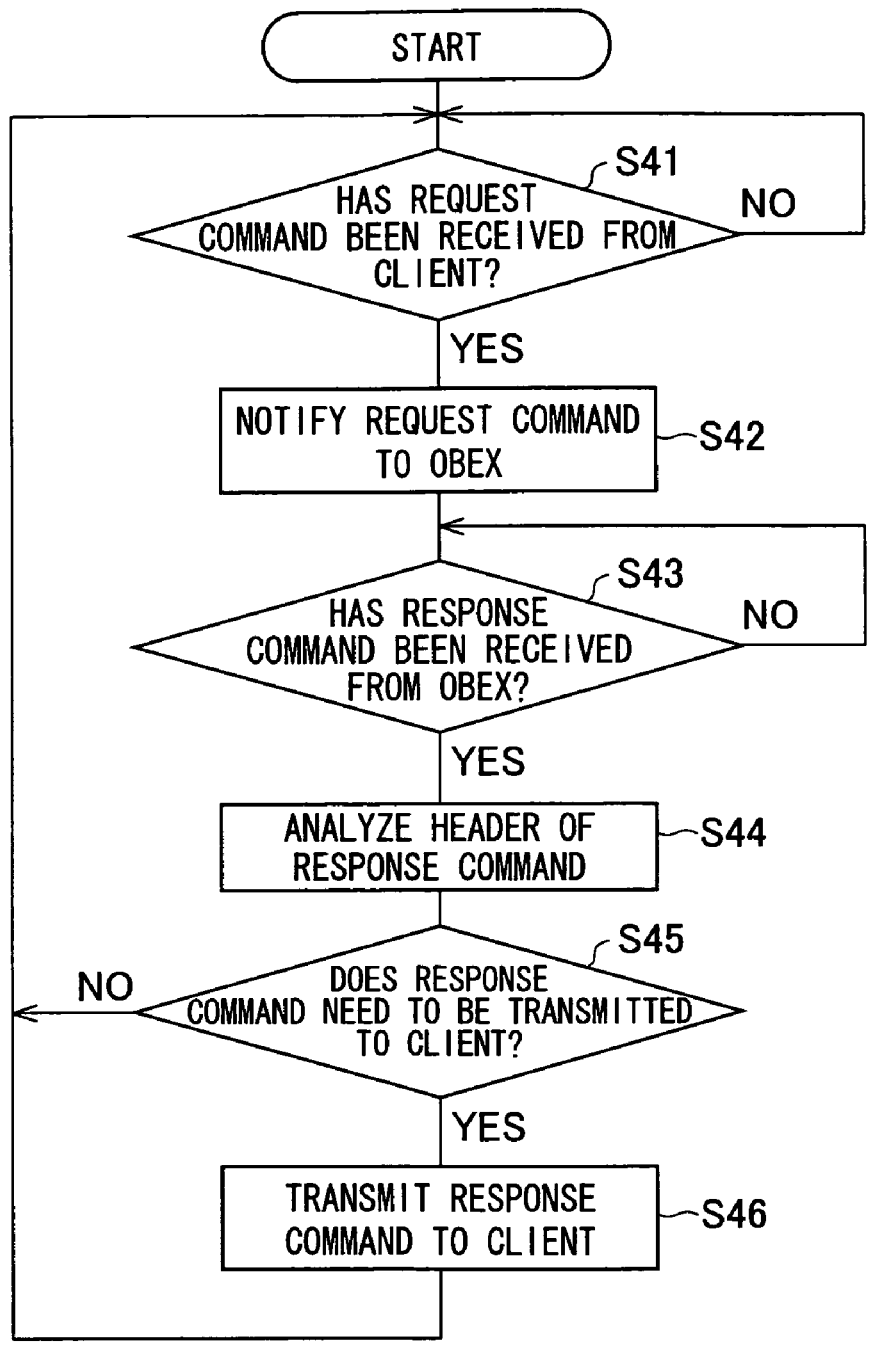
FIG. 20 is a flowchart illustrating another operation carried out by the lower layer processing section provided below the OBEX layer in the server device of the communication system of Embodiment 6.

Note that, in cases where the lower layer processing section 1130 operates as shown in FIG. 20, the command exchange is also carried out between the client device and the server device as shown in the sequence of FIG. 19.

That is, as shown in FIG. 19, even though a particular response command (CONTINUE command shown in FIG. 19) for a request command sent from the client device is issued to the Tiny TP layer below the OBEX layer processing section 1120 of the server device 1100, the response command is not further notified from the Tiny TP layer to the layers below the Tiny TP layer. With this, such a particular response command is never sent to the client device. Note that FIG. 19 describes the Tiny TP layer just below the OBEX layer as the lower layer processing section 1130 which carries out such a process as not to transmit the particular response command to the layers below the Tiny TP layer; however, the IrLMP layer or IrLAP layer each below the Tiny TP layer may be handled as the lower layer processing section 1030 which carries out the control.

Embodiment 7

The following explains a client device (communication device) of a data transferring system (communication system) according to Embodiment 7 of the present invention. Note that wordings (inclusive of a member and a function) defined in the other embodiments are used in the same manner in the present embodiment, unless otherwise noted.

Figure 21:
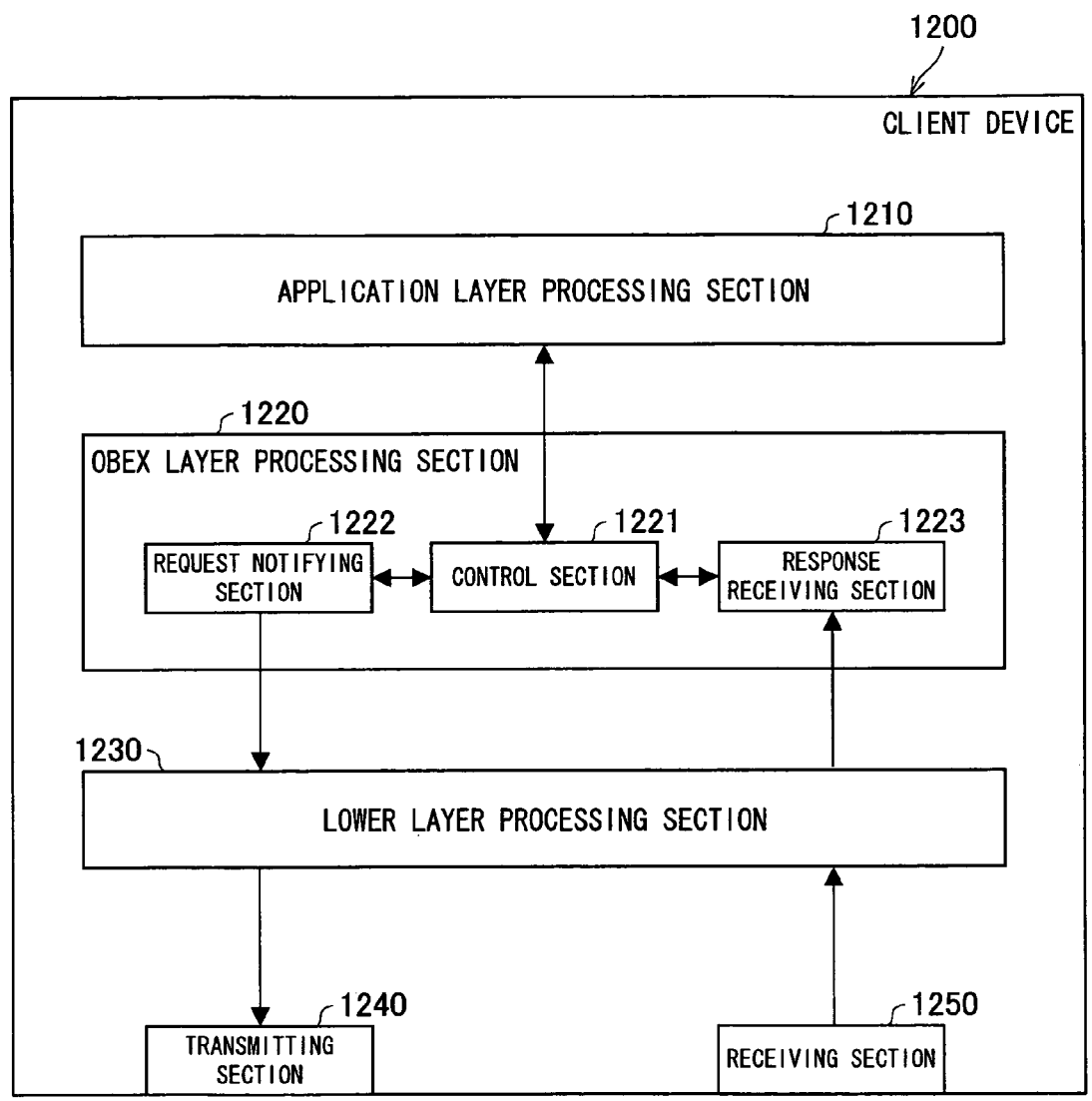
FIG. 21 is a block diagram illustrating a structure of a client device of a conventional communication system.

Firstly, FIG. 21 is a block diagram illustrating a conventional client device using the OBEX protocol so as to carry out communication.

As shown in FIG. 21, such a conventional client device (communication device) 1200 at least includes an application layer processing section 1210, an OBEX layer processing section (object exchange layer processing section) 1220, a lower layer processing section 1230, a transmitting section 1240, and a receiving section 1250.

In response to a user's instruction inputted via an operation section (not shown), the application layer processing section 1210 requests the OBEX layer processing section 1220 to issue a request command.

The OBEX layer processing section 1220 includes a control section 1221, a request notifying section 1222, and a response receiving section 1223.

In response to the request from the application layer processing section 1210, the control section 1221 notifies the request notifying section 1222 to generate a request command and issue the request command to the layer below the OBEX layer processing section 1220. Further, when the control section 1221 is notified of a response command reception result from the response receiving section 1223, the control section 1221 notifies the response command reception result to the application layer processing section 1210.

When the request notifying section 1222 is notified by the control section 1221 to issue a request command, the request notifying section 1222 generates the request command, and sends the request command to the lower layer processing section 1230. Further, the response receiving section 1223 receives a response command from the lower layer processing section 1230, and analyzes the received response command, and notifies the control section 1221 of (i) a result of the command analysis, and (ii) the reception of the response command.

The lower layer processing section 1230 renders a relevant header of the lower layer to the request command received from the OBEX layer processing section 1220, and then sends the response command to the transmitting section 1240. Further, the lower layer processing 1230 removes the relevant header of the lower layer from the response command received from the receiving section 1250.

The transmitting section 1240 receives the request command from the lower layer processing section 1230, and sends the request command to outside via an infrared communication path.

The receiving section 1250 receives the response command from the target device (server device) via the infrared communication path, and sends the received response command to the lower layer processing section 1230.

Explained next is an operation of the control section 1221 of the OBEX layer processing section 1220 shown in FIG. 21, with reference to a flowchart of FIG. 23.

Step S51 is a step in which the application layer processing section 1210 and the control section 1221 of the OBEX layer processing section 1220 in the client device 1200 judges whether or not a request command to be transmitted to the server device has been generated. In cases where it is judged that the request command has been generated, the sequence goes to Step S52. On the other hand, in cases where it is judged that no request command has been generated, the sequence goes to Step S51 again.

Step S52 is a step of transmitting, to the lower layer processing section 1230, the request command that is to be transmitted to the server device. After finishing the transmission, the sequence goes to Step S53.

Step S53 is a step of judging whether or not a response command has been received from the server device via the lower layer processing section 1230. In cases where the response command has been received, the sequence goes to Step S54. On the other hand, in cases where no response command has been received, the sequence goes to Step S53 again.

Step S54 is a step of analyzing the received response command. After finishing the analysis, the sequence goes to Step S55.

Step S55 is a step of judging whether or not the communication is to be terminated. In cases where the communication is not to be terminated, the sequence goes to Step S51 again.

With the above operation, the OBEX layer processing section 1220 of the conventional client device 1200 can carry out communication by (i) issuing a request command, and (ii) analyzing a response command sent in reply to the request command, and (iii) issuing a next request command.

However, the operation of the OBEX layer processing section 1220 of the conventional client device 1200 has such a problem that: until a response command is received from the server device, a next request command cannot be sent.

Figure 24:
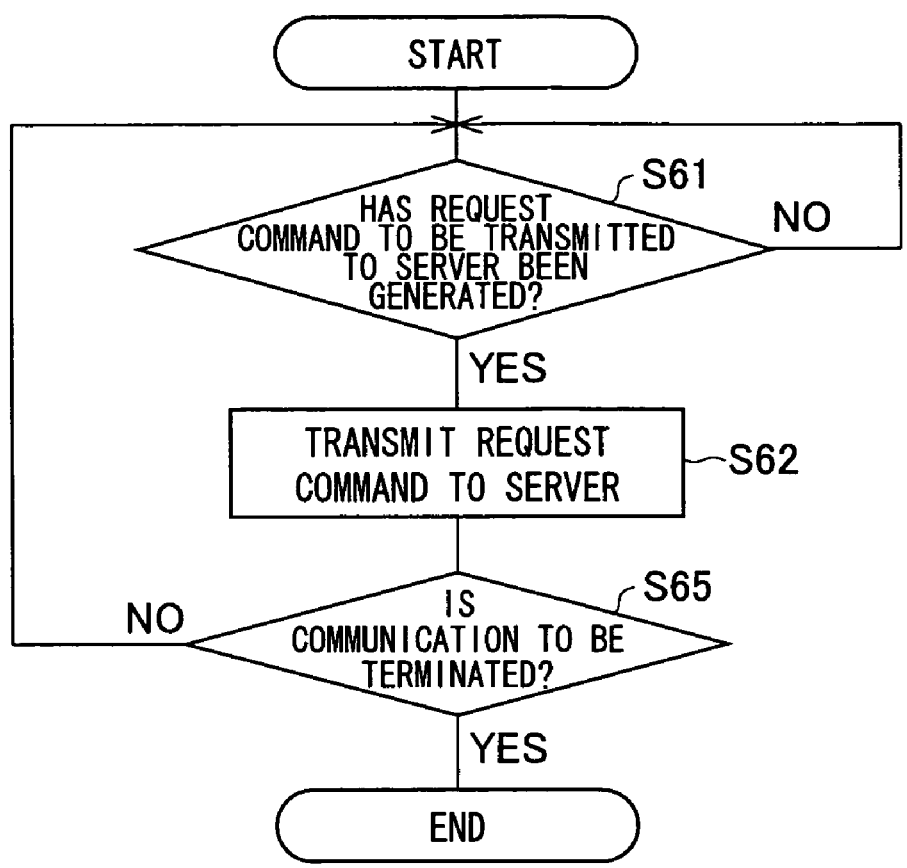
FIG. 24 is a flowchart illustrating an operation of an OBEX layer of the client device of the communication system of Embodiment 7.

In order to solve the problem, as shown in a flowchart of FIG. 24, a client device 1300 (FIG. 22) according to the present embodiment is capable of issuing a request command even when no response command is not received from a server device in reply to a previous request command. Details thereof are described as follows.

Step S61 is a step in which an application processing section 1310 and a control section 1321 of an OBEX layer processing section 1320 in the client device 1300 judge whether or not a request command to be sent to the server device has been generated. In cases where the request command has been generated, the sequence goes to Step S62. On the other hand, in cases where no request command has been generated, the sequence goes to Step S61 again.

Step S62 is a step of transmitting, to a lower layer processing section 1330, the request command to be sent to the server device. After finishing the transmitting, the sequence goes to Step S65.

Step S65 is a step of judging whether or not the communication is to be terminated. In cases where the communication is not to be terminated, the sequence goes back to Step S61.

The control section 1321 of the OBEX layer processing section 1320 of the client device 1300 operates in the above manner, so that the client device 1300 is capable of issuing a request command even when no response command is not received from the server device in reply to a previous request command.

Figure 22:
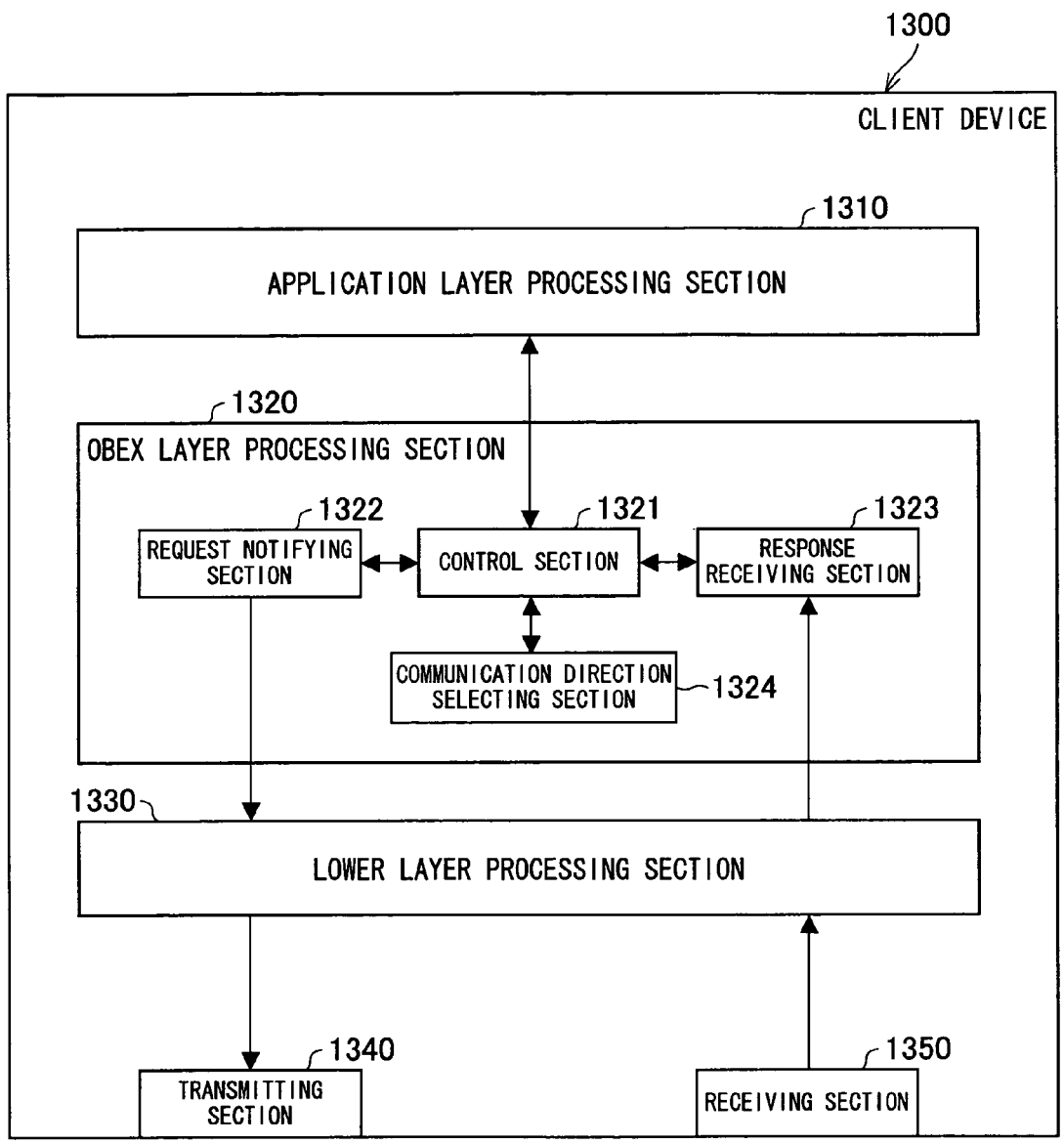
FIG. 22 is a flowchart illustrating an operation of an OBEX client in the conventional communication system.

Here, FIG. 22 is a block diagram illustrating the client device 1300 according to the present embodiment.

The OBEX layer processing section (object exchange layer processing section) 1320 has blocks respectively having the same functions as those of the blocks of the OBEX layer processing section 1220 of the conventional client device 1200 described with reference to FIG. 21, except a communication direction selecting section 1324. For this reason, explanation for the blocks other than the communication direction selecting section 1324 will be omitted.

The communication direction selecting section 1324 has a function of selecting either a one-way communication or a two-way communication. The wording "one-way communication" herein refers to such communication that the client device requires no response command to be transmitted from the server device in reply to the request command sent from the client device. In cases where the server device has no transmitting section or where the client device has no receiving section, the one-way communication is inevitable. However, the one-way communication is also adopted in cases where each of the client device and the server device has a transmitting section and a receiving section but signals are transmitted only from the client device to the server device. The wording "two-way communication" refers to such a way of communication that: the client device sends a request command to the server device, and the server device sends a response command to the client device in reply, and the client device analyzes the response command, and then the client device sends a next request command to the server device. In this case, response commands are not necessary for all the request commands. That is, response commands for specific request commands are not necessary as long as the respective OBEX layers of the client device and the server device made an agreement on this in advance.

Figure 25:
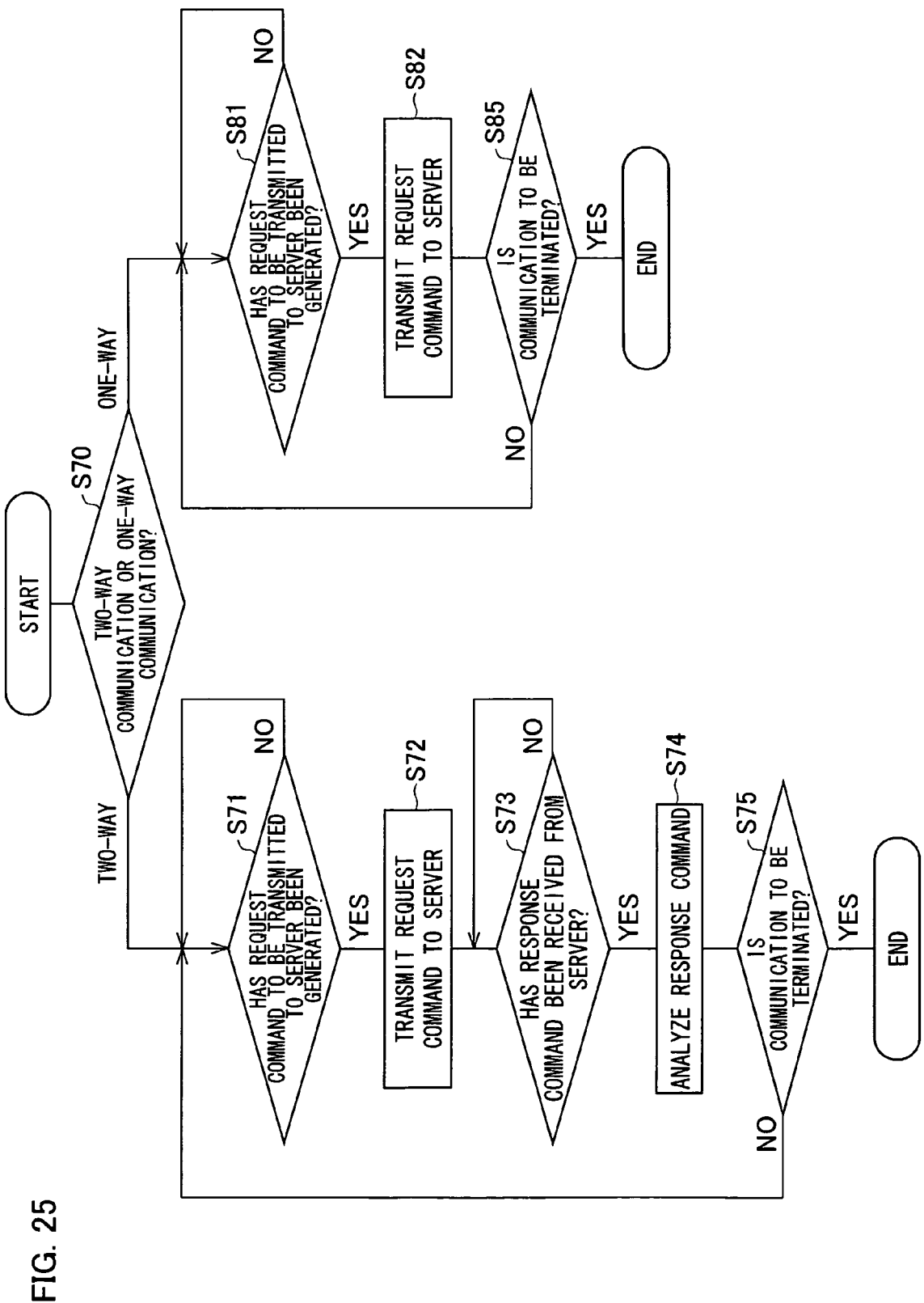
FIG. 25 is a flowchart illustrating another operation of the OBEX layer of the client device of the communication system of Embodiment 7 according to the present invention.

Next, the following explains an operation of the control section 1321 of the OBEX layer processing section 1320 of the client device 1300 according to the present embodiment, with reference to a flowchart of FIG. 25.

Step S70 is a step of causing the communication direction selecting section 1324 to select either the two-way communication or the one-way communication.

In cases where the two-way communication is selected, the sequence goes to Step S71. In cases where the one-way communication is selected, the sequence goes to Step S81.

Step S71 in the two-way communication is a step in which the application processing section 1310 or the control section 1321 of an OBEX layer processing section 1320 judges whether or not a request command to be sent to the server device has been generated. In cases where the request command has been generated, the sequence goes to Step S72. On the other hand, in cases where no request command has been generated, the sequence goes to Step S71 again.

Step S72 in the two-way communication is a step of transmitting, to the lower layer processing section 1330, the request command to be sent to the server device. After finishing the transmitting, the sequence goes to Step S73.

Step S73 in the two-way communication is a step of judging whether or not a response command has been received from the server device. In cases where the response command has been received, the sequence goes to Step S74. On the other hand, in cases where no response command has been received, the sequence goes to Step S73 again.

Step S74 in the two-way communication is a step of analyzing the response command received from the server device. After finishing the analysis, the sequence goes to Step S75.

Step S75 in the two-way communication is a step of judging whether or not the communication is to be terminated. In cases where the communication is not to be terminated, the sequence goes to Step S71 again.

In the meanwhile, Step S81 in the one-way communication is a step in which the application processing section 1310 or the control section 1321 of an OBEX layer processing section 1320 judges whether or not a request command to be sent to the server device has been generated. In cases where the request command has been generated, the sequence goes to Step S82. On the other hand, in cases where no request command has been generated, the sequence goes to Step S81 again.

Step S82 in the one-way communication is a step of transmitting, to the lower layer processing section 1330, the request command to be sent to the server device. After finishing the transmitting, the sequence goes to Step S85.

Step S85 in the one-way communication is a step of judging whether or not the communication is to be terminated. In cases where the communication is not to be terminated, the sequence goes to Step S81 again.

The control section 1321 of the OBEX layer processing section 1320 of the client device 1300 carries out the above operation. With this, in the two-way communication, after receiving a response command from the server device, a next request command is transmitted thereto. On the other hand, in the one-way communication, even though no response command is received from the server device, a next request command can be transmitted.

Embodiment 8

The following explains a client device (communication device) of a transferring system (communication system) according to Embodiment 8 of the present invention. The transferring system is used in transmitting data. Note that wordings (inclusive of a member and a function) defined in the other embodiments are used in the same manner in the present embodiment, unless otherwise noted.

Figure 23:
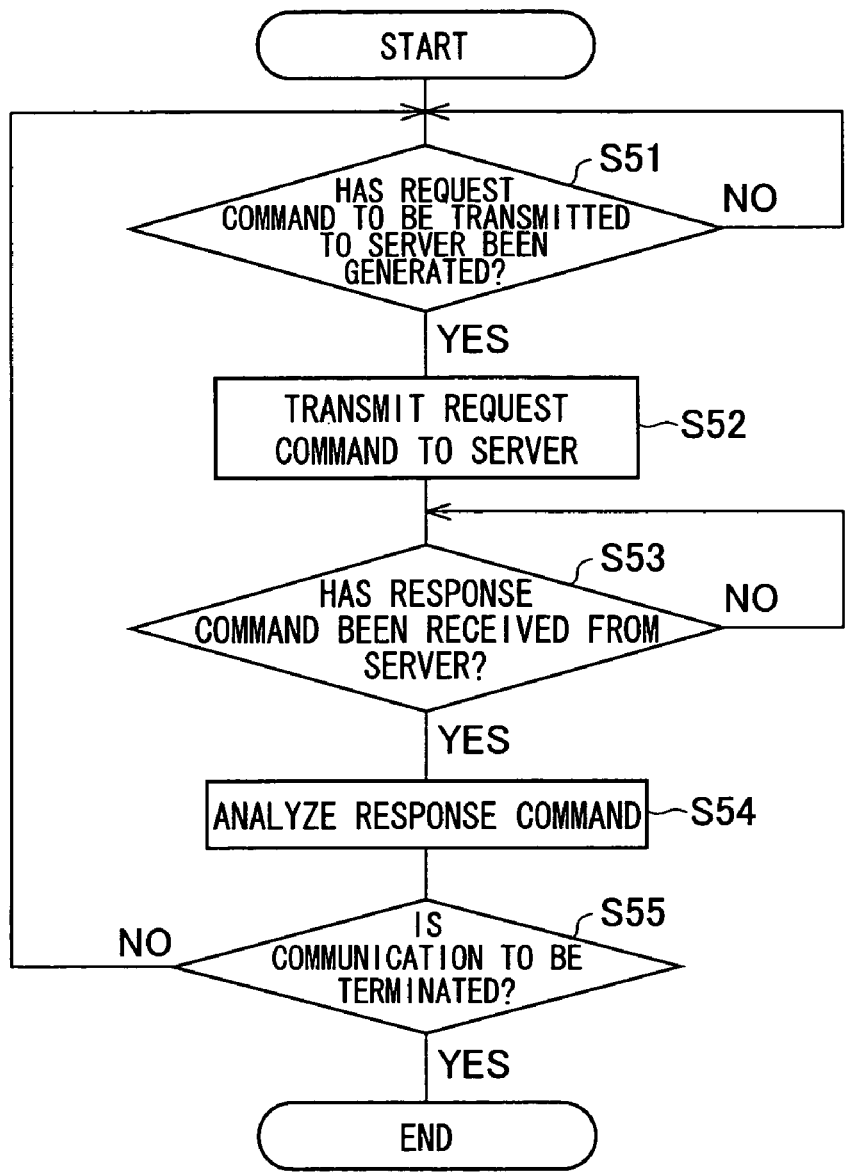
FIG. 23 is a block diagram illustrating a structure of a client device of a communication system of each of Embodiments 7 and 8 according to the present invention.

FIG. 23 is a block diagram illustrating a client device 1300 of the present embodiment. That is, the client device 1300 of the present embodiment is the same as the client device 1300 of Embodiment 7, and the respective blocks basically operates in the same manner as in Embodiment 7, except an operation of the control section 1321 of the OBEX layer processing section 1320. For this reason, explanation other than the operation of the control section 1321 is omitted here.

Figure 26:
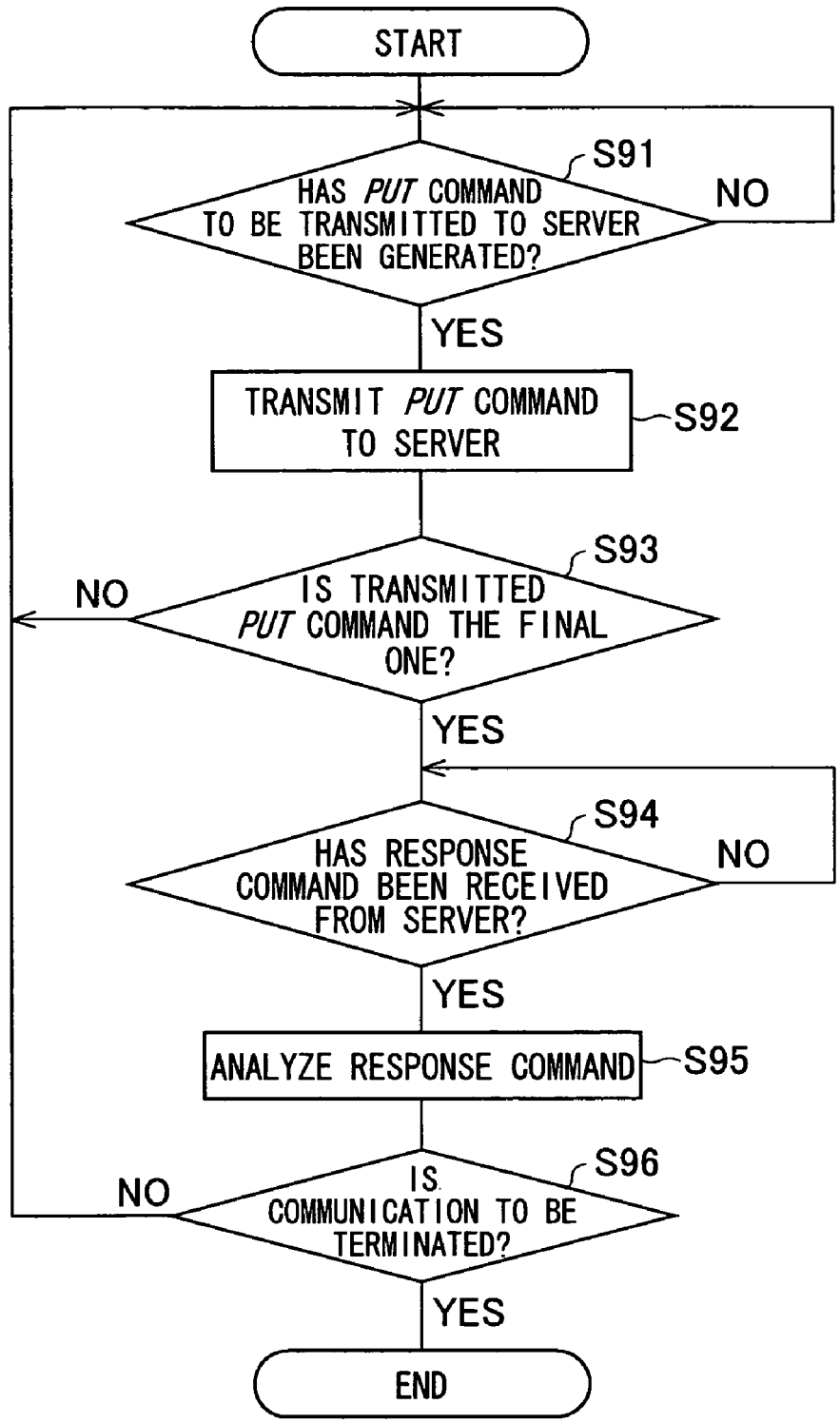
FIG. 26 is a flowchart illustrating an operation of an OBEX layer of a client device of a communication system of Embodiment 8.

The following explains the operation of the control section 1321 of the OBEX layer processing section 1320 according to the present embodiment with reference to a flowchart of FIG. 26.

Step S91 is a step in which the application layer processing section 1310 or the control section 1321 of the OBEX layer processing section 1320 in the client device 1300 judges whether or not a PUT request to be transmitted to the server device has been generated. In cases where it is judged that the PUT request command has been generated, the sequence goes to Step S92. On the other hand, in cases where it is judged that no PUT request command has been generated, the sequence goes to Step S91 again.

Step S92 is a step of transmitting the PUT request command to the server device. After finishing the transmission, the sequence goes to Step S93.

Step S93 is a step of judging whether or not the transmitted PUT request command is the final PUT command. In cases where it is judged that the transmitted PUT request command is the final PUT command, the sequence goes to Step S94. On the other hand, in cases where it is judged that the transmitted PUT request command is not the final PUT command, the sequence goes to Step S91.

Step S94 is a step of judging whether or not a response command has been received from the server device. In cases where it is judged that the response command has been received, the sequence goes to Step S95. In cases where it is judged that no response command has been received, the sequence goes to Step S94 again.

Step S95 is a step of analyzing the response command received from the server device. After the analysis, the sequence goes to Step S96. In the analysis, it is judged whether or not the received response command is a SUCCESS response command for the final PUT request command.

Step S96 is a step of judging whether or not the communication is to be terminated. In cases where the communication is not to be terminated, the sequence goes to Step S91.

The control section 1321 of the OBEX layer processing section 1320 of the client device 1300 operates as above. With this, the client device 1300 does not need to wait for a CONTINUE response command for a non-final PUT request command, and can send a next PUT command. This allows increase of efficiency of communication. Further, the client device 1300 checks the SUCCESS response command received from the server device in reply to the final PUT command. This allows the client device 1300 to judge whether or not the data has been normally transmitted to the server device.

Further, by combining the above sequence with the switching between the two-way communication and the one-way communication (see FIG. 25), it is possible to carry out such an operation that: only the SUCCESS response command for the final PUT command is required during the two-way communication, and no response commands are required for all the request commands during the one-way communication. The switching between the two-way communication and the one-way communication is carried out by the communication direction selecting section 1324.

Embodiment 9

The following explains a server device (communication device) of a transferring system (communication system) according to Embodiment 9 of the present invention. The transferring system is used in transmitting data. Note that wordings (inclusive of a member and a function) defined in the other embodiments are used in the same manner in the present embodiment, unless otherwise noted.

Figure 27:
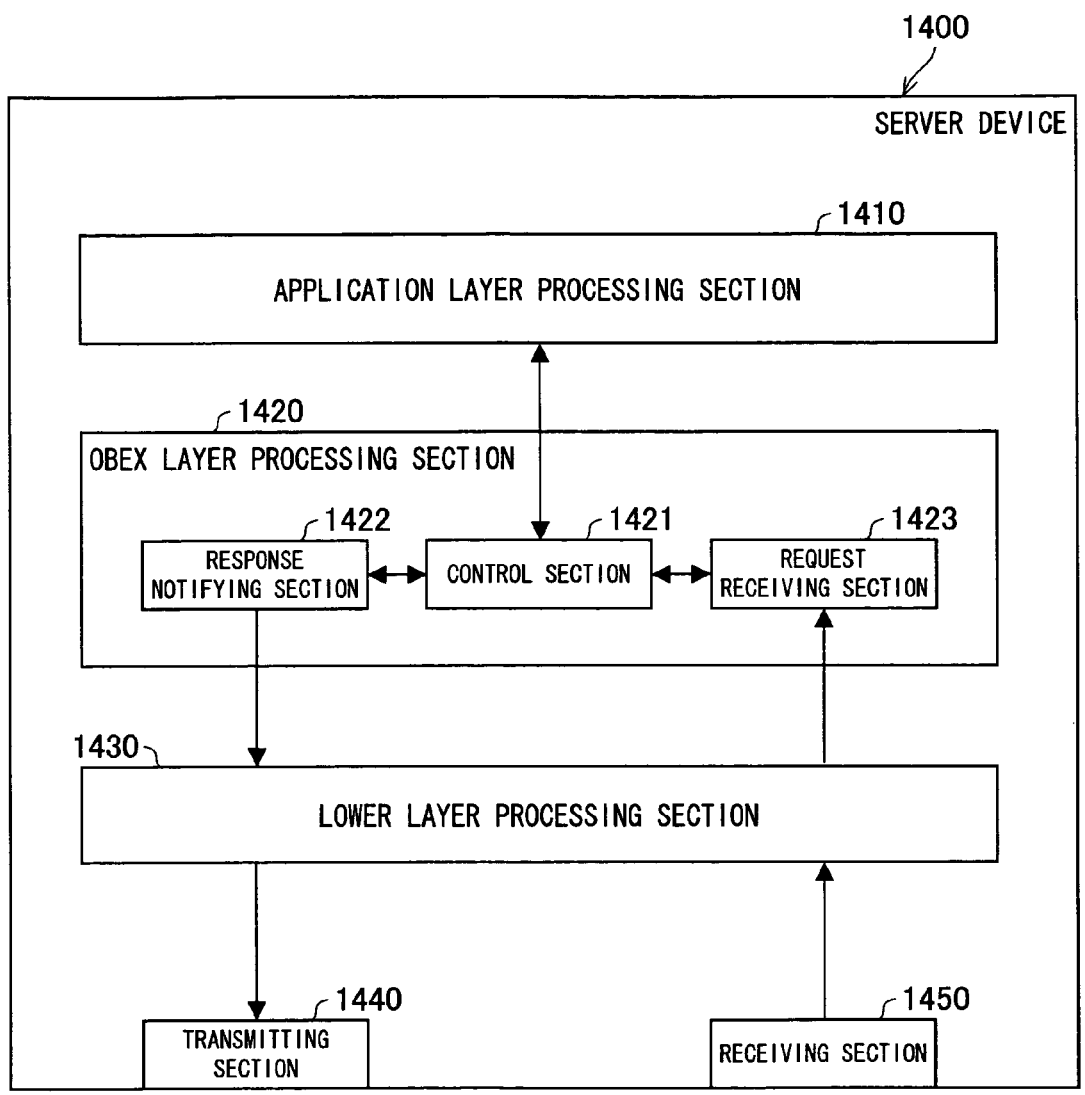
FIG. 27 is a block diagram illustrating a structure of a server device of a conventional communication system.

Firstly, FIG. 27 is a block diagram illustrating a conventional server device using the OBEX protocol.

As shown in FIG. 27, such a server device (communication device) 1400 at least includes an application layer processing section 1410, an OBEX layer processing section (object exchange layer processing section) 1420, a lower layer processing section 1430, a transmitting section 1440, and a receiving section 1450.

In response to a user's instruction inputted via an operation section (not shown), the application layer processing section 1410 requests the OBEX layer processing section 1420 to process the received request command and to issue a response command.

The OBEX layer processing section 1420 includes a control section 1421, a response notifying section 1422, and a request analyzing section 1423.

In accordance with the request from the application layer processing section 1410, the control section 1421 notifies the response notifying section 1422 to generate a response command and to issue the response command to the layer below the OBEX layer processing section 1420. Further, when the control section 1421 is notified by the request analyzing section 1423 that a request command has been received, the control section 1421 notifies a request command reception result to the application layer processing section 1410.

When the response notifying section 1422 is notified by the control section 1421 to issue a response command, the response notifying section 1422 generates the response command and sends the generated response command to the lower layer processing section 1430. The request analyzing section 1423 receives a request command from the lower layer processing section 1430, and analyzes the request command thus received. Then, the request analyzing section 1423 notifies the control section 1421 of (i) a result of the command analysis and (ii) the reception of the request command.

The lower layer processing section 1430 receives the response command from the OBEX layer processing section 1420, and renders a relevant header of the lower layer to the response command. Then, the lower layer processing section 1430 sends the response command to the transmitting section 1440. In the meanwhile, the lower layer processing section 1430 receives a request command from the receiving section 1450, and removes a relevant header of the lower layer from the request command. Then, the lower layer processing section 1430 sends the request command to the OBEX layer processing section 1420.

The transmitting section 1440 receives the request command from the lower layer processing section 1430, and transmits the request command to outside via an infrared communication path or the like.

The receiving section 1450 receives a request command from the source device (client device) via the infrared communication path or the like, and sends the request command to the lower layer processing section 1430.

Explained next is an operation of the control section 1421 of the OBEX layer processing section 1420 of the conventional OBEX server device 1400 shown in FIG. 27, with reference to a flowchart of FIG. 29.

Step S101 is a step of judging whether or not a request command has been received from the client device. In cases where it is judged that the request command has been received, the sequence goes to Step S102. On the other hand, in cases where it is judged that no request command has been received, the sequence goes to Step S101 again.

Step S102 is a step of analyzing the request command received from the client device. After the analysis, the sequence goes to Step S103.

Step S103 is a step of preparing a response command to be sent to the client device. After the preparation of the response command, the sequence goes to Step S104.

Step S104 is a step of transmitting the response command to the client device. After the transmission, the sequence goes to Step 105.

Step S105 is a step of judging whether or not the communication is to be terminated. In cases where it is judged that the communication is not to be terminated, the sequence goes back to Step S101.

The OBEX layer processing section 1420 of the conventional server device 1400 operates as described above, so that it is possible to carry out communication in the following manner: the OBEX layer processing section 1420 receives and analyzes a request command so as to generate a response command for the request command, and transmits the generated response command to the client device.

However, because the OBEX layer processing section 1420 of the conventional server device 1400 generates and transmits a response command in reply to a request command from the client device as such, electric power required for the generation of such a response command is wasted in communication in which no transmission from the server device 1400 is required, such as the one-way communication.

Figure 30:
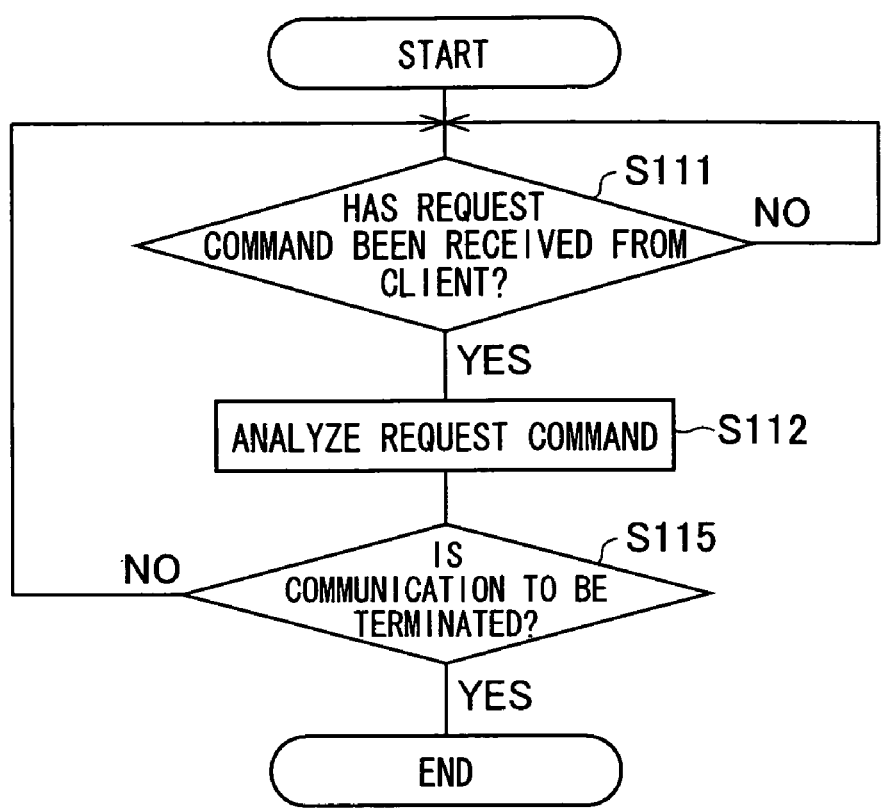
FIG. 30 is a flowchart illustrating an operation of an OBEX layer of a server device of a communication system of Embodiment 9.

In order to solve such a problem, a server device 1500 (FIG. 28) of the present embodiment does not generate and transmit any response command to the client device after receiving and analyzing a request command from the client device, but can receive a next request command therefrom as shown in a flowchart of FIG. 30. This will be explained specifically as follows.

Step S11 is a step of judging whether or not a request command has been received from the client device. In cases where it is judged that the request command has been received, the sequence goes to Step S112. On the other hand, in cases where it is judged that no request command has been received, the sequence goes to S111 again.

Step S112 is a step of analyzing the received request command. After the analysis, the sequence goes to Step S111.

Step S115 is a step of judging whether or not the communication is to be terminated. In cases where it is judged that the communication is not to be terminated, the sequence goes back to Step S115.

The control section 1521 of the OBEX layer processing section 1520 of the server device 1500 operates as described above, so that no response command is generated and transmitted in reply to a received response command but a next request command can be received.

Figure 28:
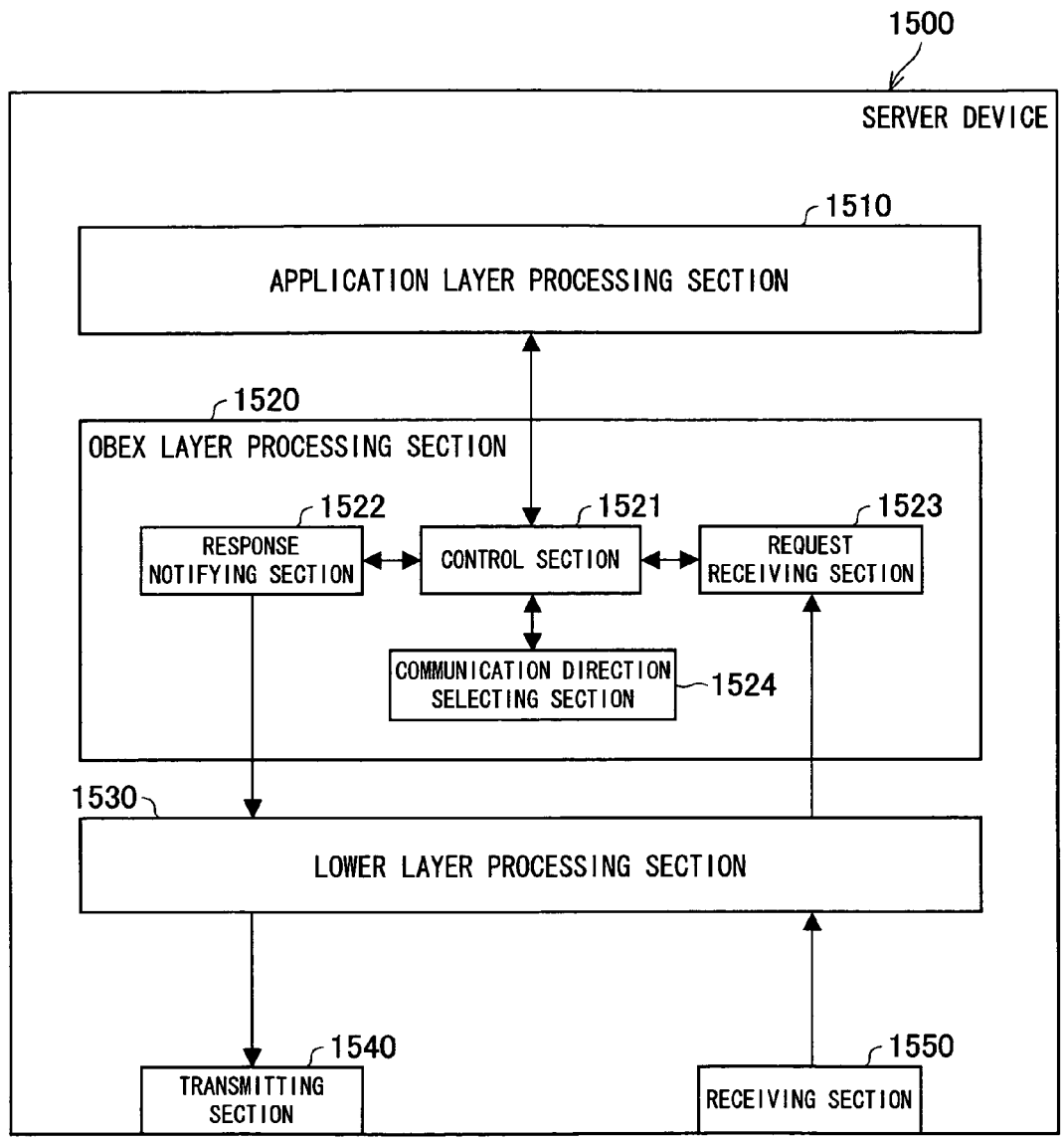
FIG. 28 is a flowchart of an operation of the OBEX server of the conventional communication system.

Here, FIG. 28 is a block diagram illustrating another server device 1500 according to the present embodiment.

An OBEX layer processing section (object exchange layer processing section) 1520 has blocks respectively having the same functions as those of the blocks of the OBEX layer processing section 1520 of the conventional client device 1400 described with reference to FIG. 27, except a communication direction selecting section 1524. For this reason, explanation for the blocks other than the communication direction selecting section 1524 will be omitted.

The communication direction selecting section 1524 has a function of selecting either the one-way communication or the two-way communication for the communication to be carried out. The wording "one-way communication" herein refers to such communication that no response command needs to be transmitted from the server device in reply to the request command sent from the client device. In cases where the server device has no transmitting section or where the client device has no receiving section, the one-way communication is inevitable. However, the one-way communication is also adopted in cases where each of the client device and the server device has a transmitting section and a receiving section but signals are transmitted only from the client device to the server device. The wording "two-way communication" refers to such a way of communication that: the client device sends a request command to the server device, and the server device sends a response command to the client device in reply, and the client device analyzes the response command, and then the client device sends a next request command to the server device. In this case, response commands are not necessary for all the request commands. That is, response commands for specific request commands are not necessary as long as the respective OBEX layers of the client device and the server device made an agreement on this in advance.

Figure 31:
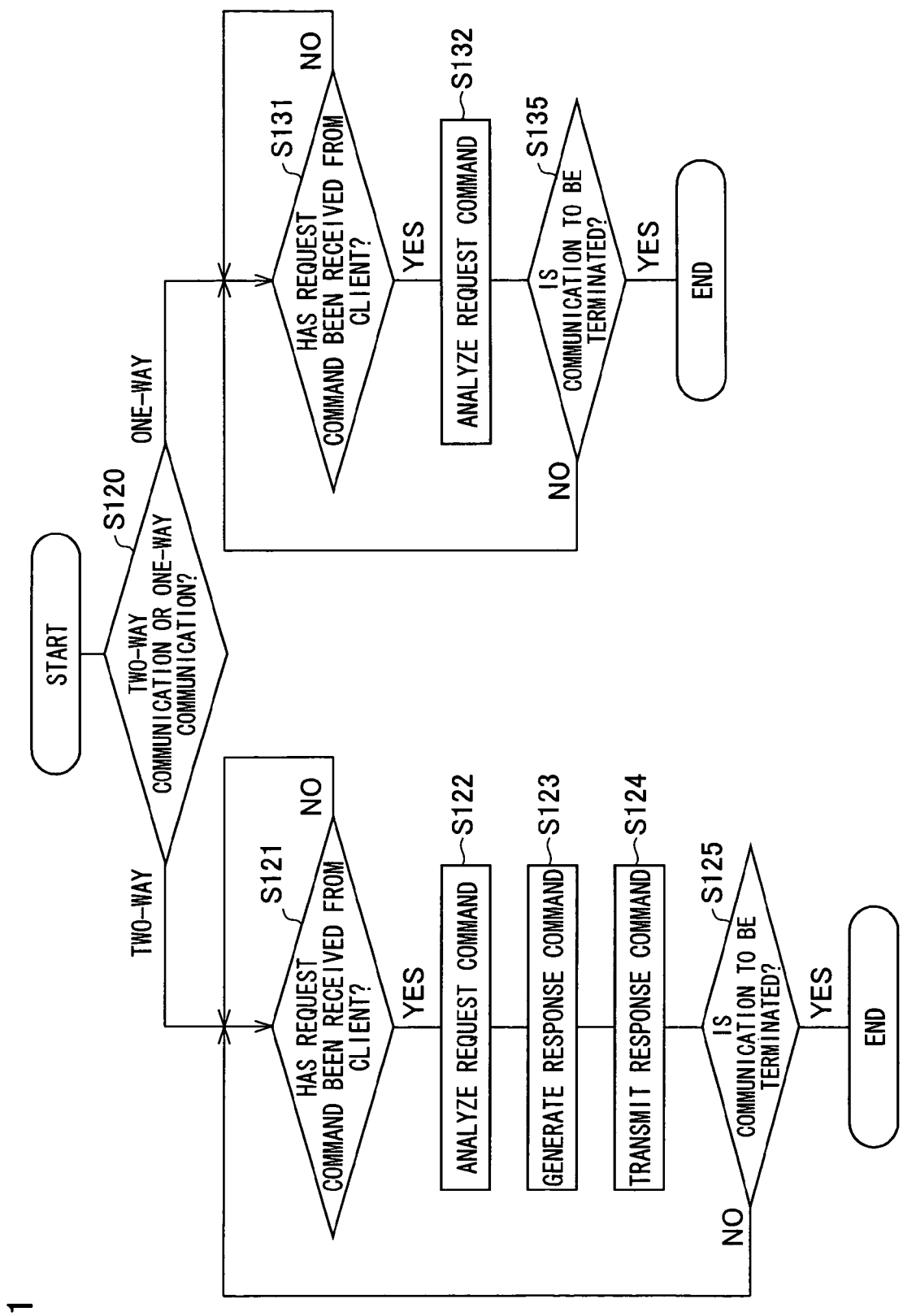
FIG. 31 is a flowchart illustrating another operation of the OBEX layer of the server device of the communication system of Embodiment 9.

Next, the following explains an operation of the control section 1521 of the OBEX layer processing section 1520 of the client device 1500 according to the present embodiment, with reference to a flowchart of FIG. 31.

Step S120 is a step of causing the communication direction selecting section 1524 to select either the two-way communication or the one-way communication. In cases where the two-way communication is selected, the sequence goes to Step S121. In cases where the one-way communication is selected, the sequence goes to Step S131.

Step S121 in the two-way communication is a step of judging whether or not a request command has been received from the client device. In cases where it is judged that the request command has been received, the sequence goes to Step S122. On the other hand, in cases where it is judged that no request command has been received, the sequence goes to S121 again.

Step S122 in the two-way communication is a step of analyzing a request command from the client device. After the analysis, the sequence goes to Step S123.

Step S123 in the two-way communication is a step of preparing a response command to the client device. After preparing the response command, the sequence goes to Step S124.

Step S124 in the two-way communication is a step of notifying the lower layer processing section 1530 to transmit the prepared response command to the client device. After finishing the notifying, the sequence goes to Step S125.

Step S125 is a step of judging whether or not the communication is to be terminated. In cases where it is judged that the communication is not to be terminated, the sequence goes back to Step S121.

In the meanwhile, Step S131 in the one-way communication is a step of judging whether or not a request command has been received from the client device. In cases where it is judged that the request command has been received, the sequence goes to Step S132. On the other hand, in cases where it is judged that no request command has been received, the sequence goes to Step S131 again.

Step S132 is a step of analyzing the request command received from the client device. After the analysis, the sequence goes to Step S135.

Step S135 is a step of judging whether or not the communication is to be terminated. In cases where it is judged that the communication is not to be terminated, the sequence goes back to Step S131.

The control section 1521 of the OBEX layer processing section 1520 of the server device 1500 operates as described above. With this, in the two-way communication, a response command is generated and transmitted in reply to a request command from the client device, whereas in the one-way communication, no response command is generated and transmitted even after receiving a request command, but a next request command is received therefrom.

Embodiment 10

The following explains a server device (communication device) of a transferring system (communication system) according to Embodiment 10 of the present invention. The transferring system is used in transmitting data. Note that wordings (inclusive of a member and a function) defined in the other embodiments are used in the same manner in the present embodiment, unless otherwise noted.

Figure 29:
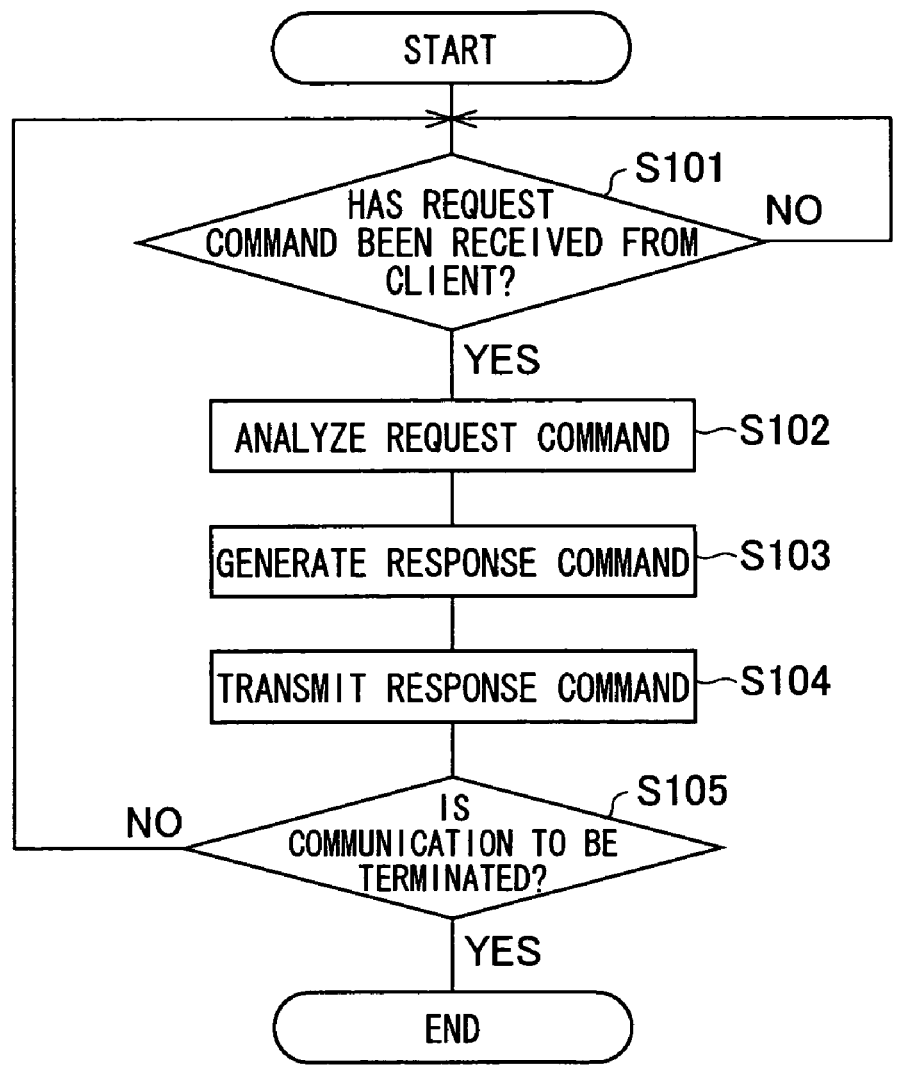
FIG. 29 is a block diagram illustrating another structure of a server device of a communication system of each of Embodiments 9 and 10 according to the present invention.

FIG. 29 is a block diagram illustrating a server device 1500 of the present embodiment. That is, the client device 1500 of the present embodiment is the same as that of Embodiment 9, and the respective blocks basically operates in the same manner as those in Embodiment 9, except an operation of the control section 1521 of the OBEX layer processing section 1520. For this reason, explanation other than the operation of the control section 1521 is omitted here.

Figure 32:
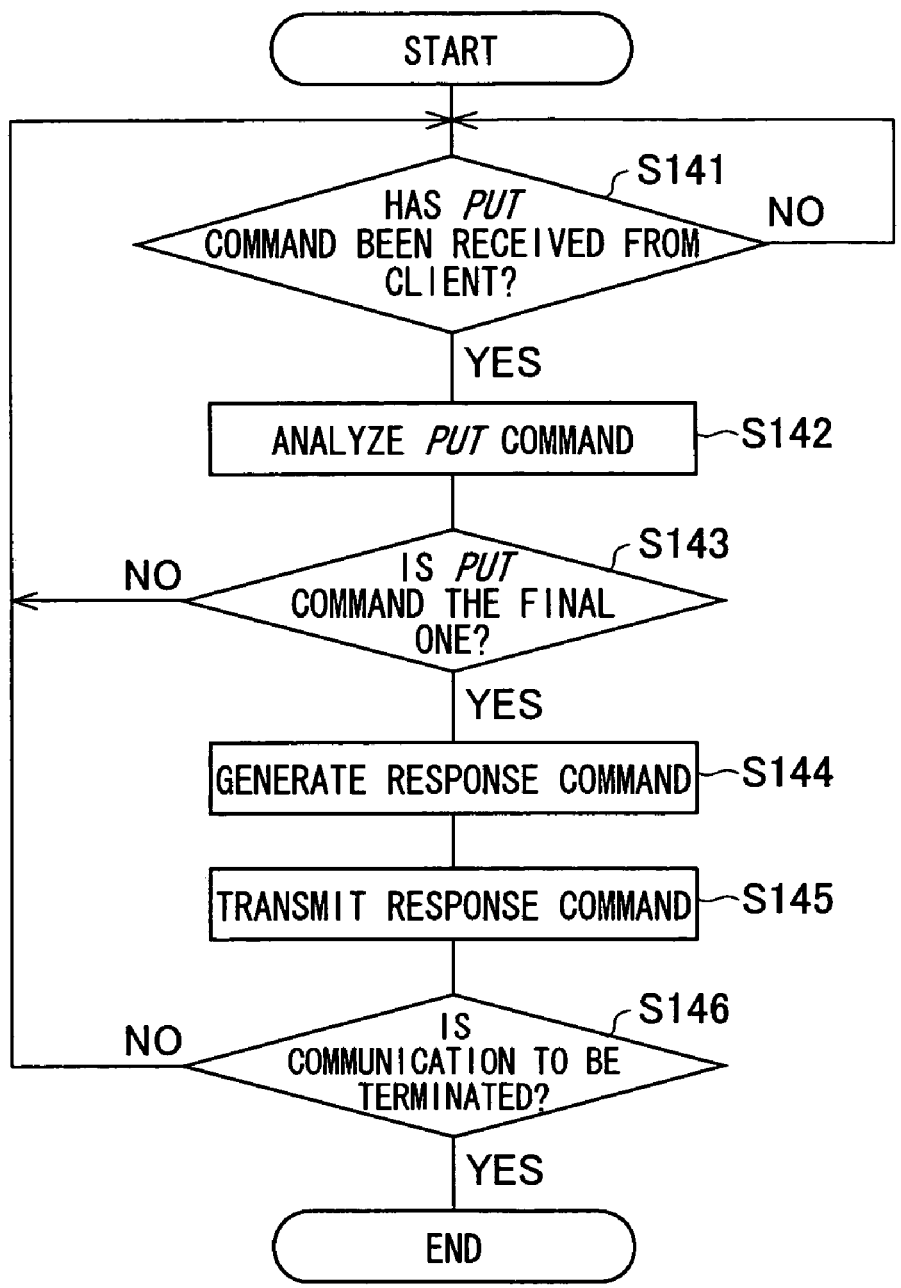
FIG. 32 is a flowchart illustrating an operation of an OBEX layer of a server device of a communication system of Embodiment 10 according to the present invention.

The following explains the operation of the control section 1521 of the OBEX layer processing section 1520 according to the present embodiment with reference to a flowchart of FIG. 32.

Step S141 is a step of judging whether or not a PUT command has been received from the client device. In cases where it is judged that the PUT command has been received, the sequence goes to Step S142. On the other hand, in cases where it is judged that no PUT command has been received, the sequence goes to Step S141 again.

Step S142 is a step of analyzing the received PUT command. After the analysis, the sequence goes to S143.

Step S143 is a step of judging whether the analyzed PUT command is the final one or a non-final one. In cases where it is judged that the analyzed PUT command is the final one, the sequence goes to Step S144. On the other hand, in cases where it is judged that the analyzed PUT command is a non-final one, the sequence goes back to Step S141.

Step S144 is a step of generating a response command to be sent to the client device. After finishing the generation of the response command, the sequence goes to Step S145. In cases where all the PUT commands have normally received from the client device, the response command generated in Step S144 is, e.g., a SUCCESS command. The present embodiment does not mention a response command generated in the other cases.

Step S145 is a step of notifying the lower layer processing section 1530 to transmit the response command to the client device. After finishing the notifying, the sequence goes to Step S146.

Step S146 is a step of judging whether or not the communication is to be terminated. In cases where it is judged that the communication is not to be terminated, the sequence goes to Step S141.

The control section 1521 of the OBEX layer processing section 1520 of the server device operates as described above. This makes it possible that: CONTINUE response commands for non-final PUT commands are never generated and transmitted unlike in the conventional OBEX layer processing section, but the SUCCESS command is generated and transmitted in reply to the final PUT request command. Accordingly, efficiency in communication is increased. Further, the SUCCESS response command is transmitted to the client device in reply to the final PUT command as such, so that it is possible to judge whether or not the data transfer to the server device 1500 has been done normally.

Further, by combining the above sequence with the switching between the two-way communication and the one-way communication (see FIG. 31), it is possible to carry out such an operation that: only the SUCCESS response command for the final PUT command is generated and transmitted during the two-way communication, and no response commands are generated and transmitted in reply to all the request commands during the one-way communication. The switching between the two-way communication and the one-way communication is carried out by the communication direction selecting section 1524.

Embodiment 11

The following explains a transferring system (communication system) according to Embodiment 11 of the present invention. The transferring system is used in transmitting data. Note that wordings (inclusive of a member and a function) defined in the other embodiments are used in the same manner in the present embodiment, unless otherwise noted.

With reference to FIG. 33, communication between mobile phones according to the present embodiment is explained.

In the present embodiment, the mobile phones are respectively used for the client device (transmitter) and the server device (receiver); however, only either one of the client device (transmitter) and the server device (receiver) may be a mobile phone. That is, when either one of the client device and the server device is a mobile phone, the other device may not be a mobile phone as long as data transmission and reception can be carried out therebetween via an infrared ray or the like in accordance with any one of the aforementioned communication methods of the present invention.

Further, FIG. 33 illustrates that a mobile phone A is the client device (transmitting side) and a mobile phone B is the server device (receiving side); however, the mobile phone A may be the server device, and the mobile phone B may be the client device.

FIG. 33 illustrates that the mobile phone A transmits data therein to the mobile phone B by using an infrared ray. When the mobile phone B receives the data from the mobile phone A, the mobile phone B stores the received data in either a built-in memory thereof or an external memory connected thereto. Examples of the data include text data, image data, audio data, telephone directory data, system information, and the like, and the data is not limited to one complying with a specific format. Further, the data stored in the mobile phone A may be either (i) data stored in a built-in memory of the mobile phone A or (ii) data stored in an external memory connected to the mobile phone A. A specific example of such an external memory is a non-volatile memory such as an SD card.

The following fully explains the example of the communication between the mobile phones according to the present embodiment.

For example, in the two-way communication, the OBEX layer of the client device (mobile phone A) serving as the transmitting side transmits non-final PUT commands one after another even though no CONTINUE response commands are received in reply from the server device (mobile phone B) serving as the receiving side. However, from the server device, the client device receives a SUCCESS response command in reply to the final PUT command, thereby checking whether or not the communication has been carried out normally. Note that a conventional OBEX layer requiring such CONTINUE response commands can be used by notifying, to the OBEX layer, pseudo CONTINUE commands pre pared in a lower layer processing section provided below the OBEX layer.

Meanwhile, when the OBEX layer of the server device (mobile phone B) serving as the receiving side receives the non-final PUT commands from the client device (mobile phone A) serving as the transmitting side, no CONTINUE response commands are generated and transmitted to the client device. However, when receiving the final PUT command, the SUCCESS response command is generated and transmitted thereto. A conventional OBEX layer, which generates and transmits the CONTINUE response commands in reply to the non-final PUT commands, may be used as long as a layer below such an OBEX layer prevents the CONTINUE commands from being transmitted to the client device.

Such communication is realized between (i) the client device (mobile phone A) serving as the transmitting side and (ii) the server device (mobile phone B) serving as the receiving side. This makes it possible to carry out data transfer in the two-way communication with high communication efficiency via object exchange allowing for high communication quality.

On the other hand, for example, in the one-way communication, the OBEX layer of the client device (mobile phone A) serving as the transmitting side transmits all the request commands one after another even though no response commands are received in reply from the server device. Note that a conventional OBEX layer requiring the response commands can be used by notifying, to the OBEX layer, pseudo CONTINUE commands prepared in a lower layer processing section provided below the OBEX layer.

Meanwhile, when the OBEX layer of the server device (mobile phone B) serving as the receiving side receives all the request commands from the client device (mobile phone A) serving as the transmitting side, no response commands are generated and transmitted to the client device. A conventional OBEX layer, which generates and transmits the response commands in reply to the request commands, may be used as long as a layer below such an OBEX layer prevents the transmission, to the client device, of the response commands received from the OBEX layer.

Such communication is realized between (i) the client device (mobile phone A) serving as the transmitting side and (ii) the server device (mobile phone B) serving as the receiving side. This makes it possible to carry out data transfer even in the one-way communication with the use of an object exchange protocol such as OBEX.

Embodiment 12

The following explains a transferring system (communication system) according to Embodiment 12 of the present invention. The transferring system is used in transmitting data. Note that wordings (inclusive of a member and a function) defined in the other embodiments are used in the same manner in the present embodiment, unless otherwise noted.

With reference to FIG. 34, the following explains an example of communication between a mobile phone and a display device each according to the present embodiment.

In the present embodiment, the client device (transmitter) is a mobile phone A, and the sever device (receiver) is a display device B (e.g., television). However, the client device may not be a mobile phone as long as data transmission can be carried out via an infrared ray or the like in accordance with any one of the aforementioned methods of the present invention. Further, the display device B may be the client device (transmitter), and the mobile phone A may be the server device (receiver).

FIG. 34 illustrates that the mobile phone A transmits data therein to the display device B by using an infrared ray. The display device B carries out an appropriate process with respect to the data sent from the mobile phone A, in order to carry out display. For example, in cases where the data from the mobile phone A is image data, the image data is decompressed if necessary for the sake of carrying out the display. However, the present invention is not limited to this. Further, examples of the data include text data, image data, audio data, telephone directory data, system information, and the like, and the data is not limited to one complying with a specific format. Further, the data stored in the mobile phone A may be either (i) data stored in a built-in memory of the mobile phone A or (ii) data stored in an external memory connected to the mobile phone A. A specific example of such an external memory is a non-volatile memory such as an SD card.

The following fully explains the example of the communication between the mobile phone and the display device each according to the present embodiment.

For example, in the two-way communication, the OBEX layer of the client device (mobile phone A) serving as the transmitting side transmits non-final PUT commands one after another even though no CONTINUE response commands are received in reply from the server device (display device B) serving as the receiving side. However, from the server device, the client device receives a SUCCESS response command in reply to the final PUT command, thereby checking whether or not the communication has been carried out normally. Note that a conventional OBEX layer requiring such CONTINUE response commands can be used by notifying, to the OBEX layer, pseudo CONTINUE commands prepared in a lower layer processing section provided below the OBEX layer.

Meanwhile, when the OBEX layer of the server device (display device B) serving as the receiving side receives the non-final PUT commands from the client device (mobile phone A) serving as the transmitting side, no CONTINUE response commands are generated and transmitted to the client device. However, when receiving the final PUT command, the SUCCESS response command is generated and transmitted thereto. A conventional OBEX layer, which generates and transmits the CONTINUE response commands in reply to the non-final PUT commands, may be used as long as a layer below such an OBEX layer prevents only the CONTINUE commands from being transmitted to the client device.

Such communication is realized between (i) the client device (mobile phone A) serving as the transmitting side and (ii) the server device (display device B) serving as the receiving side. This makes it possible to carry out, e.g., data transfer of image data in the two-way communication with high communication efficiency via object exchange allowing for high communication quality.

On the other hand, for example, in the one-way communication, the OBEX layer of the client device (mobile phone A) serving as the transmitting side transmits all the request commands one after another even though no response commands are received in reply from the server device. Note that a conventional OBEX layer requiring the response commands can be used by notifying, to the OBEX layer, pseudo CONTINUE commands prepared in a lower layer processing section provided below the OBEX layer.

Meanwhile, when the OBEX layer of the server device (display device B) serving as the receiving side receives all the request commands from the client device (mobile phone A) serving as the transmitting side, no response commands are generated and transmitted to the client device. A conventional OBEX layer, which generates and transmits the response commands in reply to the request commands, may be used as long as a layer below such an OBEX layer prevents the transmission, to the client device, of the response commands received from the OBEX layer.

Such communication is realized between (i) the client device (mobile phone A) serving as the transmitting side and (ii) the server device (display device B) serving as the receiving side. This makes it possible to carry out, e.g., data transfer of image data even in the one-way communication with the use of an object exchange protocol such as OBEX.

Embodiment 13

The following explains a transferring system (communication system) according to Embodiment 13 of the present invention. The transferring system is used in transmitting data. Note that wordings (inclusive of a member and a function) defined in the other embodiments are used in the same manner in the present embodiment, unless otherwise noted.

With reference to FIG. 35, the following explains an example of communication between a mobile phone and a printing device each according to the present embodiment.

In the present embodiment, the client device (transmitter) is a mobile phone A, and the sever device (receiver) is a printing device B (e.g., printer). However, the client device may not be a mobile phone as long as data transmission can be carried out via an infrared ray or the like in accordance with any one of the aforementioned methods of the present invention. Further, the printing device B may be the client device (transmitter), and the mobile phone A may be the server device (receiver).

FIG. 35 illustrates that the mobile phone A transmits data therein to the printing device B by using an infrared ray. The printing device B carries out an appropriate process with respect to the data sent from the mobile phone A, in order to carry out printing. For example, in cases where the data from the mobile phone A is image data, the image data is decompressed if necessary for the sake of carrying out the printing. However, the present invention is not limited to this. Further, examples of the data include text data, image data, audio data, telephone directory data, system information, and the like, and the data is not limited to one complying with a specific format. Further, the data stored in the mobile phone A may be either (i) data stored in a built-in memory of the mobile phone A or (ii) data stored in an external memory connected to the mobile phone A. A specific example of such an external memory is a non-volatile memory such as an SD card.

The following fully explains the example of the communication between the mobile phone and the printing device each according to the present embodiment.

For example, in the two-way communication, the OBEX layer of the client device (mobile phone A) serving as the transmitting side transmits non-final PUT commands one after another even though no CONTINUE response commands are received in reply from the server device (printing device B) serving as the receiving side. However, from the server device, the client device receives a SUCCESS response command in reply to the final PUT command, thereby checking whether or not the communication has been carried out normally. Note that a conventional OBEX layer requiring such CONTINUE response commands can be used by notifying, to the OBEX layer, pseudo CONTINUE commands prepared in a lower layer processing section provided below the OBEX layer.

Meanwhile, when the OBEX layer of the server device (printing device B) serving as the receiving side receives the non-final PUT commands from the client device (mobile phone A) serving as the transmitting side, no CONTINUE response commands are generated and transmitted to the client device. However, when receiving the final PUT command, the SUCCESS response command is generated and transmitted thereto. A conventional OBEX layer, which generates and transmits the CONTINUE response commands in reply to the non-final PUT commands, may be used as long as a layer below such an OBEX layer prevents the CONTINUE commands from being transmitted to the client device.

Such communication is realized between (i) the client device (mobile phone A) serving as the transmitting side and (ii) the server device (printing device B) serving as the receiving side. This makes it possible to carry out, e.g., data transfer of image data in the two-way communication with high communication efficiency via object exchange allowing for high communication quality.

On the other hand, for example, in the one-way communication, the OBEX layer of the client device (mobile phone A) serving as the transmitting side transmits all the request commands one after another even though no response commands are received in reply from the server device. Note that a conventional OBEX layer requiring the response commands can be used by notifying, to the OBEX layer, pseudo CONTINUE commands prepared in a lower layer processing section provided below the OBEX layer.

Meanwhile, when the OBEX layer of the server device (printing device B) serving as the receiving side receives all the request commands from the client device (mobile phone A) serving as the transmitting side, no response commands are generated and transmitted to the client device. A conventional OBEX layer, which generates and transmits the response commands in reply to the request commands, may be used as long as a layer below such an OBEX layer prevents the transmission, to the client device, of the response commands received from the OBEX layer.

Such communication is realized between (i) the client device (mobile phone A) serving as the transmitting side and (ii) the server device (printing device B) serving as the receiving side. This makes it possible to carry out, e.g., data transfer of image data even in the one-way communication with the use of an object exchange protocol such as OBEX.

Embodiment 14

The following explains a transferring system (communication system) according to Embodiment 14 of the present invention. The transferring system is used in transmitting data. Note that wordings (inclusive of a member and a function) defined in the other embodiments are used in the same manner in the present embodiment, unless otherwise noted.

With reference to FIG. 36, the following explains an example of communication between a mobile phone and a recording device each according to the present embodiment.

In the present embodiment, the client device (transmitter) is a mobile phone A, and the sever device (receiver) is a recording device B (e.g., HDD recorder, DVD recorder, or the like). However, the client device may not be a mobile phone as long as data transmission can be carried out via an infrared ray or the like in accordance with any one of the aforementioned methods of the present invention. Further, the recording device B may be the client device (transmitter), and the mobile phone A may be the server device (receiver).

FIG. 36 illustrates that the mobile phone A transmits data therein to the recording device B. The recording device B carries out an appropriate process with respect to the data sent from the mobile phone A, in order to carry out recording with respect to a recording section provided within the recording device. For example, in cases where the data from the mobile phone A is image data, the image data is subjected to a compressing process, a decompressing process, or other image process if necessary, and then is recorded onto the recording section. However, the present invention is not limited to this. Further, examples of the data include text data, image data, audio data, telephone directory data, system information, and the like, and the data is not limited to one complying with a specific format. Further, the data stored in the mobile phone A may be either (i) data stored in a built-in memory of the mobile phone A or (ii) data stored in an external memory connected to the mobile phone A. A specific example of such an external memory is a non-volatile memory such as an SD card.

The following fully explains the example of the communication between the mobile phone and the recording device each according to the present embodiment.

For example, in the two-way communication, the OBEX layer of the client device (mobile phone A) serving as the transmitting side transmits non-final PUT commands one after another even though no CONTINUE response commands are received in reply from the server device (printing device B) serving as the receiving side. However, from the server device, the client device receives a SUCCESS response command in reply to the final PUT command, thereby checking whether or not the communication has been carried out normally. Note that a conventional OBEX layer requiring such CONTINUE response commands can be used by notifying, to the OBEX layer, pseudo CONTINUE commands prepared in a lower layer processing section provided below the OBEX layer.

Meanwhile, when the OBEX layer of the server device (recording device B) serving as the receiving side receives the non-final PUT commands from the client device (mobile phone A) serving as the transmitting side, no CONTINUE response commands are generated and transmitted to the client device. However, when receiving the final PUT command, the SUCCESS response command is generated and transmitted thereto. A conventional OBEX layer, which generates and transmits the CONTINUE response commands in reply to the non-final PUT commands, may be used as long as a layer below such an OBEX layer prevents the CONTINUE commands from being transmitted to the client device.

Such communication is realized between (i) the client device (mobile phone A) serving as the transmitting side and (ii) the server device (recording device B) serving as the receiving side. This makes it possible to carry out, e.g., data transfer of image data in the two-way communication with high communication efficiency via object exchange allowing for high communication quality.

On the other hand, for example, in the one-way communication, the OBEX layer of the client device (mobile phone A) serving as the transmitting side transmits all the request commands one after another even though no response commands are received in reply from the server device. Note that a conventional OBEX layer requiring the response commands can be used by notifying, to the OBEX layer, pseudo CONTINUE commands prepared in a lower layer processing section provided below the OBEX layer.

Meanwhile, when the OBEX layer of the server device (recording device B) serving as the receiving side receives all the request commands from the client device (mobile phone A) serving as the transmitting side, no response commands are generated and transmitted to the client device. A conventional OBEX layer, which generates and transmits the response commands in reply to the request commands, may be used as long as a layer below such an OBEX layer prevents the transmission, to the client device, of the response commands received from the OBEX layer.

Such communication is realized between (i) the client device (mobile phone A) serving as the transmitting side and (ii) the server device (recording device B) serving as the receiving side. This makes it possible to carry out, e.g., data transfer of image data even in the one-way communication with the use of an object exchange protocol such as OBEX.

Embodiment 15

Another embodiment of the present invention will be described below with reference to FIG. 37 through FIG. 59. A communication protocol to be explained in the present embodiment is supposed to be applied to each of Embodiments 1 through 14. Therefore, the wordings defined in Embodiments 1 through 14 are used in the same manner in the present embodiment, unless otherwise noted.

(1) Communication Layers

Figure 37:
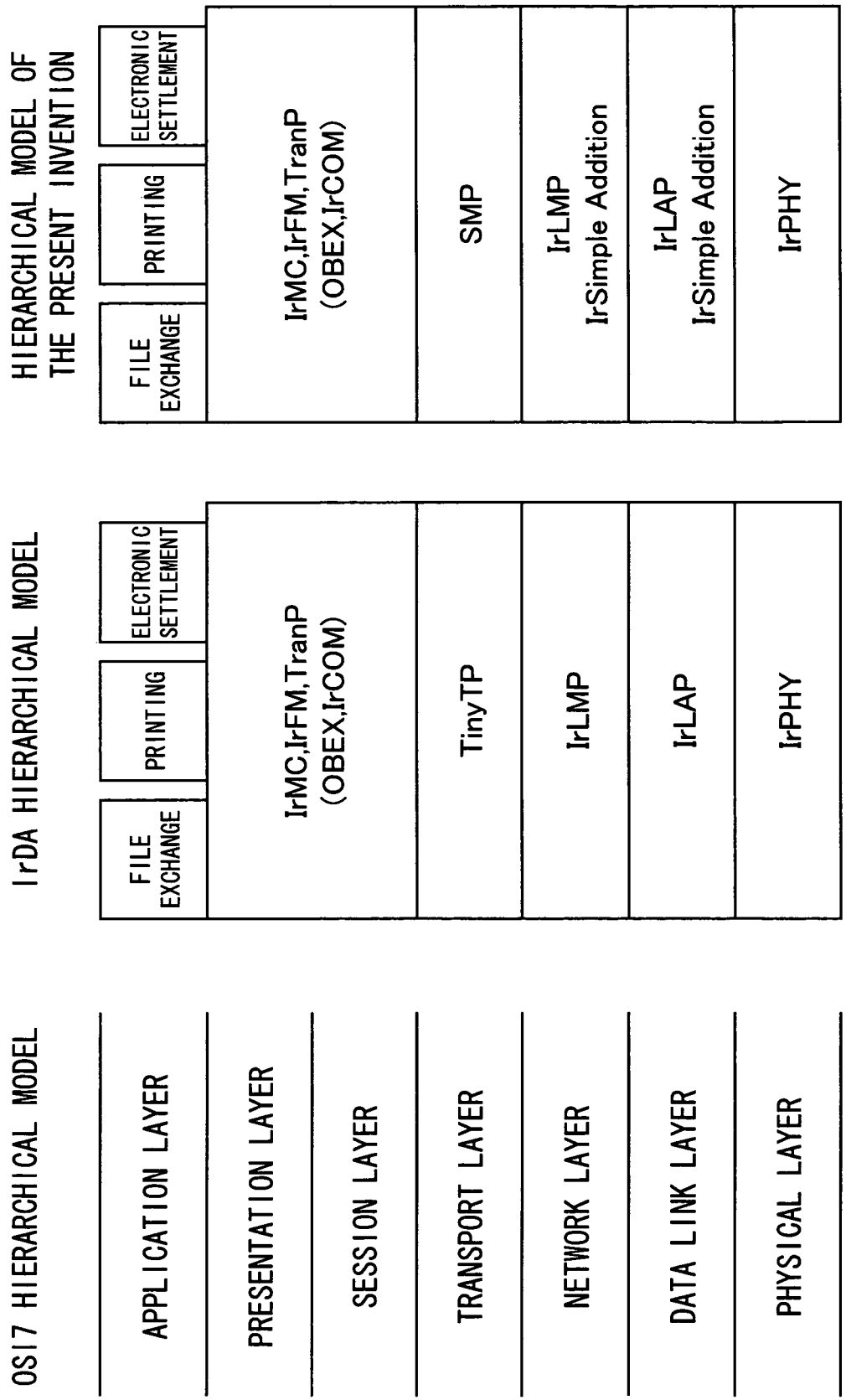
FIG. 37 is a diagram schematically illustrating a corresponding relation among the OSI7 hierarchical model, the IrDA hierarchical model, and the hierarchical model of the present invention.
Figure 38:
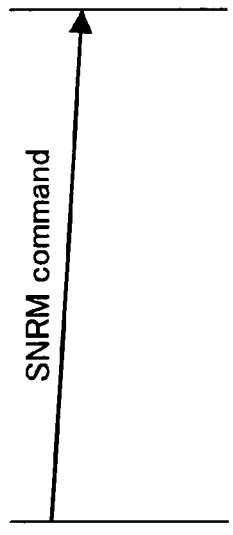
FIG. 38($a$) is a sequence diagram illustrating connection establishing in an embodiment of the present invention.
Figure 38:
Figure 38:
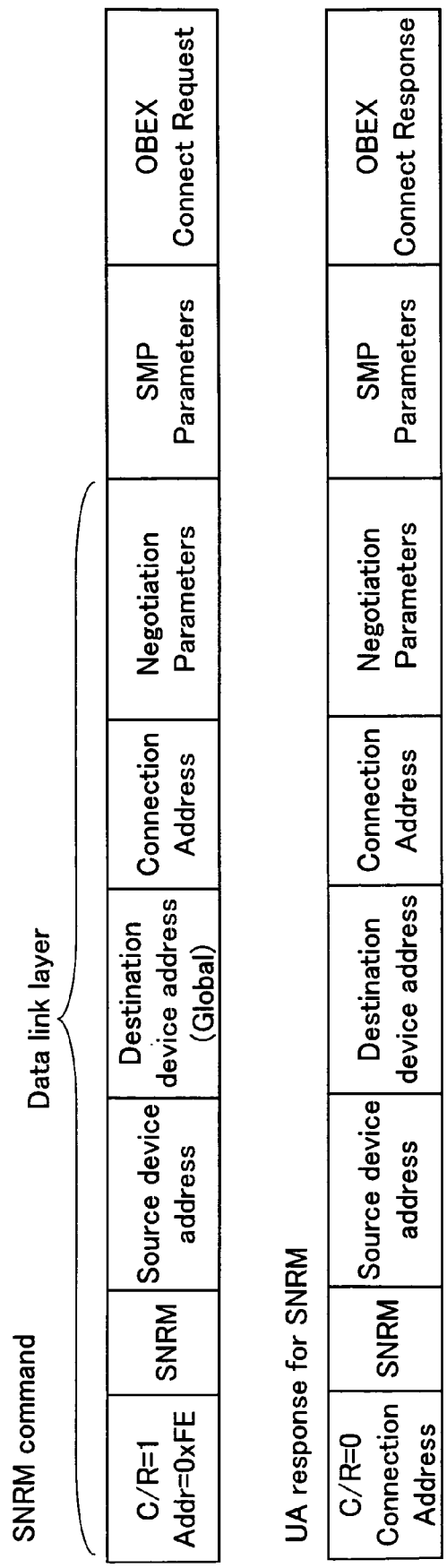
Figure 41:
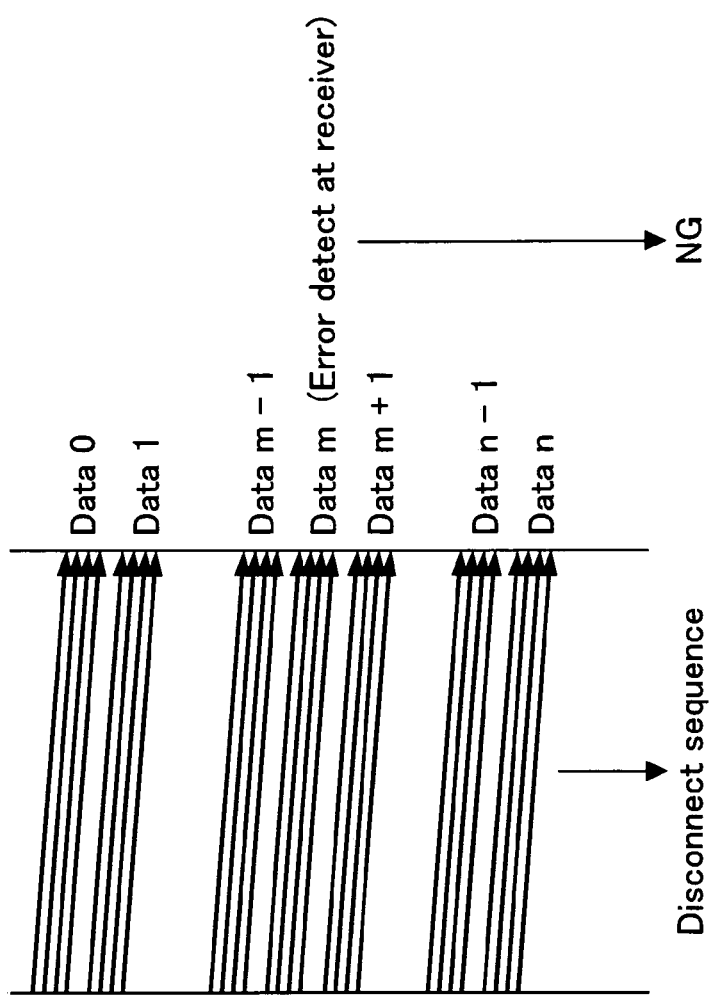
FIG. 41($a$) is a diagram illustrating a data exchange sequence in the embodiment of the present invention.
Figure 41:
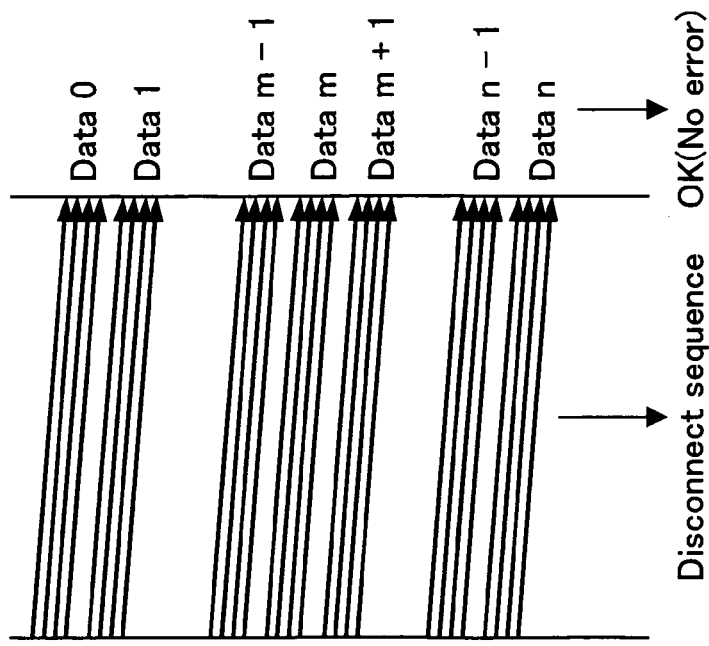
Figure 42:
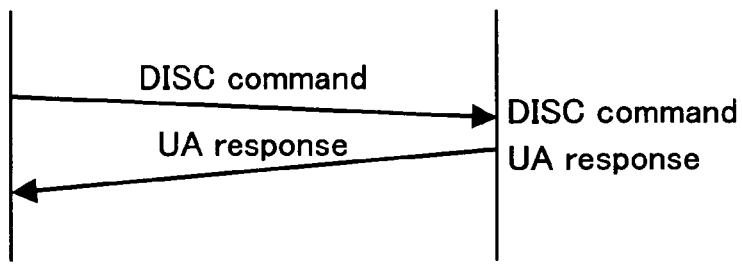
FIG. 42($a$) is a diagram illustrating a disconnection sequence in the embodiment of the present invention.
Figure 42:
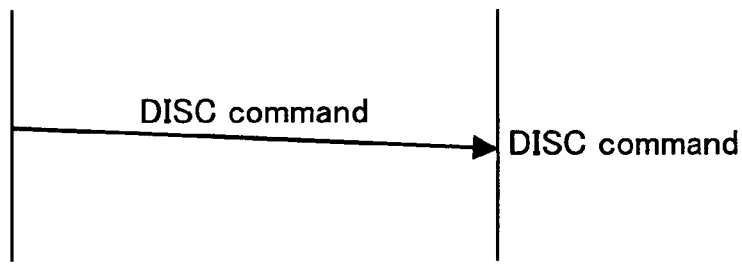
Figure 42:
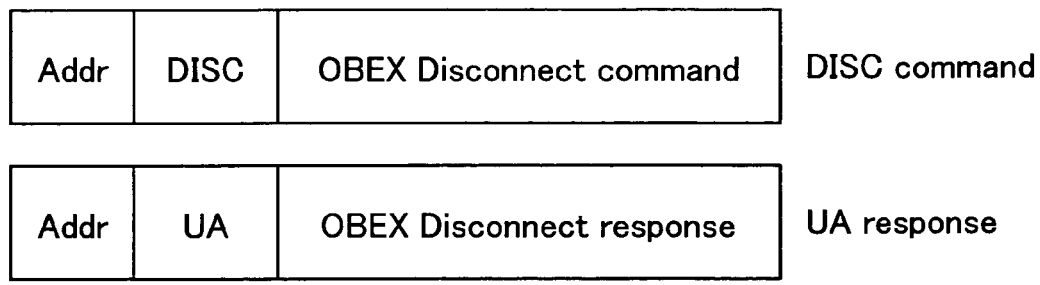

FIG. 37 is a diagram schematically illustrating a corresponding relation among OSI7 hierarchical model, IrDA hierarchical model, and a hierarchical model of a communication system according to the present invention.

The communication system according to the present embodiment has layers respectively having the same functions as those of corresponding layers of the OSI7 hierarchical model. However, as shown in FIG. 37, the communication system has a six-layer structure in which the session layer and the presentation layer are unified.

For ease of explanation, the present embodiment describes "IrSimple", one application example of the present invention. However, the present invention is not limited to IrSimple. IrSimple is made by partly modifying the function of conventional IrDA.

In the present embodiment, in accordance with IrSimple, the data link layer, the network layer, the transport layer, the session/presentation layer may be referred to as LAP, LMP, SMP, and OBEX, respectively. To discriminate the communication layers in the transmitter and a communication layer in the receiver, symbols "P" and "S" are rendered to the transmitter and receiver, respectively. For example, "LAP (P)" indicates the data link layer of the transmitter.

(2) Sequence of Communication Between Transmitter and Receiver (2-1) Connection Sequence

[A] Response is Sent

FIG. 38(a) is a sequence diagram showing a connection sequence according to the present embodiment (response is sent). FIG. 38(c) is an explanatory diagram illustrating a structure of communication data used in the connection sequence of the present embodiment (response is sent).

In the present embodiment (response is sent), a global address is used for the Destination Device Address of SNRM command, thereby giving a searching function to the SNRM command (SNRM command in FIG. 38(c)).

Further, in the present embodiment (response is sent), the SNRM command, which is a connection packet for data link layer, and the UA response contain a parameter required for connection of the upper layers, such as the network layer, the transport layer, the session layer, the presentation layer etc. Compared with the conventional IrDA, the present embodiment uses only one packet to connect all of the upper layers.

Thus, the present invention carries out both search and connection sequence with a single pair of packets, and therefore the conventional plural packets are not required.

(B) Response is not Sent

FIG. 38(b) is a sequence diagram showing a connection sequence according to the present embodiment (response is not sent). FIG. 38(c) is an explanatory diagram illustrating a structure of communication data used in the connection sequence of the present embodiment (response is not sent). Note that, in the present embodiment (response is not sent), the UA response (UA response for SNRM in FIG. 38(c)) is not required.

Depending on the user, or the application and the type of data, it is possible to select a communication mode which does not require a response from the receiver. In this case, as shown in FIG. 38(b), the SNRM command completes both search and connection.

Further, the present invention provides an effect of reducing time required for establishing connection by handling all connection requests for the plural communication layers at the same time, and therefore can easily recover disconnection of communication path. In view of this, the present invention is particularly useful for wireless communication in which the communication path is likely to be disconnected. A specific example of such wireless communication is infrared wireless communication. Note that the present invention is also useful for other wireless communication such as IEEE802.11 or Bluetooth®, and for wired communication.

Further, though the present embodiment explains an example in which all of the communication layers are connected through a single round of communication, the present invention is not limited to this case. For example, the present invention may be arranged so that one communication layer is connected first, and the rests are connected thereafter. Further, one communication layer may establish connection through plural rounds of communication. For example, given that two rounds of communication are required to establish connection of the network layer, it may be carried out such that the connection of the data link layer and the first step of connecting the network layer are handled as a single connection request, and the connection of the transport layer and the second step of connecting the network layer are handled as a single connection request.

(2-2) Data Exchange Sequence

[A] Response is Sent

FIG. 39(a) and FIG. 39(b) are sequence diagrams each showing a data exchange sequence according to the present embodiment (response is sent). Further, FIG. 39(a) is an explanatory diagram illustrating a structure of communication data used in the data exchange sequence of the present embodiment (response is sent).

In the present embodiment (response is sent), a response from a lower layer/upper layer is not transmitted for each data, thereby reducing the number of response as much as possible. Then, the response to inform an error is given after a large number of data is transmitted.

The transmitter uses (i) a flag for asking the receiver if there is any problem in the sequence of packet number or in the data received, and (ii) a packet constituted of the plural data items created by dividing the data according to the packet size.

As shown in FIG. 39(a), the transmitter transmits a predetermined number of packets, and then transmits a packet in which the flag is on. If the receiver on the other end has detected no error since the start of receiving the data or since a previous response sent in reply to a packet in which the flag is on, the receiver notifies the transmitter of proper transmission. If an error is detected, the receiver ignores the data items after the missed packet, and only confirms the flag. When it is confirmed that the flag is on, the receiver informs the transmitter of the packet number of the packet which has not been received due to the error.

When the proper transmission is notified, the transmitter carries on transmission and transmits the next packet. When an error is notified, the transmitter retransmits packets from the number notified by the receiver to the packet with the flag on.

With this, the interval between the packets is reduced, thereby efficiently performing transmission.

As shown in FIG. 39(a), the present embodiment (response is sent) uses an UI frame (FIG. 40(b)). Therefore, the data link layer (LAP layer) is incapable of recognizing missing of packets, and the missing is detected by the transport layer.

In the UI frame, the data for the transport layer contains the sequence number, a flag for confirming the data, a flag for informing as to whether the packet is the final packet of the data, and a flag for checking if there is any problem in the data. The data transmission is carried out using these flags.

[B] Response is not Sent

FIGS. 41(a) and 41(b) are sequence diagrams each showing a data exchange sequence according to the present embodiment (response is not sent). FIG. 41(b) is an explanatory diagram illustrating a structure of communication data used in the data exchange sequence of the present embodiment (response is not sent).

In the present embodiment (response is not sent), if the response from the receiver is not required, only the completeness of data is confirmed. Therefore, the transmitter puts a sequence number on each packet, and transmits all the packets sequentially.

The receiver only confirms whether there is any error in the transmission. When all the packets (data) are properly received, the proper completion of data is perceived in the receiver, and the next operation is carried out, which is display, printing, storing etc. of the received data. On the other hand, when an error is detected, the error is perceived in the receiver, and a different operation is carried out, which is error indication to the user, stand-by for the next data, etc.

Note that, the present embodiment (response is not sent) also uses the UI frame (FIG. 40(b)) shown in FIG. 41(b).

(2-3) Disconnection Sequence

[A] Response is Sent

FIG. 42(a) is a sequence diagram showing a disconnection sequence of the present embodiment (response is sent). FIG. 42(c) is an explanatory diagram illustrating a structure of communication data used in the disconnection sequence of the present embodiment (response is sent).

As shown in FIG. 42(c), in the present embodiment (response is sent), the DISC command and the UA response contain the parameter/command required for disconnection of upper layers, such as the network layer, the transport layer, the session layer, and the presentation layer.

In this way, the present embodiment carries out a disconnection sequence with a pair of packets, and therefore the conventional plural packets are not required.

[B] Response is not Sent

FIG. 42(b) is a sequence diagram showing a disconnection sequence according to the present embodiment (response is not sent). FIG. 42(c) is an explanatory diagram illustrating a structure of communication data used in the disconnection sequence of the present embodiment (response is not sent). Note that, in the present embodiment (response is not sent), the UA response (the UA response in FIG. 42(c)) is not required.

As shown in FIG. 42(b), in the present embodiment (response is not sent), when the connection is established without requiring a response from the receiver, the DISC command completes both search and disconnection.

(3) Sequence in Transmitter and Sequence in Receiver

In FIGS. 43 through 59, for ease of explanation, the data link layer, the network layer, the transport layer, the session/presentation layers may be referred to as LAP, LAMP, TTP or SMP, and OBEX, respectively. To discriminate the communication layers in the transmitter and the communication layer in the receiver, the symbols "P" and "S" are used for transmitter and receiver, respectively. For example, "LAP (P)" denotes the data link layer of the transmitter.

(3-1) Connection Sequence

[A] Response is Sent

Figure 43:
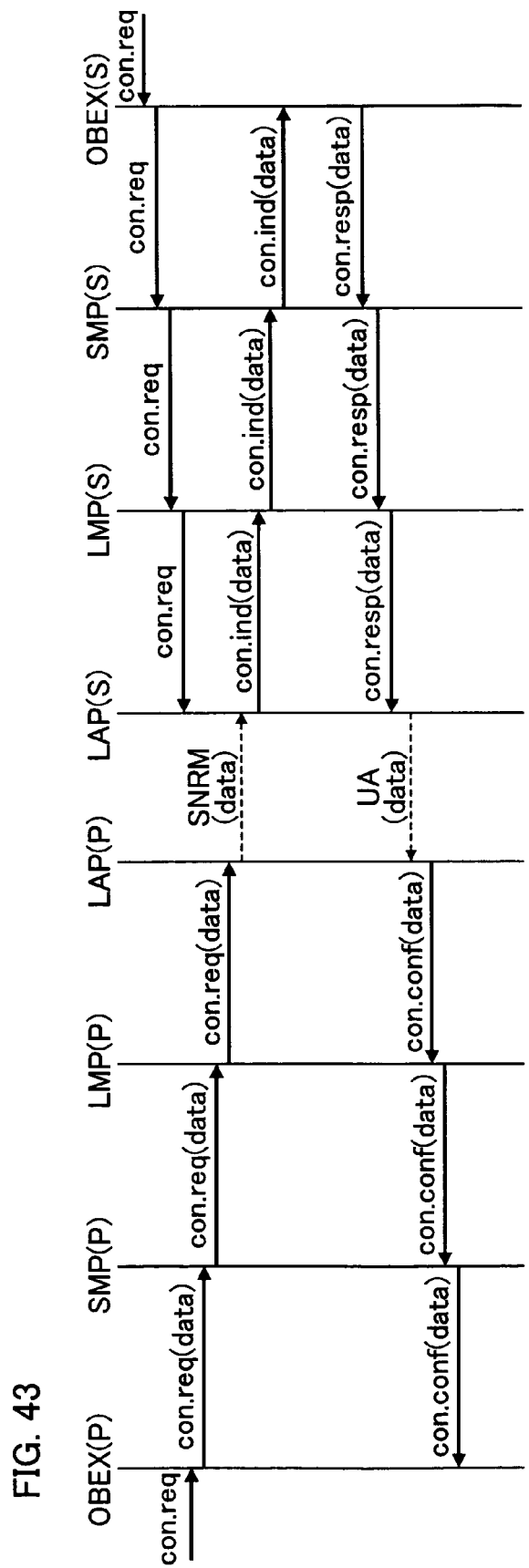
FIG. 43 is a sequence diagram illustrating flow of functions (commands, messages) and packets among layers in the connection sequence of the embodiment of the present invention.

FIG. 43 is a sequence diagram showing a connection sequence of the present embodiment (response is sent). FIGS. 44(a) and 44(b) are explanatory diagrams each illustrating a structure of communication data used in the connection sequence of the present embodiment (response is sent).

As shown in FIG. 43, in the present embodiment (response is sent), the transmitter and the receiver first carry out preparation for connection. Then, the transmitter passes on the request from the upper layer to the lower layers, and then transmits the request as a single packet (SNRM). Meanwhile, the receiver receives the SNRM packet, and passes on the notification of completion of connection to lower to upper layers, and then passes on a response from the OBEX (S) from upper to lower layers, and transmits the response as a single packet (UA). The transmitter is notified of completion of connection with the reception of UA, and passes on the notification (Connect. confirm) from lower to upper layers.

The following separately describes the sequence in the transmitter and the sequence in the receiver.

First, the communication layers in the transmitter are explained.

When a connection request is transmitted from the application to the OBEX (P), the OBEX (P) emits a connection request function (Primitive), which contains a connection request command, to the lower layer (SMP (P)). Further, when a connection confirmation function is transmitted from the SMP (P) to the OBEX (P), the OBEX (P) checks a response for OBEX connection which is contained in the data. When the response tells that the connection has been properly done ("Success"), the OBEX (P) finishes the connecting operation.

The SMP (P) receives the connection request function from the OBEX (P), and adds a parameter required for communication with the SMP (S) of the receiver to the data, and emits the connection request function to the lower layer (LMP (P)). When a connection confirmation function is transmitted from the LMP (P) to the SMP (P), the SMP (P) extracts a parameter generated by the SMP (S) of the receiver from the data of the function, and checks the value, and then finishes the negotiation with the SMP (S). Further, the SMP (P) removes the parameter of the SMP (S) from the data of connection confirmation function, and transmits the resulting data to the OBEX (P) as the connection confirmation function.

The LMP (P) receives the connection request function from the SMP (P), and immediately adds parameter(s) required for communication with the LMP (S) of the receiver to the data of the connection request function from the SMP (P), and emits the connection request function to the lower layer (LAP (P)). When a connection confirmation function is transmitted from the LAP (P) to the LMP (P), the LMP (P) extracts parameter(s) generated by the LMP (S) of the receiver from the data of the function, and checks the value, and then finishes the negotiation with the LMP (S). Further, the LMP (P) removes the parameter(s) of the LMP (S) from the data of the connection confirmation function, and transmits the resulting data to the SMP (P) as the connection confirmation function.

Note that, in general operation, an LSAP (Link Service Access Point) is defined to manage the logic port. When the connection is established by connecting the layers one by one, the LMP is not required. In this case, a connectionless value is used as the fixed value of the LSAP. Therefore, the exchange of the connection parameter(s) for LMP is not required.

The LAP (P) receives the connection request function from the LMP (P), and immediately adds parameter(s) required for communication with the LAP (S) of the receiver to the data of connection request function from the LMP (P), and emits the SNRM command to the physical layer of the receiver. When the UA response is transmitted from the physical layer of the receiver to the LAP (P), the LAP (P) extracts the parameter(s) generated by the LAP (S) of the receiver from the data of the UA response, and checks the value, and then finishes the negotiation with the LAP (S). Further, the LAP (P) removes the parameter(s) of LAP (S) from the data of the UA response, and transmits the resulting data to the LMP (P) as the connection confirmation function.

Next, the communication layers in the receiver are explained.

The OBEX (S) receives the connection request function from the application, and stands by for the next reception. When a connection notification function (Indication) is transmitted from the lower layer (SMP (S)), the OBEX (S) checks a command for OBEX connection which is contained in the data. When the command indicates that the connection has been properly done, the OBEX (S) emits a response "Success" as a connection response function (Response) to the SMP (S), and finishes the connecting operation.

The SMP (S) receives the connection request function from the OBEX (S), and stands by for the next reception. When the connection notification function is transmitted from the lower layer (SMP (S)), the SMP (S) extracts the parameter(s) generated by the SMP (P) of the transmitter from the data of the function, and creates parameter(s) for response, and emits the connection request function containing the data thus created by removing the parameter(s) of the SMP (P) from the data of the function, to the OBEX (S), and then stands by for a connection response function which comes from the OBEX (S). Further, when the connection response function is transmitted from the OBEX (S), the SMP (S) adds the parameter(s) of the response to the data of the connection response function of the OBEX (S), emits the connection response function to the LMP (S), and finishes the negotiation for the SMP layer.

The LMP (S) receives the connection request function from the SMP (S), and stands by for the next reception. When the connection notification function is transmitted from the lower layer (LAP (S)), the LMP (S) extracts the parameter(s) generated by the LMP (P) of the transmitter from the data of the function, and creates parameter(s) for response, and emits the connection request function containing the data thus created by removing the parameter(s) of the LMP (P) from the data of the function, to the SMP (S), and then stands by for a connection response function which comes from the SMP (S). Further, when the connection response function is transmitted from the SMP (S), the LMP (S) adds the parameter(s) of the response, to the data of connection response function of the SMP (S), emits the connection response function to the LAP (S), and finishes the negotiation for the LMP layer.

Note that, in general operation, an LSAP (Link Service Access Point) is defined to manage the logic port. When the connection is established by connecting the layers one by one, the LMP is not required. In this case, a connectionless value is used as the fixed value of the LSAP. Therefore, the exchange of connection parameter(s) for LMP is not required.

The LAP (S) receives the connection request function from the LMP (S), and stands by for the next reception. When the SNRM command is transmitted from the physical layer, the LAP (S) extracts parameter(s) generated by the LAP (P) of the transmitter from the SNRM command, and creates parameter(s) for response after transmitting the connection request function, containing the data thus created by removing the parameter(s) of LAP (P) from the data of the command, to the LMP (S), and then stands by for a connection response function which comes from the LMP (S). Further, when the connection response function is transmitted from the LMP (S), the LAP (S) adds the parameter(s) of the response to the data of the connection response function of the LMP (S), emits the UA response to the physical layer, and finishes the negotiation for the LAP layer.

[B] Response is not Sent.

Figure 44:
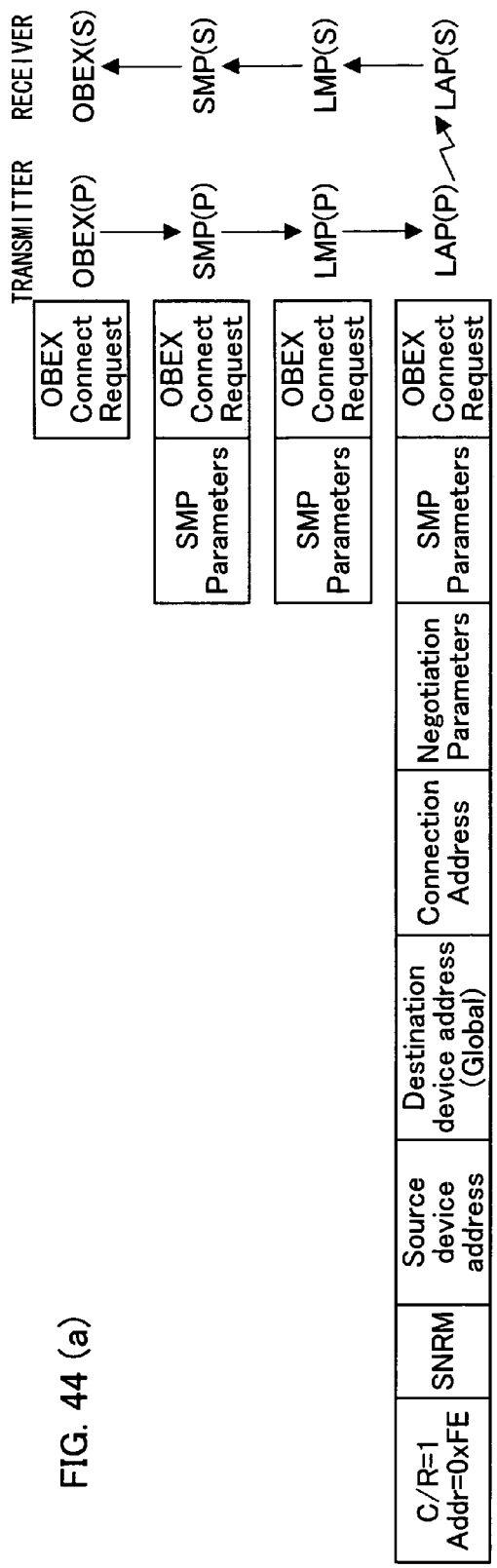
FIG. 44($a$) is an explanatory diagram illustrating change of data in the functions among the layers, which functions are indicated by right arrows in FIG. 43 and FIG. 45 and which functions are used in the connection sequence according to the embodiment of the present invention.
Figure 44:
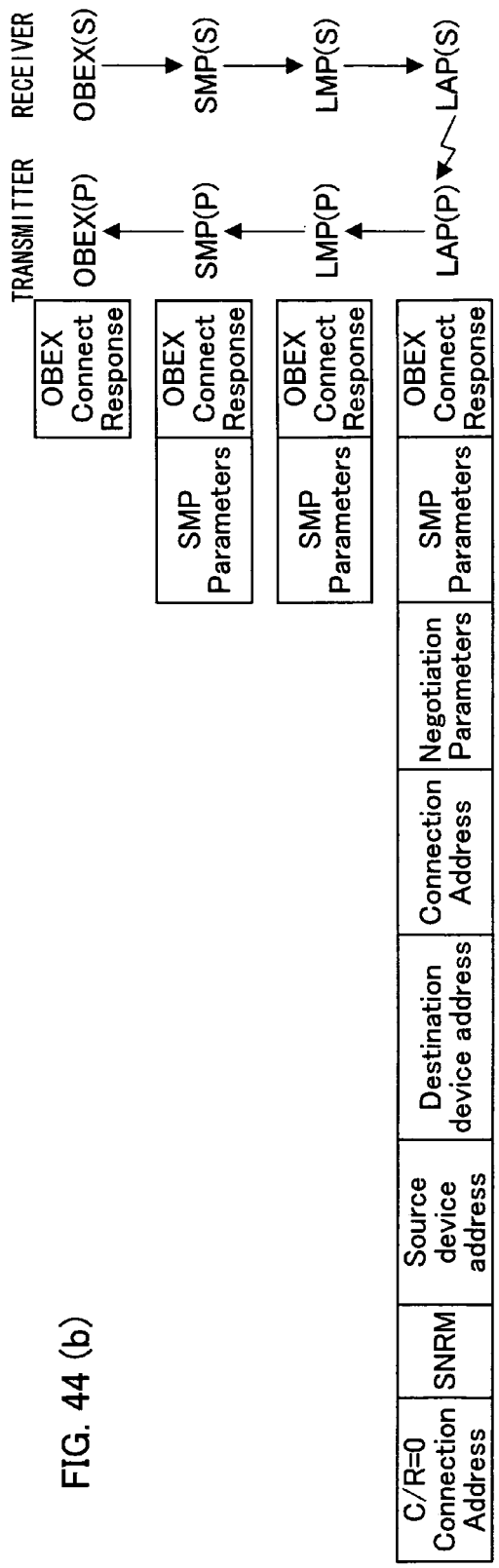
Figure 45:
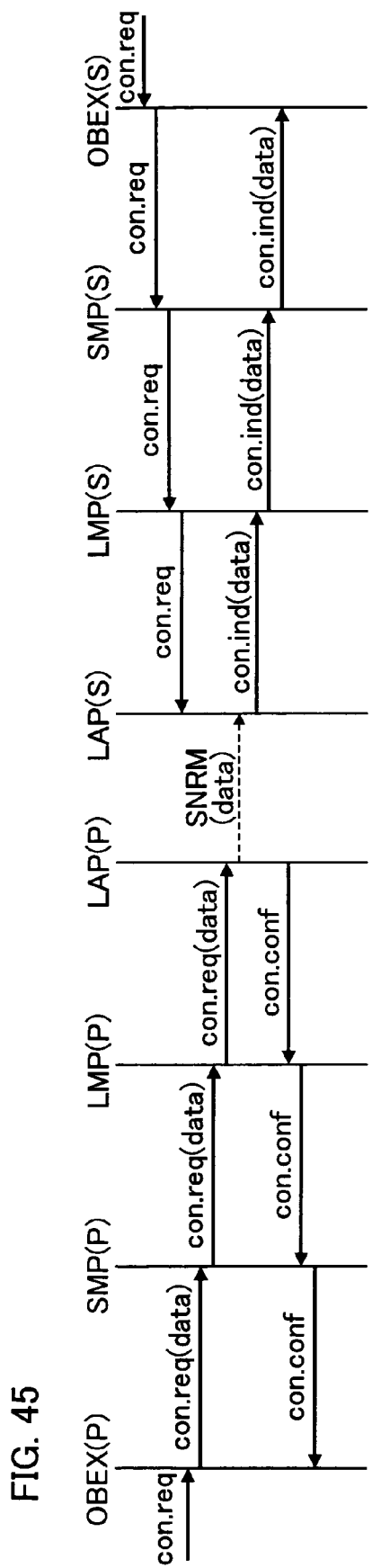
FIG. 45 is a sequence diagram illustrating flow of functions (commands, messages) and packets among layers in the connection sequence in the embodiment of the present invention.

FIG. 45 is a sequence diagram showing a connection sequence according to the present embodiment (response is not sent). FIG. 44(*a*) is an explanatory diagram showing a data structure of communication data used in the connection sequence according to the present embodiment (response is not sent).

As shown in FIG. 45, in the present embodiment (response is not sent), the transmitter and the receiver first carry out preparation for connection. Then, the transmitter passes on the request from the upper layer to the lower layers, and then transmits the request as a single packet (SNRM). Having transmitted the SNRM packet, the transmitter passes on the notification of completion of connection (Connect.confirm) from the LAP (P) to upper layers. Meanwhile, the receiver receives the SNRM packet, and passes on the notification of completion of connection to lower to upper layers. The connection is regarded completed when the notification of completion of connection is received by the OBEX (S).

The following separately describe the sequence in the transmitter and the sequence in the receiver.

First, the communication layers in the transmitter are explained.

When a connection request is transmitted from the application to the OBEX (P), the OBEX (P) immediately emits a connection request function (Primitive), which contains a connection request command, to the lower layer (SMP(P)). Further, when a connection confirmation function is transmitted from the SMP (P) to the OBEX (P), the OBEX (P) finishes the connecting operation.

The SMP (P) receives the connection request function from the OBEX (P), and immediately adds parameter(s) required for communication with the SMP (S) of the receiver to the data, and emits the connection request function to the lower layer (LMP(P)). When a connection confirmation function is transmitted from the LMP (P) to the SMP (P), the SMP (P) regards that the procedure has been done with the transmitted parameter(s), and finishes the negotiation for the SMP layer. Then, the SMP (P) transmits the connection confirmation function to the OBEX (P).

The LMP (P) receives the connection request function from the SMP (P), and immediately adds parameter(s) required for communication with the LMP (S) of the receiver to the data of connection request function from the SMP (P), and emits the connection request function to the lower layer (LAP (P)). When a connection confirmation function is transmitted from the LAP (P) to the LMP (P), the LMP (P) regards that the procedure has been done with the transmitted parameter(s), and finishes the negotiation for the LMP layer. Then the LMP (P) transmits the connection confirmation function to the SMP (P).

Note that, in general operation, an LSAP (Link Service Access Point) is defined to manage the logic port. When the connection is established by connecting the layers one by one, the LMP is not required. In this case, a connectionless value is used as the fixed value of LSAP. Therefore, the exchange of connection parameter(s) for LMP is not required.

The LAP (P) receives the connection request function from the LMP (P), and immediately adds parameter(s) required for communication with the LAP (S) of the receiver to the data of connection request function from the LMP (P), and emits the SNRM command to the physical layer of the receiver. Transmitting the SNRM command, the LAP (P) regards that the procedure has been done with the transmitted parameter(s), and finishes the negotiation for the LAP layer. Then the LAP (P) transmits the connection confirmation function to the LMP (P).

Next, the communication layers in the receiver are explained.

The OBEX (S) receives the connection request function from the application, and stands by for the next reception. When a connection notification function (Indication) is transmitted from the lower layer (SMP (S)), the OBEX (S) checks a command for OBEX connection which is contained in the data. When the command indicates that the connection has been properly done, the OBEX (S) finishes the connecting operation.

The SMP (S) receives the connection request function from the OBEX (S), and stands by for the next reception. When the connection notification function is transmitted from the lower layer (LMP (S)), the SMP (S) extracts parameter(s) generated by the SMP (P) of the transmitter from the data of the function, and finishes negotiation by using the parameter(s). Then the SMP (S) emits the connection request function containing the data thus created by removing the parameter(s) of SMP (P) from the data of the function, to the OBEX (S).

The LMP (S) receives the connection request function from the SMP (S), and stands by for the next reception. When the connection notification function is transmitted from the lower layer (LAP (S)), the LMP (S) extracts parameter(s) generated by the LMP (P) of the transmitter from the data of the function, and finishes negotiation by using the parameter(s). Then the LMP (S) emits the connection request function containing the data thus created by removing the parameter(s) of LMP (P) from the data of the function, to the SMP (S).

Note that, in general operation, an LSAP (Link Service Access Point) is defined to manage the logic port. When the connection is established by connecting the layers one by one, the LMP is not required. In this case, a connectionless value is used as the fixed value of the LSAP. Therefore, the exchange of connection parameter(s) for the LMP is not required.

The LAP (S) receives the connection request function from the LMP (S), and stands by for the next reception. When the SNRM command is transmitted from the physical layer, the LAP (S) extracts parameter(s) generated by the LAP (P) of the transmitter from the SNRM command, and finishes negotiation by using the parameter(s). Then the LAP (S) emits the connection request function containing the data thus created by removing the parameter(s) of LAP (P) from the data of the function, to the LMP (S).

(3-2) Data Exchange Sequence

[A] Response is Sent

Figure 46:
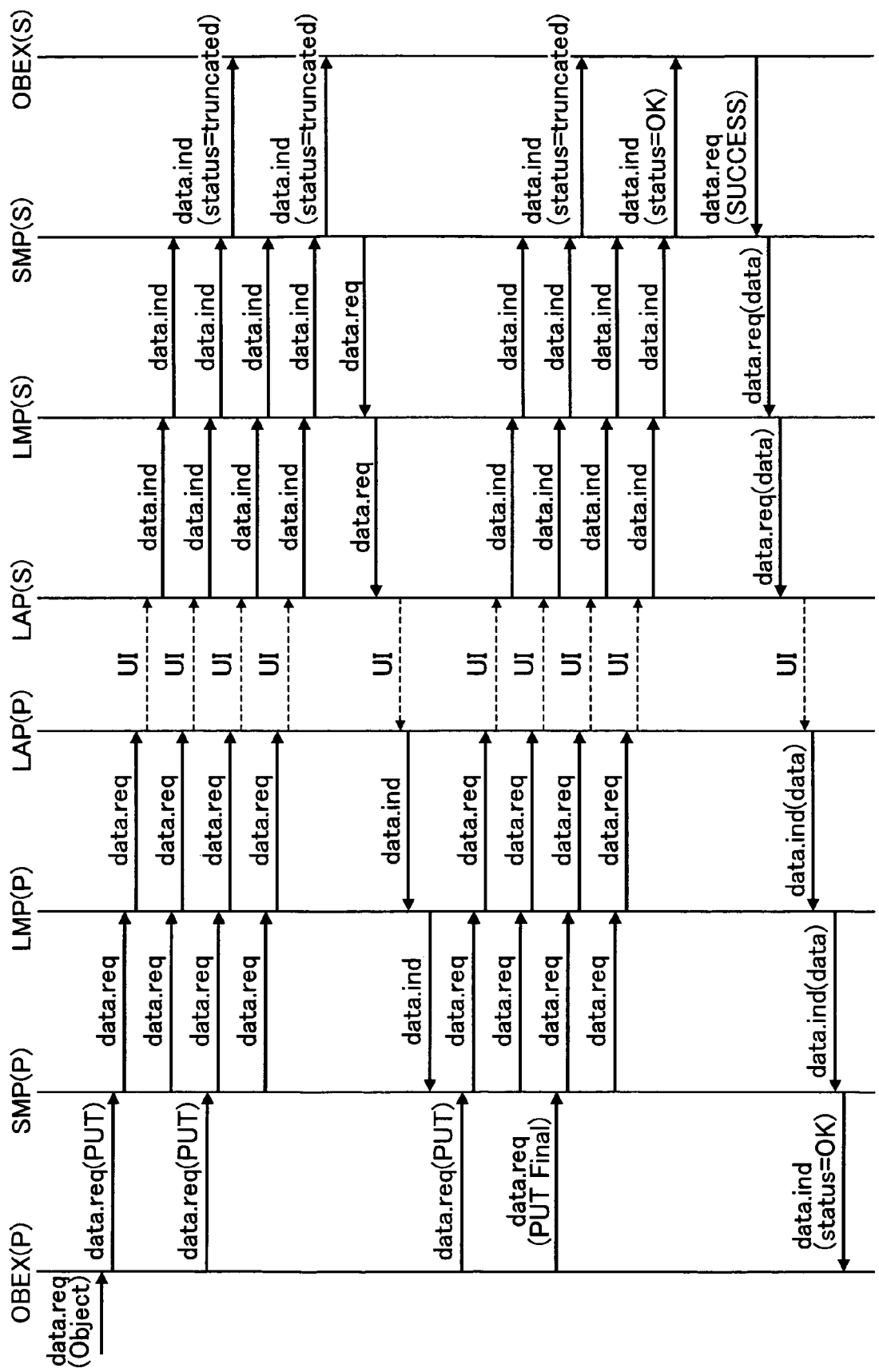
FIG. 46 is a sequence diagram illustrating flow of functions (commands, messages) and packets among layers in the data exchange sequence in the embodiment of the present invention.
Figure 47:
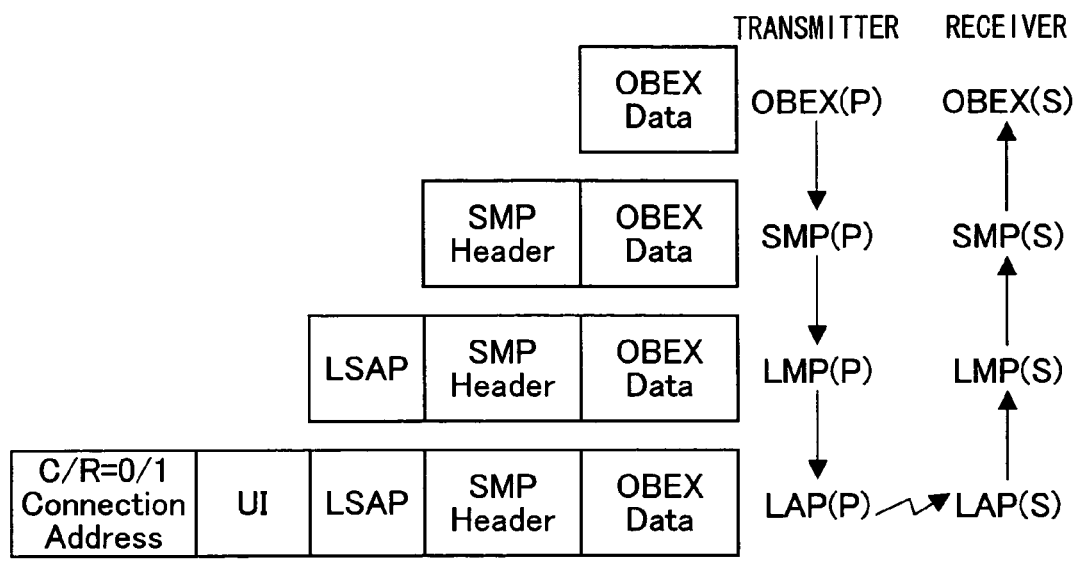
FIG. 47 is a diagram illustrating change of data in the functions among the layers, which functions are described in FIG. 46 and FIG. 48 and which functions are used in the data exchange sequence of the embodiment of the present invention.

FIG. 46 is a sequence diagram showing a data exchange sequence according to the present embodiment (response is sent). FIG. 47 is an explanatory diagram illustrating a structure of communication data used in the data connection sequence of the present embodiment (response is sent).

As shown in FIG. 46, in the present embodiment (response is sent), the transmitter generates a PUT command, which is propagated through the lower layers to be transmitted as an UI frame (FIG. 40(*b*)).

Obtaining the data, the receiver propagates a notification from lower to upper layers. At this time, the SMP (S) notifies the upper layer OBEX (S) of continuity of data (status=truncated).

After transmitting a predetermined number of packets, the transmitter transmits a packet in which the flag for confirming proper data transmission is on. The receiver on the other end receives the data with the flag on, and checks if the transmission has been done properly. If an error is detected, the SMP(S) informs the transmitter of packet number which has not been received due to the error.

If no error is detected, the transmitter outputs the next packets. If an error is detected, the transmitter retransmits packets having been suspended after the error.

The transmitter puts an ON-flag in the final data, the flag indicating that this is the final data. Meanwhile, the SMP(S) notifies the OBEX (S) that all data items have been received (status=OK), and stands by for a response from the OBEX (S). The response generated from the OBEX (S) is propagated to the lower layers, and is outputted as an UI frame.

If the response is "Success", the transmitter finishes the operation in a general way.

The following separately describes the sequence in the transmitter and the sequence in the receiver.

In the transmitter, the OBEX (P) outputs a PUT command to the lower layers as a data transmission function. However, if the SMP (P) is capable of transmission without a response ("Continue" in general) with respect to a PUT command, except for the PUT Final (final PUT), the OBEX (P) outputs the next command. In the case of a command other than the PUT Final or the PUT command, the operation is suspended to wait for the data notification function from the lower layer, and the command is finished after checking the response in the data.

The data transmission function denotes a function (Data Request) for requesting the lower layer to transmit data. Further, the data notification function denotes a function (Data Indicate) serving as a notification of data reception from the lower layer.

In the receiver, the OBEX (S) receives data from the lower layer with the data notification function. However, the OBEX (S) does not send back a response to PUT commands other than the PUT Final command, and sends back, as a response, a data transmission function to commands other than the PUT Final command or PUT command.

The following explains a header etc. of the data transmission functions and the data notification functions in the upper and lower layers. These functions are used for both the transmitter and the receiver.

In receiving the data transmission function from the OBEX, (a) if the predetermined size for transmission data in the LMP is smaller than the size of data in the data transmission function, the SMP divides the data into smaller items to allow the LMP to transmit the data. On the other hand, (b) if the predetermined size for transmission data in the LMP is larger than the size of data in the data transmission function, the SMP combines plural data items of the data transmission function to make data having a larger volume but being transmittable. The SMP also creates a SMP header constituted of, for example, a sequential number, an argument for asking the device in the other end about data reception condition, an argument indicating the end of data, an argument indicating necessity of transmission of OBEX response to the other end, and an argument indicating whether the received data was a complete set of data items. Further, the SMP header is added to the divided/combined data and is contained in the data transmission function. The data transmission function is transmitted to the LMP.

When the SMP receives the data notification function from the LMP, the SMP extracts the SMP header from the data in the function, and checks whether the sequential numbers are appropriate (i.e., the numbers are in sequence). If the numbers are in sequence, the SMP transmits the data notification function to the OBEX. At this point, the data notification function may be outputted for each data notification function coming from the lower layer, or for a predetermined set of those.

The SMP (P) of the transmitter modifies the data transmission function from the OBEX (P), into a data transmission function suitable for the LMP (P), and emits the data transmission function with a predetermined amount of data. After that, the SMP (P) sets "true" for the argument for asking the receiver about data reception condition, and transmits the data transmission function. The SMP then stands by for the data notification function from the LMP (P).

The SMP (P) analyzes the SMP header in the data notification function sent from the LMP(S), and confirms if the transmission has been done properly, by referring to the argument indicating whether the received data was a complete set of data items. Having been confirmed that the transmission has been done properly, the SMP is turned into a state allowing transmission to the OBEX (P), that is, it is ready to send the next data. In this state, the SMP (P) is capable of receiving data from the OBEX (P).

On the other hand, when the SMP found out, according to the argument indicating whether the received data was a complete set of data items, that the transmission has not been done properly, the SMP (P) regenerates data sequence from the unsent data transmission function to the argument set to "true" for asking the receiver about data reception condition. The SMP (P) repeats the regeneration predetermined times, or until the all data of the data transmission function is received in the receiver.

Further, when the SMP (P) receives from OBEX (P) the data transmission function with an argument indicating the end of data, which is set to "true", the SMP (P) sets "true" for the argument indicating the end of data, or for the argument indicating necessity of response from OBEX(S) in the data of transmission function to the LMP (P), and sends this new transmission function to the LMP (P).

On the other hand, when the SMP (S) of the receiver receives from the LMP (S) the data transmission function in which either the argument indicating the end of data or the argument indicating necessity of transmission of OBEX response to the other end is set to "true", the SMP (S) removes the header of the SMP (S) from the data notification function before transmitting the function to the OBEX (S).

Further, when the SMP (S) receives the data notification function from the LMP (S), the SMP (S) analyzes the SMP header in the data notification function, and checks the sequential number. If the SMP (S) confirms that the receiver has received all data items until the header in which the argument for asking the receiver about data reception condition is "true", the SMP (S) creates a SMP header by modifying the argument indicating whether the received data was a complete set of data items into an appropriate format for indicating that the received data was a complete set of data items. With this data, the SMP (S) transmits the data transmission function to the LMP (S).

On the other hand, when the SMP (S) found out that there was a problem in data reception in the receiver, the SMP (S) infers the number of SMP header not transmitted and stores the number. For example, when the data items 0, 1, 2, 3, 5 are received, obviously the fifth number should be "4", but "4" is missing. That is, the number of data not received is "4". After this, the SMP(S) only checks if the argument for asking the receiver about data reception condition is set to "true" in the SMP header, and stops output of the data notification function to the OBEX (S).

When the SMP (S) receives the data notification function in which the argument for asking the receiver about data reception condition is "true", the SMP (S) creates a SMP header by modifying the argument indicating whether the received data was a complete set of data items into an appropriate format for indicating that the received data was not a complete set of data items, and inserting the number of the SMP header not properly received into the field for the sequential number. With this data, the SMP (S) transmits the data transmission function to the LMP (S).

Further, when the SMP (S) receives the data notification function in which either the argument indicating the end of data or the argument indicating necessity of transmission of OBEX (S) response to the other end is "true", the SMP (S) transmits the data notification function to the OBEX (S), and stands by for a data transmission request from the OBEX (S).

When the SMP (S) receives a data transmission request from the OBEX (S), the SMP (S) creates a SMP header by modifying the argument indicating whether the received data was a complete set of data items into an appropriate format for indicating that the received data was a complete set of data items. The SMP (S) adds the SMP header to the data transmission function from the OBEX (S), and sends the resulting data to the LMP (S). Note that, since the notification to the OBEX (S) stops in case of error, the SMP (S) stands by only when the transmission is properly completed.

When the LMP receives the data transmission request function from the upper layer, the LMP adds a LMP header to the data of the data transmission request function, and adds the data to the data transmission function, and transmits the function to the LAP. Further, when the LMP receives the data notification function from the LAP, the LMP removes the LMP header from the data of the function and provides the resulting data in the data notification function, and transmits the function to the SMP.

Note that, when the connection is established by connecting the layers one by one, the LMP is not required. In this case, the LMP header includes LSAP having a connectionless value.

When the LAP receives the data transmission request function from the LMP, the LAP adds a LAP header to the data of the data transmission request function, and incorporates this data into a UI frame, and transmits the UI frame to the physical layer. Further, when the LAP receives the data reception notification from the physical layer, the LAP removes the LAP header from the data of UI frame and incorporates the resulting data into the data notification function, and transmits the function to the LMP. Note that, in the present embodiment, the LAP header contains a connection address and an UI indicator.

[B] Response is not Sent

Figure 48:
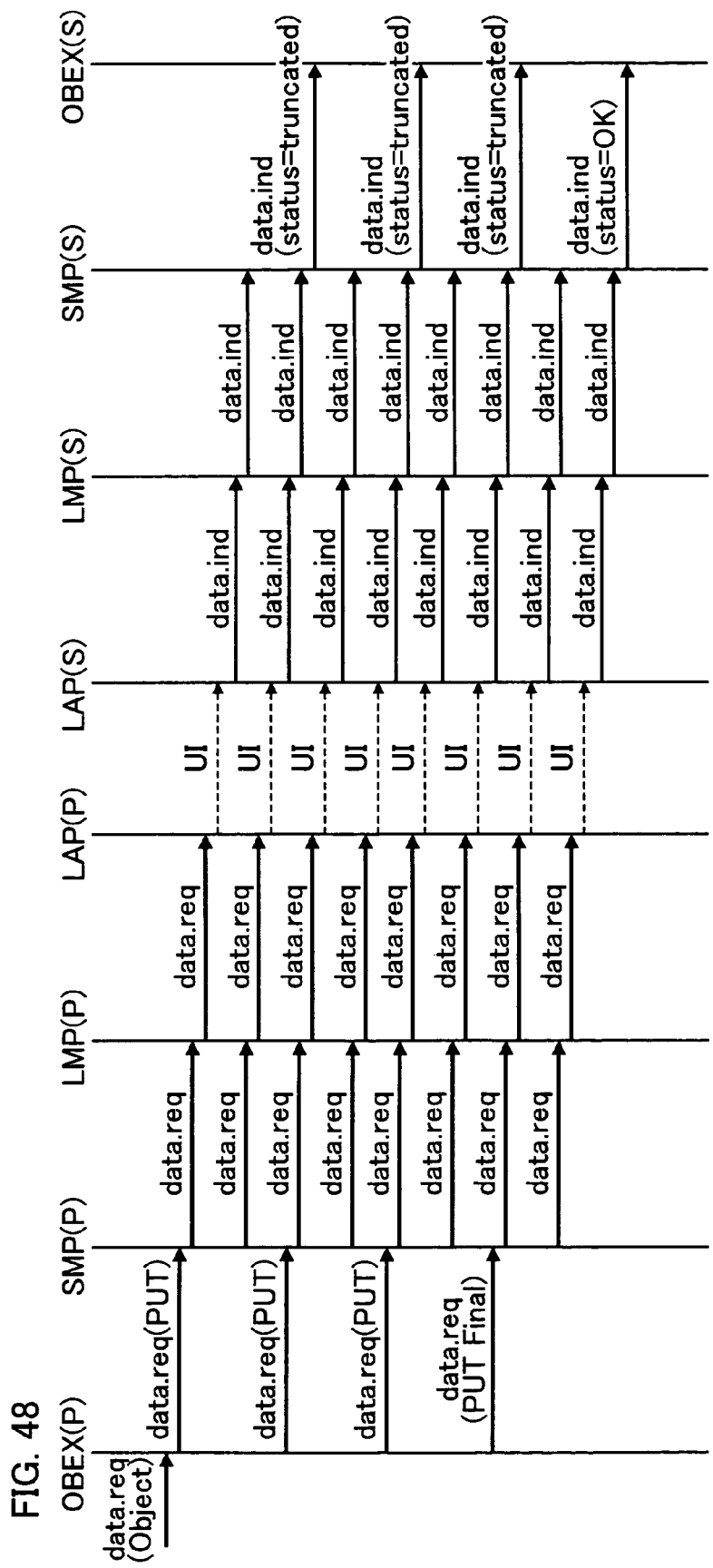
FIG. 48 is a sequence diagram illustrating flow of functions and packets among layers in the data exchange sequence according to the embodiment of the present invention.

FIG. 48 is a sequence diagram showing a data exchange process according to the present embodiment (response is not sent). FIG. 47 is an explanatory diagram showing a data structure of communication data used in the connection sequence according to the present embodiment (response is not sent).

As shown in FIG. 48, in the present embodiment (response is not sent), the transmitter generates a PUT command, and the PUT command is propagated through the lower layers, and is outputted as an UI frame.

Obtaining the data, the receiver propagates a notification from lower to upper layers. At this time, the SMP (S) notifies the upper layer OBEX (S) of continuity of data (status=truncated).

The transmitter puts an ON-flag in the final data, the flag indicating that this is the final data. Meanwhile, the receiver confirms the ON-flag of the SMP (S), and notifies the OBEX (S) that all data items have been received (status=OK), and then finishes data exchange sequence.

The following separately describe the sequence in the transmitter and the sequence in the receiver.

In the transmitter, the OBEX (P) outputs a PUT command to the lower layers as a data transmission function. However, the OBEX (P) is capable of finishing a command without a response with respect to each command. Then, the OBEX (P) outputs the next command if transmission is allowed in the SMP (P).

In the receiver, the OBEX (S) receives the data notification function from the lower layer. However, the OBEX (S) does not send back a response for each command, only receiving data.

The following explains a header etc. of the data transmission functions and the data notification functions in the upper and lower layers. These functions are used for both the transmitter and the receiver.

In receiving the data transmission function from the OBEX, (a) if the predetermined size for transmission data in the LMP is smaller than the size of data in the data transmission function, the SMP divides the data into smaller items to allow the LMP to transmit the data. On the other hand, (b) if the predetermined size for transmission data in the LMP is larger than the size of data in the data transmission function, the SMP combines plural data items of the data transmission function to make data having a larger volume but being transmittable. The SMP also creates a SMP header constituted of, for example, a sequential number, an argument for asking the device in the other end about data reception condition, an argument indicating the end of data, an argument indicating necessity of transmission of OBEX response to the other end, and an argument indicating whether the received data was a complete set of data items. Further, the SMP header is added to the divided/combined data and is contained in the data transmission function. The data transmission function is transmitted to the LMP.

When the SMP receives the data notification function from the LMP, the SMP extracts the SMP header from the data in the function, and checks whether the sequential numbers are appropriate (i.e., the numbers are in sequence). If the numbers are in sequence, the SMP transmits the data notification function to the OBEX. At this point, the data notification function may be outputted for each data notification function coming from the lower layer, or for a predetermined set of those.

The SMP (P) of the transmitter modifies the data transmission function from OBEX (P), into a data transmission function suitable for the LMP (P). When the SMP (P) receives from the OBEX(P) a data transmission function in which the argument for asking the receiver about data reception condition is set to "false", the SMP (P) adds the SMP header to the data, and transmits the data to the LMP (P). On the other hand, when the SMP (P) of the receiver receives from the OBEX(P) a data transmission function in which the argument indicating the end of data is set to "true", the SMP (P) sets "true" for the argument indicating the end of data, or for the argument indicating necessity of transmission of OBEX(S) response in the transmission function to the LMP (P), and sends this new transmission function to the LMP (S).

Further, when the SMP (S) receives the data notification function from the lower layer, the SMP (S) analyzes the SMP header in the data notification function, and checks the sequential number. If the SMP (S) confirms that the reception has been done normally, the SMP (S) transmits the data transmission function to the LMP (S).

On the other hand, when the SMP (S) found out that there was a problem in data reception in the receiver, the SMP (S) notifies the OBEX (S) of the error. For example, when the data items 0, 1, 2, 3, 5 are received, obviously the fifth number should be "4", but "4" is missing.

After that, the SMP (S) stands by for a function with a SMP header in which the argument indicating the end of data or the argument indicating necessity of transmission of OBEX (S) response to the other end is set to "true". The SMP (S) stops data notification to the OBEX (S) until it receives either the "true" data notification function (however no notification is sent to the OBEX (S)), receives a disconnection notification function, or does not carry out the data notification to the OBEX (S) until a certain time period has been elapsed.

When the LMP (P) of the transmitter receives a data transmission request function from the SMP (P), the LMP (P) adds the LMP header to the data of the function. The LMP (P) then transmits the data transmission function containing the created data to the LAP (P).

When the LMP (S) of the receiver receives the data notification request function from the LAP (S), the LMP (S) removes the LMP header from the data of the data notification request function, and provides the data to the data notification function, and transmits the function to the SMP (S).

Note that, when the connection is established by connecting the layers one by one, the LMP is not required. In this case, a connectionless value is used as the fixed value of LSAP.

When the LAP (P) of the transmitter receives the data transmission request function from the LMP (P), the LAP (P) adds a LAP header to the data of the data transmission request function, and incorporates this data into a UI frame, and transmits the UI frame to the physical layer.

Further, when the LAP (S) of the receiver receives the data reception notification from the physical layer, the LAP (S) removes the LAP header from the data of the UI frame and incorporates the resulting data into the data notification function, and transmits the function to the LMP (S). Note that, in the present embodiment, the LAP header contains a connection address and an UI indicator.

(3-3) Disconnection Sequence

[A] Response is Sent

Figure 49:
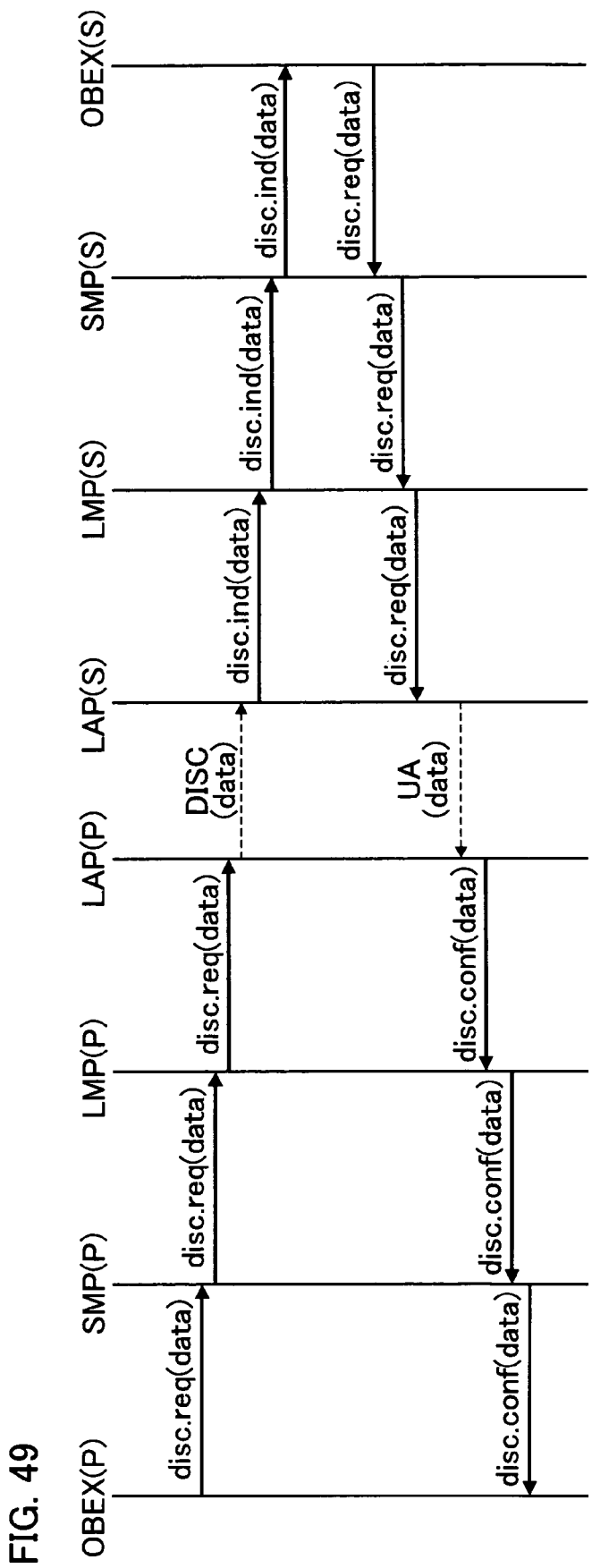
FIG. 49 is a sequence diagram illustrating flow of functions (commands, messages) and packets among layers in the disconnection sequence of the embodiment of the present invention.
Figure 50:
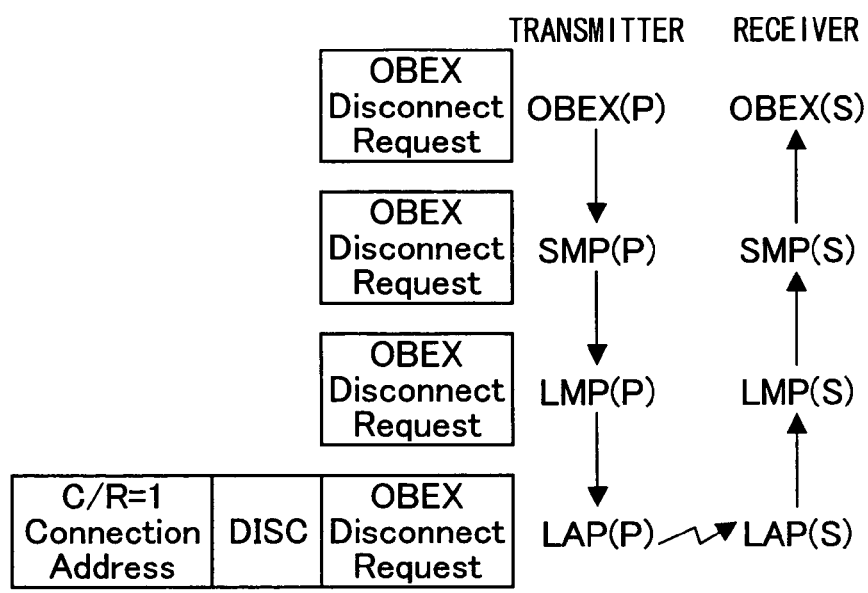
FIG. 50(*a*) is an explanatory diagram illustrating change of data in the functions among the layers, which functions are indicated by right arrows in FIG. 49 and FIG. 51 and which functions are used in the disconnection sequence of the embodiment of the present invention.
Figure 50:
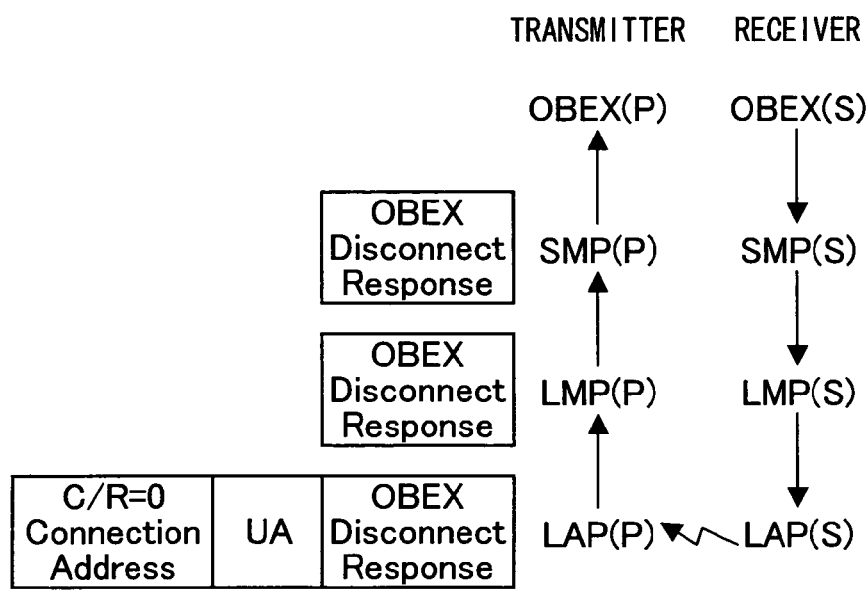

FIG. 49 is a sequence diagram showing a disconnection sequence according to the present embodiment (response is sent). FIGS. 50(a) and 50(b) are explanatory diagrams each illustrating a structure of communication data used in the disconnection sequence of the present embodiment (response is sent).

As shown in FIG. 49, in the present embodiment (response is sent), the disconnection command of the transmitter is propagated from upper to lower layers, and a DISC command is generated. Meanwhile, the receiver receives the DISC command, and passes on the command from lower to upper layers, and then passes on a response from upper to lower layers, and a UA response is generated. The notification of reception of the UA response is passed on from lower to upper layers of the transmitter, and the sequence is completed.

The following separately describes the sequence in the transmitter and the sequence in the receiver.

First, the communication layers in the transmitter are explained.

When a disconnection request is transmitted from the application to the OBEX (P), the OBEX (P) immediately emits a disconnection request function (Primitive), which contains a disconnection request command, to the lower layer (SMP (P)). Further, when a disconnection confirmation function is transmitted from the SMP (P) to the OBEX (P), the OBEX (P) checks a response for OBEX disconnection which is contained in the data. When the response tells that the disconnection has been properly done ("Success"), the OBEX (P) finishes the disconnecting operation.

The SMP (P) receives the disconnection request function from the OBEX (P), and immediately adds parameter(s) required for communication with the SMP (S) of the receiver to the data, and emits the disconnection request function to the lower layer (LMP (P)). When a disconnection confirmation function is transmitted from LMP (P) to the SMP (P), the SMP (P) extracts parameter(s) generated by the SMP (S) of the receiver from the data of the function, and checks the value, and then finishes the negotiation with the SMP (S). Further, the SMP (P) removes the parameter(s) of the SMP (S) from the data of the disconnection confirmation function, and transmits the resulting data to the OBEX (P) as the disconnection confirmation function. It however should be noted that there is no parameter to be added to the disconnection request function in the SMP (P).

The LMP (P) receives the disconnection request function from the SMP (P), and immediately adds parameter(s) required for communication with the LMP (S) of the receiver to the data of disconnection request function from the SMP (P), and emits the disconnection request function to the lower layer (LAP (P)). When a disconnection confirmation function is transmitted from the LAP (P) to the LMP (P), the LMP (P) extracts parameter(s) generated by the LMP (S) of the receiver from the data of the function, and checks the value, and then finishes the disconnecting operation with the LMP (S). Further, the LMP (P) removes the parameter(s) of the LMP (S) from the data of the disconnection confirmation function, and transmits the resulting data to the SMP (P) as the disconnection confirmation function. It however should be noted that there is no parameter to be added to the disconnection request function in the LMP (P).

The LAP (P) receives the disconnection request function from the LMP (P), and immediately adds parameter(s) required for communication with the LAP (S) of the receiver to the data of the disconnection request function from the LMP (P), and emits the DISC command to the physical layer of the receiver. When the UA response is transmitted from the physical layer of the receiver to the LAP (P), the LAP (P) extracts (a) parameter(s) generated by the LAP (S) of the receiver from the data of the UA response, and checks the value, and then finishes the disconnecting operation with the LAP (S). Further, the LAP (P) removes the parameter(s) of LAP (S) from the data of UA response, and transmits the resulting data to the LMP (P) as the disconnection confirmation function. It however should be noted that there is no parameter to be added to the disconnection request function in the LAP (P).

Next, the communication layers in the receiver are explained.

When a disconnection notification function (Indication) is transmitted from the lower layer (SMP (S)), the OBEX (S) checks a command for OBEX disconnection which is contained in the data. When the command indicates that the disconnection has been properly done, the OBEX (S) emits a response called "Success" as a disconnection response function to the SMP (S), and finishes the disconnecting operation.

When the disconnection notification function is transmitted from the lower layer (SMP (S)), the SMP (S) extracts parameter(s) generated by the SMP (P) of the transmitter from the data of the function, and creates parameter(s) for response, and emits the disconnection request function containing the data thus created by removing the parameter(s) of the SMP (P) from the data of the function, to the OBEX (S), and then stands by for a disconnection response function which comes from the OBEX (S). Further, when the disconnection response function is transmitted from the OBEX (S), the SMP (S) adds the parameter(s) of the response to the data of the disconnection response function of the OBEX (S), emits the disconnection response function to the LMP (S), and finishes the disconnection in the SMP layer. It however should be noted that there is no parameter to be added to the disconnection request function in the SMP (S).

When the disconnection notification function is transmitted from the lower layer (LAP (S)), the LMP (S) extracts parameter(s) generated by the LMP (P) of the transmitter from the data of the function, and creates parameter(s) for response, and emits the disconnection request function containing the data thus created by removing the parameter(s) of the LMP (P) from the data of the function, to the SMP (S), and then stands by for a disconnection response function which comes from the SMP (S). Further, when the disconnection response function is transmitted from the SMP (S), the LMP (S) adds the parameter(s) of the response to the data of disconnection response function of the SMP (S), emits the disconnection response function to the LAP (S), and finishes the disconnection in the LMP layer. It however should be noted that there is no parameter to be added to the disconnection request function in the LMP (S).

When the DISC command is transmitted from the physical layer, the LAP (S) extracts parameter(s) generated by the LAP (P) of the transmitter from the DISC command, and creates parameter(s) for response after transmitting the disconnection request function, containing the data thus created by removing the parameter(s) of LAP (P) from the data of the command, to the LMP (S), and then stands by for a disconnection response function which comes from the LMP (S). Further, when the disconnection response function is transmitted from the LMP (S), the LAP (S) adds the parameter(s) of the response to the data of disconnection response function of the LMP (S), emits the UA response to the physical layer, and finishes the disconnection in the LAP layer. It however should be noted that there is no parameter to be added to the disconnection request function in the LAP (S).

[B] Response is not Sent

Figure 51:
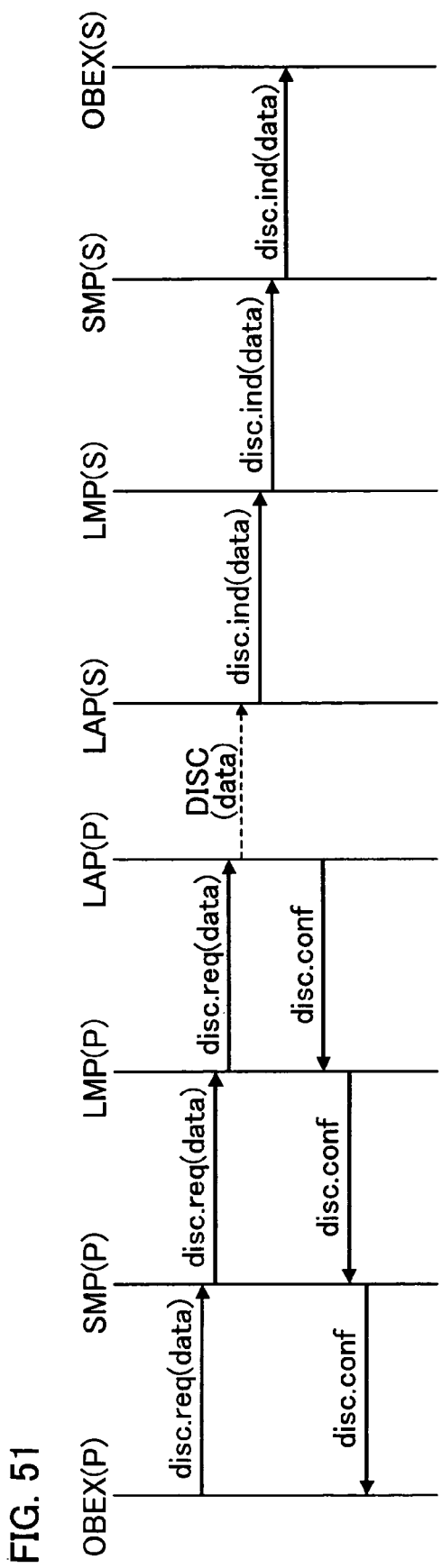
FIG. 51 is a sequence diagram illustrating flow of functions (commands, messages) and packets among layers in the connection sequence of the embodiment of the present invention.

FIG. 51 is a sequence diagram showing a disconnection sequence according to the present embodiment (response is not sent). FIG. 50(a) is an explanatory diagram illustrating a structure of communication data used in the disconnection sequence of the present embodiment (response is not sent).

As shown in FIG. 51, in the present embodiment (response is not sent), the disconnection command of the transmitter is propagated from upper to lower layers, and a DISC command is generated. In the transmitter, the disconnecting operation is completed at this point. Meanwhile, the receiver receives the DISC command, and passes on the DISC command from lower to upper layers. When the DISC command is passed onto the uppermost layer, the disconnection sequence is completed.

The following separately describes the sequence in the transmitter and the sequence in the receiver.

First, the communication layers in the transmitter are explained.

When a disconnection request is transmitted from the application to the OBEX (P), the OBEX (P) immediately emits a disconnection request function (Primitive), which contains a disconnection request command, to the lower layer (SMP (P)). Further, when a disconnection confirmation function is transmitted from SMP (P) to the OBEX (P), the OBEX (P) finishes the disconnecting operation.

The SMP (P) receives the disconnection request function from the OBEX (P), and immediately adds parameter(s) required for communication with the SMP (S) of the receiver to the data, and emits the disconnection request function to the lower layer (LMP (P)). When a disconnection confirmation function is transmitted from the LMP (P) to the SMP (P), the disconnection is completed with the transmitted parameter(s) and the SMP (P) finishes the disconnection in the SMP (S). Further, the SMP (P) transmits the disconnection confirmation function to the OBEX (P). It however should be noted that there is no parameter to be added to the disconnection request function in the SMP (P).

The LMP (P) receives the disconnection request function from the SMP (P), and immediately adds parameter(s) required for communication with the LMP (S) of the receiver to the data of disconnection request function from the SMP (P), and emits the disconnection request function to the lower layer (LAP (P)). When a disconnection confirmation function is transmitted from the LAP (P) to the LMP (P), the disconnection is completed with the transmitted parameter(s), and the LMP (P) finishes the disconnection in the LMP layer. Further, the LMP (P) transmits the disconnection confirmation function to the SMP (P). It however should be noted that there is no parameter to be added to the disconnection request function in the LMP (P).

The LAP (P) receives the disconnection request function from the LMP (P), and immediately adds parameter(s) required for communication with the LAP (S) of the receiver to the data of disconnection request function from the LMP (P), and emits the DISC command to the physical layer of the receiver. When a DISC command is outputted, the disconnection is completed with the transmitted parameter(s), and the LMP (P) finishes the disconnection in the LAP layer. Further, the LAP (P) transmits the disconnection confirmation function to the LMP (P). It however should be noted that there is no parameter to be added to the disconnection request function in the LAP (P).

Next, the communication layers in the receiver are explained.

When a disconnection notification function (Indication) is transmitted from the lower layer (SMP (S)), the OBEX (S) checks a command for OBEX disconnection which is contained in the data. When the command indicates that the disconnection has been properly done, the OBEX (S) finishes the disconnecting operation.

When the disconnection notification function is transmitted from the lower layer (SMP (S)), the SMP (S) extracts parameter(s) generated by the SMP (P) of the transmitter from the data of the function, and completes the disconnection with the parameter(s). Further, the SMP (S) removes the SMP (P) parameter(s) from the data of the disconnection notification function, incorporates the data into a disconnection request function, and sends it to the OBEX (S). It however should be noted that there is no parameter to be added to the disconnection request function in the SMP (S).

When the disconnection notification function is transmitted from the lower layer (LAP (S)), the LMP (S) extracts parameter(s) generated by the LMP (P) of the transmitter from the data of the function, and finishes the disconnection with the parameter(s). Further, the LMP (S) removes the parameter(s) of LMP (P) from the data of the function, incorporates the data into a disconnection request function, and sends it to the SMP (S). It however should be noted that there is no parameter to be added to the disconnection request function in the LMP (S).

When the DISC command is transmitted from the physical layer, the LAP (S) extracts parameter(s) generated by the LAP (P) of the transmitter from the DISC command, and completes disconnection with the parameter(s). Further, the LAP (S) removes the parameter(s) of the LAP (P) from the data of DISC command, and incorporates the resulting data to the disconnection request function and then emits the function to the LMP (S). It however should be noted that there is no parameter to be added to the disconnection request function in the LAP (S).

(4) Selection as to Whether or not a Response is to be Sent

With reference to FIGS. 52 to 59, the following explains a flow of data and parameter(s) among the respective communication layers in the transmitter and the receiver.

In the present embodiment, the communication layers LAP, LMP, SMP, OBEX each has a connection request function, a connection notification function, a connection response function, and a connection confirmation function, respectively. These functions are used for access to the LAP layer from the upper layer (i.e., LMP layer).

For these functions, Data (hereinafter referred simply as data), Requested-QoS, or Returned-QoS may be specified as an argument. As described above, the data is determined in each layer.

Meanwhile, QoS notifies the upper layers, including OBEX, of the negotiation parameter(s) such as a baud rate determined in the LAP, and a negotiation result. Note that, the conventional IrDA also uses QoS.

For example, when the application or the OBEX (P) of the transmitter emits a QoS having a parameter indicating that a response is required or is not required, it is propagated through the lower layers and reaches the LAP (P). Then, the LAP (P) uses the value of the QoS as the value of the negotiation parameter(s) (Ack Less Connect), and transmits the parameter(s) to the receiver.

Consequently, the communication layers of the transmitter and the communication layers of the receiver are operated depending on whether or not the application or the OBEX (P) of the transmitter requires a response, thereby enabling connection both in a two-way manner and in a one-way manner.

FIGS. 52 to 56 are explanatory diagrams each showing a flow of data and parameter(s) among the respective communication layers in the connection sequence (FIG. 43) according to the present embodiment (response is sent). Note that, the respective QoS parameter(s) between OBEX-SMP, between SMP-LMP, between LMP-LAP may be identical or different. They are discriminated by the added symbols -a, -b, and -c in the figures.

Figure 52:
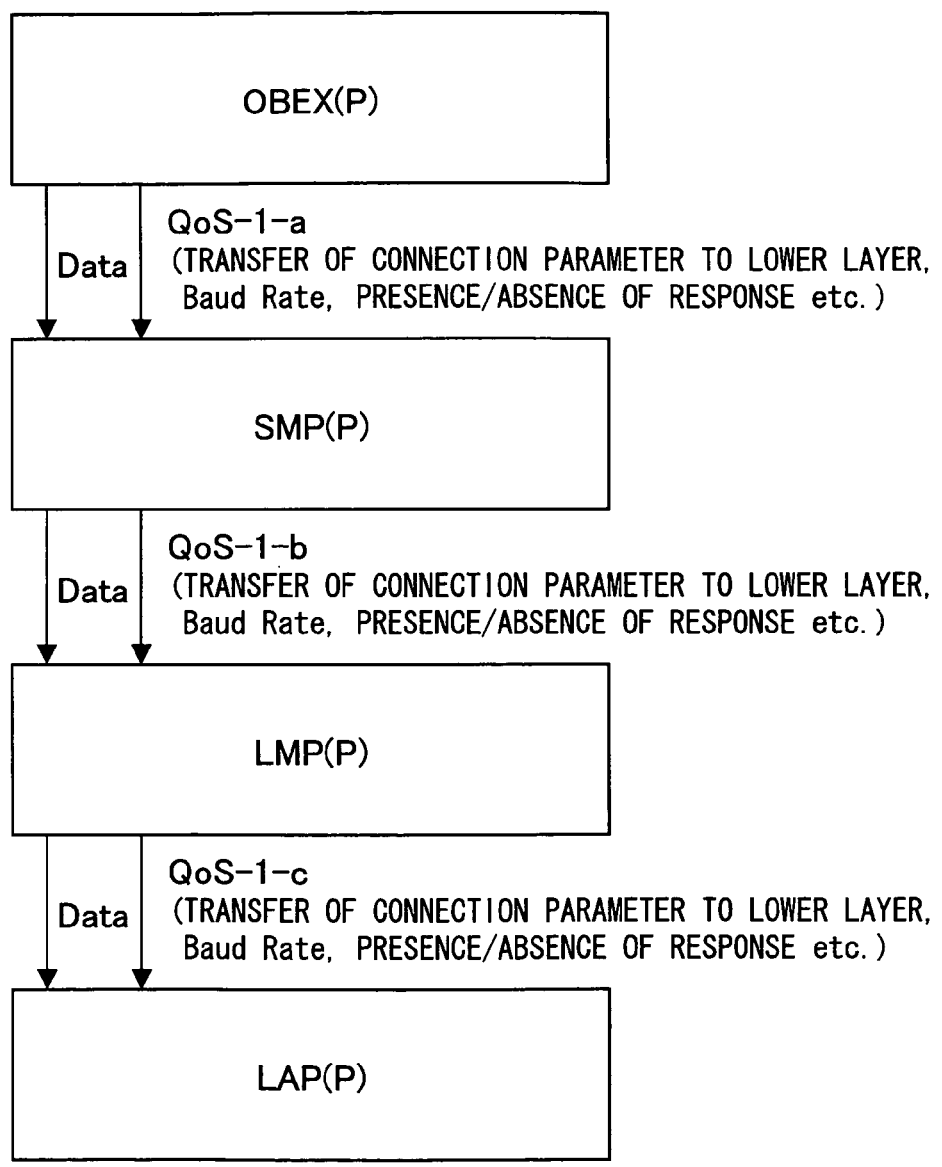
FIG. 52 is a diagram schematically illustrating transfer of (i) data of a connection request function and (ii) a connection parameter in a primary station, in the embodiment of the present invention.

In the transmitter, as shown in FIG. 52, the data to be transmitted to the receiver and the data of QoS-1 (QoS requested by the transmitter) are propagated through upper to lower layers by con.req (data) (FIG. 43).

Figure 53:
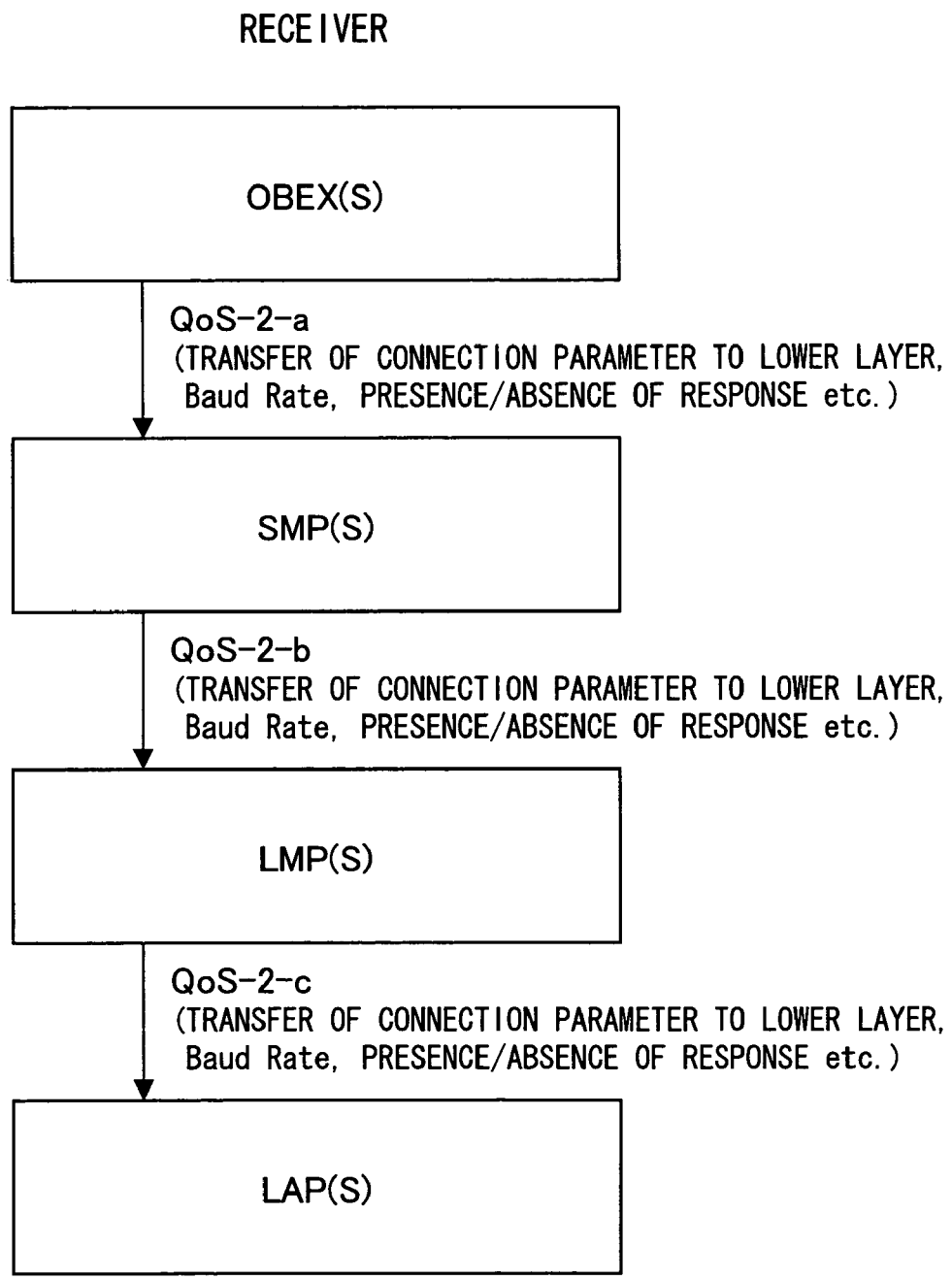
FIG. 53 is a diagram schematically illustrating transfer of (i) data of a connection request function and (ii) a connection parameter in a secondary station, in the embodiment of the present invention.

Meanwhile, in the receiver, as shown in FIG. 53, only the data of QoS-2 (QoS requested by the receiver) is propagated through upper to lower layers by the con.req.

Figure 54:
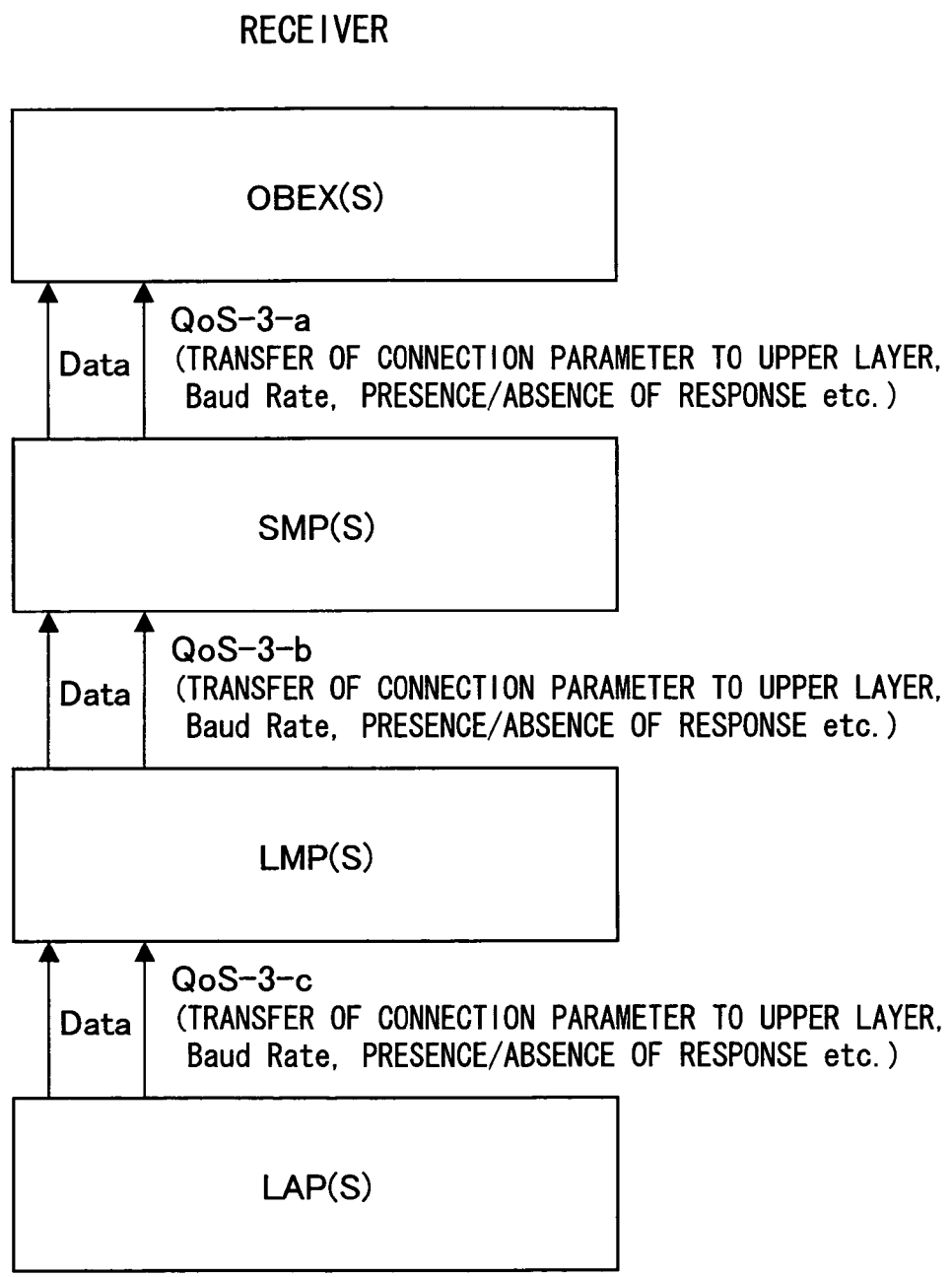
FIG. 54 is a diagram schematically illustrating how a connection confirmation function sent from the primary station, data of a connection notification function, and a connection parameter are transferred in the secondary station according to the embodiment of the present invention.

Thereafter, in the receiver, the QoS-1 of the transmitter and the QoS-2 of the receiver are compared at the time of receiving the SNRM command in the LAP (S), thereby creating common negotiation parameter(s) QoS-3. Then, as shown in FIG. 54, the LAP (S) passes on the QoS-3 and the data from the transmitter to the upper layers by con.ind (data). The upper layers each stores the QoS-3 and keeps it as connection parameter(s) to establish connection.

Figure 55:
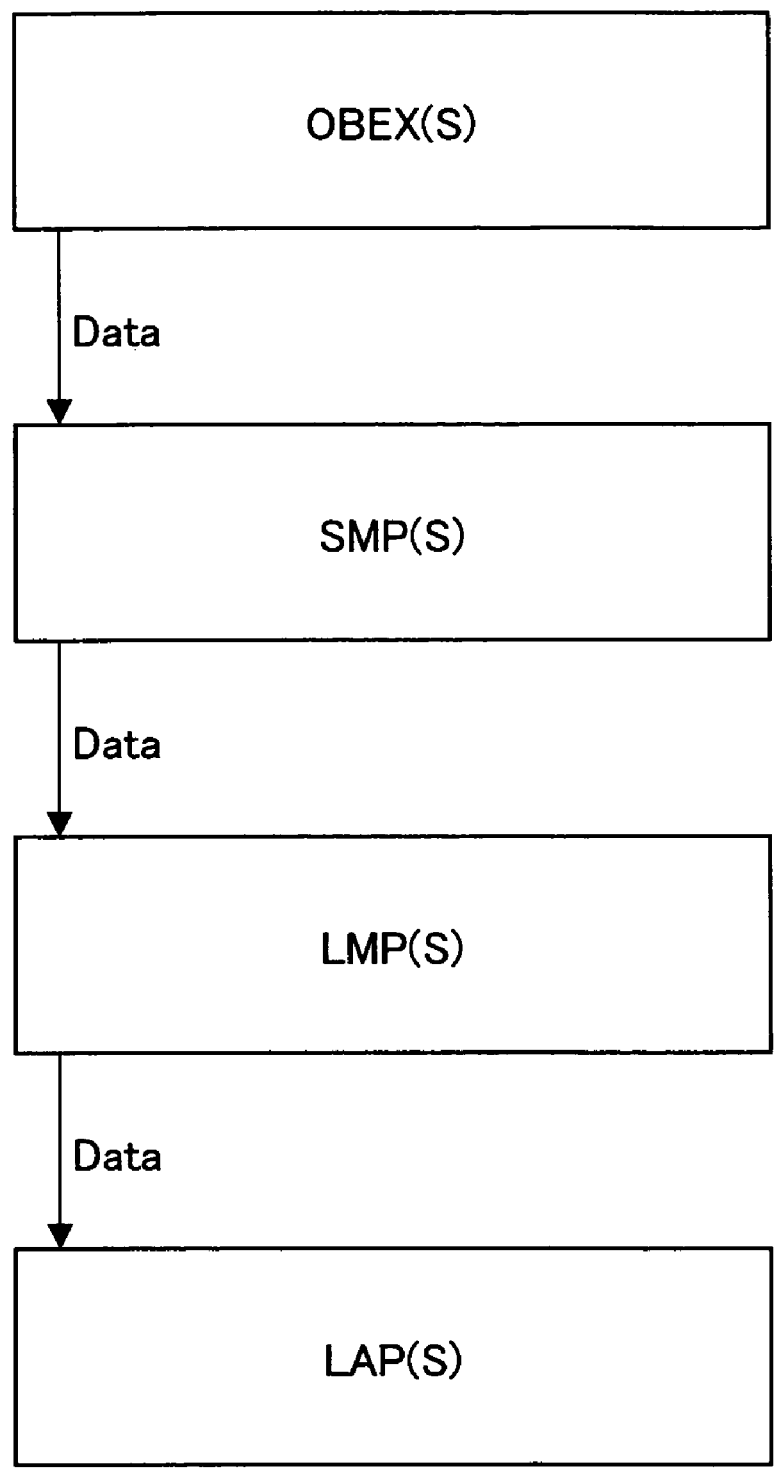
FIG. 55 is a diagram schematically illustrating propagation of data of a connection response function in the secondary station according to the embodiment of the present invention.

In the receiver, QoS is not required in propagation of con. resp (data). Therefore, as shown in FIG. 55, only data is propagated from upper to lower layers by the con.resp (data). Then, when the LAP (S) receives the con.resp (data), the QoS-3 is incorporated in the UA response, and the UA response is transmitted.

Figure 56:
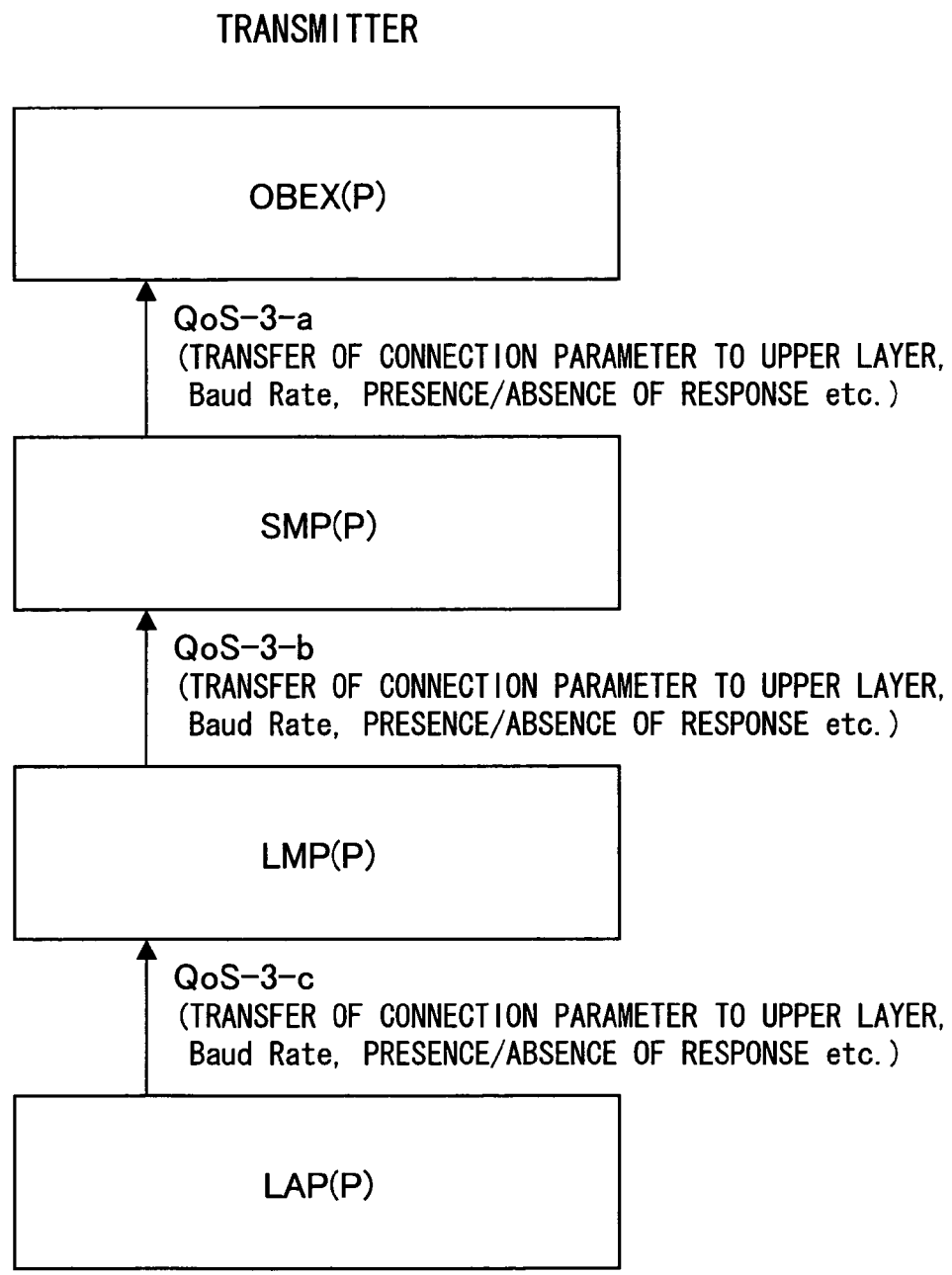
FIG. 56 is a diagram schematically illustrating transfer of a connection parameter of a connection confirmation function in the primary station, in the embodiment of the present invention.

In the transmitter, the LAP (P) receives the UA response and stores the QoS-3 as negotiation parameter(s). Then, as shown in FIG. 56, the LAP (P) passes on the QoS-3 and the data from the receiver to the upper layers by con.conf (data).

The communication layers each stores the QoS-3 and keeps it as connection parameter(s) to establish connection.

In the present embodiment, as a QoS of con.req, "Requested-QoS:Baud-Rate+Max-Turn-Around-Time+Disconnect-Threshold+DataSize+Ack less connection+Min-Packet-Interval" is used. Further, as a QoS of Con.ind,con.conf, "Resultant-QoS:Baud-Rate+Disconnect-Threshold+DataSize+Ack less connection (indication primitive only)" is used.

The following explains a flow of data and parameter(s) among the respective communication layers in the connection sequence (FIG. 45) according to the present embodiment (response is not sent).

In the transmitter, as shown in FIG. 52, the data to be transmitted to the receiver and the data of QoS-1 (QoS requested by the transmitter) are propagated through upper to lower layers by con.req (data) (FIG. 45).

Then, the LAP (P) of the transmitter stores the QoS-1 as QoS-3. Further, as shown in FIG. 56, the LAP (P) passes on the QoS-3 to the upper layers by con.conf. The communication layers each stores the QoS-3 and keeps it as connection parameter(s) for the established connection.

Meanwhile, in the receiver, only data of QoS-2 (QoS requested by the receiver) is propagated from upper to lower layers by the con.req, as shown in FIG. 53.

Thereafter, in the receiver, the QoS-1 of the transmitter is determined as QoS-3 at the time of receiving a SNRM command in the LAP (S). Note that, when the combination of the parameter(s) of QoS-2 and the QoS-1 is not adequate, the SNRM command cannot be received.

Then, as shown in FIG. 54, the LAP (S) passes on the QoS-3 and the data from the transmitter, to the upper layers by con.ind (data). The upper layers each stores the QoS-3 and keeps it as connection parameter(s) to establish connection.

In this manner, QoS-1 and QoS-2 are controlled by the application in the upper layer (application), thereby selecting whether or not a response is to be sent.

The selection as to whether or not a response is to be sent is carried out according to, e.g., a type of file to be transmitted, application, user's demand, or the like.

Specifically, for example, consider a case where the selection is carried out according to a type of file. In the case of multimedia-related file, it is possible to select whether or not a response is to be sent. In the case of data that the user would like to confirm its reception such as a file of a telephone book, mail, schedule, or the like, it is automatically selected that a response is to be sent. Further, consider a case where the selection is carried out according to application. In the case of a slide show, it is automatically selected that no response is to be sent, for example. Further, consider a case where the selection is carried out according to user's demand. In this case, the user selects, from a displayed menu, whether or not a response is to be sent, for example.

Figure 57:
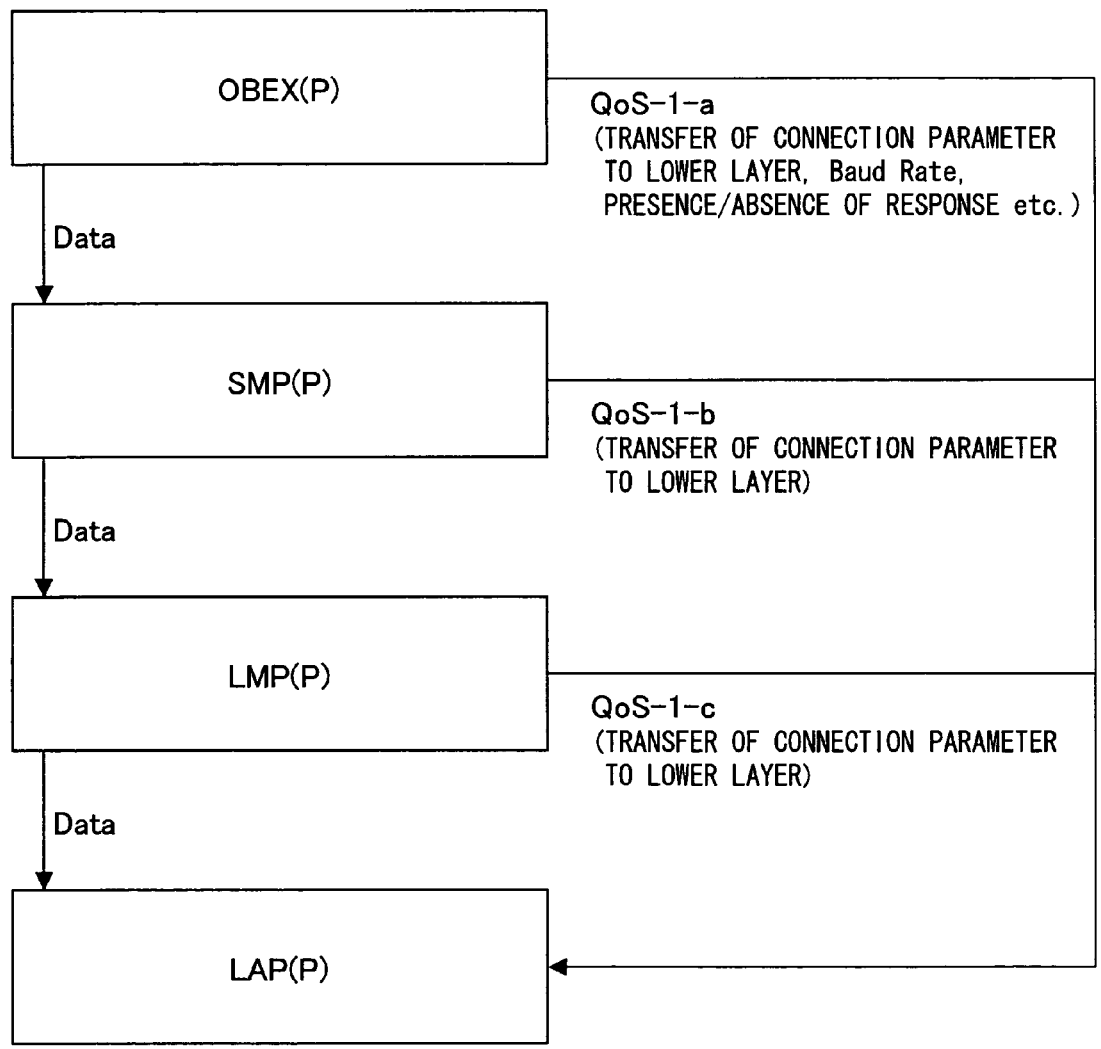
FIG. 57 is a diagram schematically illustrating a modified example of the embodiment, i.e., illustrating how data of a connection notification function and a connection parameter are propagated in the primary station in cases where the connection parameter is shared by the layers.
Figure 58:
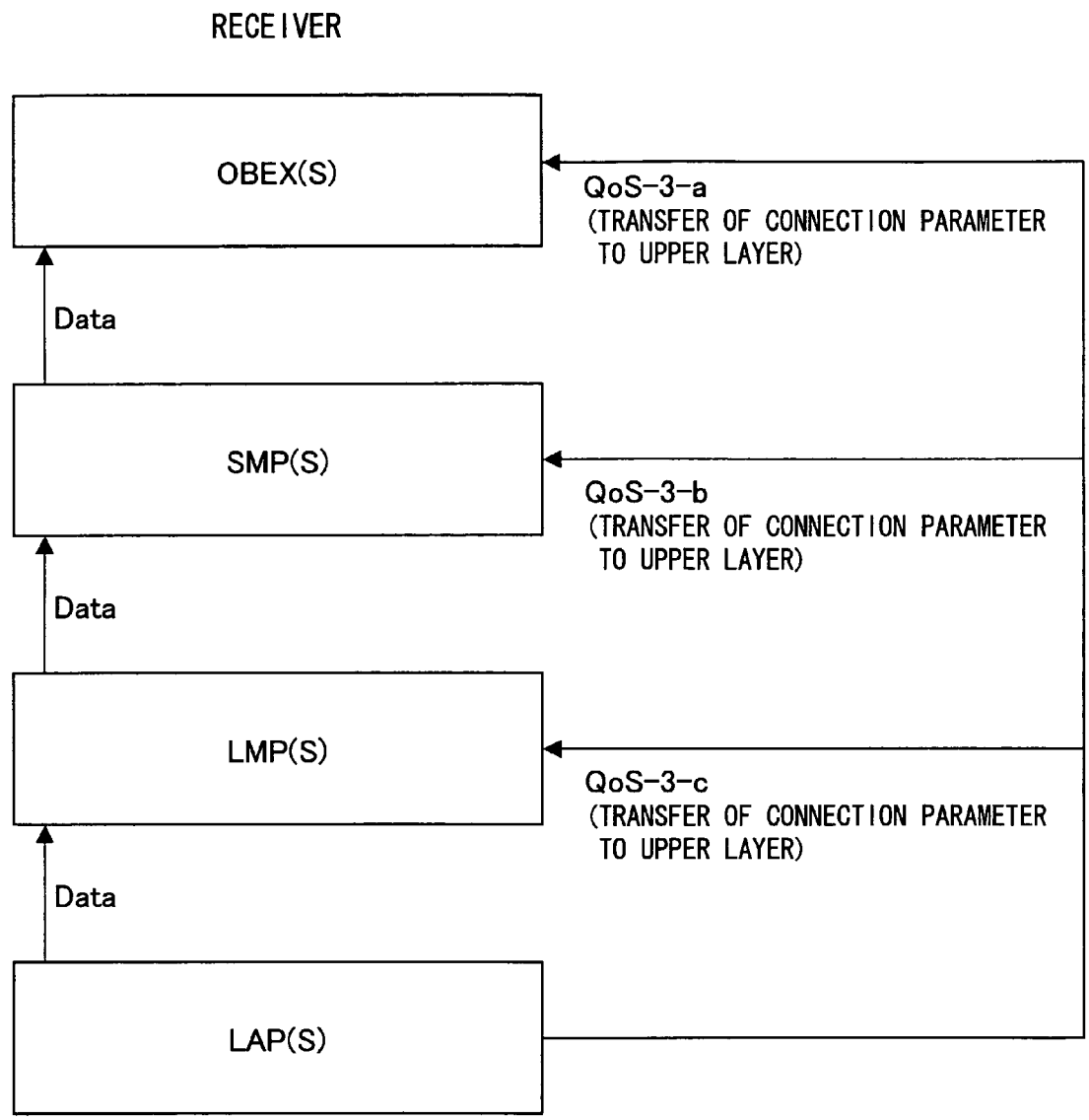
FIG. 58 is a diagram schematically illustrating a modified example of the embodiment, i.e., illustrating how data of a connection notification function and a connection parameter are transferred in the secondary station in cases where the connection parameter is shared by the layers.

FIGS. 57 through 59 are explanatory diagrams showing an alternative of flow of data and parameter(s) among the respective communication layers in a connection sequence according to the present embodiment.

In the transmitter, when the first SNRM command includes information of all the communication layers (FIG. 43), the data and parameter(s) may be directly transmitted to the LAP layer from each communication layer, instead of passing those on among the communication layers (FIG. 52). This direct transmission to the LAP layer is shown in FIG. 57.

On the other hand, as shown in FIG. 58, the receiver may be arranged so that all of the data and the parameter(s) contained in the SNRM command are extracted, and are transmitted directly from the LAP layer to the respective corresponding communication layers.

Further, as shown in FIG. 59, the transmitter may be arranged so that the data and parameter(s) for the OBEX (P), the SMP (P), and the LMP (P) are unified in the LMP (P), and the parameter(s) of the LAP (P) is added to the unified data and parameter(s), thereby generating a SNRM command.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

Note that examples of each of the client device and the server device in each of the aforementioned embodiments include a mobile phone, a PDA (Personal Digital Assistants), a digital camera, a personal computer, and the like.

Further, each block of the client device and the server device in each of the aforementioned embodiment may be constituted by a hardware logic (communication circuit), or may be realized by a software with the use of a calculation processing device such as a CPU as follows. That is, each of the client device and the server device includes: (i) a CPU (central processing unit) for executing an instruction of a control communication program described to realize each function in a computer; (ii) a ROM (read only memory) for storing the program; (iii) a RAM (random access memory) for expanding the program; (iv) a memory device (recording medium) such as a memory for storing the program and various types of data; and the like.

Therefore, the object of the present invention is achieved by: (i) providing, in each of the client device and the server device, a storage medium in which a computer-readable program code (executable program, intermediate code program, a source program) of the communication program, i.e., software for realizing the function, and (ii) causing the computer (or CPU, MPU (micro processing unit)) to read out and execute the program code stored in the storage medium.

Examples of the storage medium include: tapes such as a magnetic tape and a cassette tape; magnetic disks such as a Floppy® disk and a hard disk; optical disks such as a CD-ROM (compact disk read only memory), a magnetic optical disk (MO), a mini disk (MD), a digital video disk (DVD), and a CD-R (CD-Rewritable); and the like. Further, the storage medium may be: a card such as an IC card (including a memory card) and an optical card; or a semiconductor memory such as a mask ROM, an EPROM (electrically programmable read only memory), an EEPROM (electrically erasable programmable read only memory), or a flash ROM.

Further, the program code may be supplied to each of the client device and the server device via a communication network to which each of the client device and the server device is connectable. The communication network is not particularly limited. Specific examples thereof are: the Internet, intranet, extranet, LAN (local area network), ISDN (integrated services digital network), VAN (value added network), CATV (cable TV) communication network, virtual private network, telephone network, mobile communication network, satellite communication network, and the like. Further, the present invention can be realized by a series of data signals which represent the aforesaid program code, and which are electrically transmitted, and which are embedded in a carrier wave.

As described above, a communication device, according to the present invention, which serves as a primary station having an object exchange layer for issuing a request command and receiving a response command for the request command so as to transmit an object to an object exchange layer of a secondary station, the communication device, including: an object exchange layer processing section for processing a communication protocol of the object exchange layer; and a lower layer processing section for processing a communication protocol of a lower layer positioned below the object exchange layer, the lower layer processing section, including: a response generating section for generating a pseudo response command practically serving as the response command from the secondary station, and for notifying the pseudo response command to the object exchange layer processing section; and a lower layer control section for controlling, upon reception of a request command generation notification from the object exchange layer processing section, the request generating section such that the request generating section generates the pseudo response command for the request command and notifies the pseudo response command to the object exchange layer processing section.

Further, a communication method, according to the present invention, adopted in a primary station having an object exchange layer for issuing a request command and receiving a response command for the request command so as to transmit an object to an object exchange layer of a secondary station, the method, including the step of: a lower layer below the object exchange layer, (i) generating, upon reception of a request command generation notification from the object exchange layer, a pseudo response command practically serving as the response command from the secondary station and (ii) notifying the pseudo response command to the object exchange layer.

According to the structure and the method, the lower layer below the object exchange layer in the primary station (e.g., client device) generates the pseudo response command and notifies the generated pseudo response command to the object exchange layer.

This makes it possible for the primary station to exchange an object with a secondary station (e.g., server device) having no transmitting function but having a minimally required receiving function, even though the communication protocol for object exchange using a request command and a response command is not changed. Further, because the communication protocol (object exchange use protocol) of the object exchange layer does not need to be changed to attain the transmission and the reception between the first and secondary stations as such, existing resources can be still used.

The communication device according to the present invention may be arranged such that: the lower layer processing section further includes a timer, which is activated upon reception of the request command generation notification from the object exchange layer processing section and which measures time from the activation, and when no response command is received from the secondary station even though a predetermined time has passed since the timer started the measurement, the lower layer control section controls the response generating section such that the response generating section generates the pseudo response command and notifies the pseudo response command to the object exchange processing section.

The above structure makes it possible that: in cases where no response command is received from the secondary station during a period of the predetermined time, the primary station judges that the secondary station does not have a function of transmitting a response command, and generates the pseudo response command, and notifies the generated pseudo response command to the object exchange layer.

Thus, the primary station exchanges an object with a secondary station having the transmitting function, in the conventional manner with the use of the request command and the response command. On the other hand, the primary station exchanges an object with a secondary station having no transmitting function, with the use of the pseudo response command generated in the lower layer.

Further, the communication device according to the present invention may be arranged such that: the lower layer control section of the lower layer processing section determines, according to a type of request command issued by the object exchange layer processing section, whether (i) the response command is to be received from the secondary station and is to be notified to the object exchange layer processing section, or (ii) the pseudo response command is to be generated by the response generating section and is to be notified to the object exchange layer processing section.

According to the above structure, it is possible to determine, according to a type of request command, whether the primary station will wait for the request command to come from the secondary station or the pseudo response command will be generated. With this, for example, the primary station receives a minimally required response command such as a response command for a connection request, a disconnection request, or a final data transfer request, but the primary station does not carry out any process of receiving response commands for data transfer requests other than the final data transfer request.

As such, the primary station is so arranged as to receive such minimally required response commands from the secondary station, so that reliability of the communication is secured but the communication process is simplified. This reduces scales of program and circuit of the communication device.

Further, the communication device according to the present invention may be arranged such that: the lower layer processing section further includes a header information analyzing section for analyzing header information of the request command issued by the object exchange layer processing section, and the lower layer control section of the lower layer processing section determines, according to a type of header information analyzed by the header information analyzing section, whether (i) the response command is to be received from the secondary station and is to be notified to the object exchange layer processing section, or (ii) the pseudo response command is to be generated by the response generating section and is to be notified to the object exchange layer processing section.

According to the above structure, it is possible to determine, according to a type of header information of the request command, whether the primary station will wait for the request command to come from the secondary station or the pseudo response command will be generated. With this, for example, the primary station receives a minimally required response command such as a response command for a connection request, a disconnection request, or a final data transfer request, but the primary station does not carry out any process of receiving response commands for data transfer requests other than the final data transfer request.

As such, the primary station is so arranged as to receive such minimally required response commands from the secondary station, so that reliability of the communication is secured but the communication process is simplified. This reduces scales of program and circuit of the communication device.

Further, a communication system according to the present invention includes: the communication device serving as the primary station; and a communication device serving as a secondary station that receives an object from the communication device. Further, the communication system according to the present invention may be arranged such that: the communication device serving as the secondary station does not transmit a response command.

According to the above communication system, even when the secondary station is incapable of transmitting a response command, the pseudo response command is generated and is notified to the object exchange layer in the primary station. As such, the conventional communication protocol for object exchange using a request command and a response command is not changed, but it is possible to exchange an object with a secondary station having no transmitting function but having a minimally required receiving function.

Further, a communication device, according to the present invention, which serves as a secondary station having an object exchange layer for receiving a request command from a primary station and issuing a response command for the request command so as to receive an object from an object exchange layer of the primary station, the communication device, including: an object exchange layer processing section for processing a communication protocol of the object exchange layer; and a lower layer processing section for processing a communication protocol of a lower layer positioned below the object exchange layer processing section, when the lower layer processing section receives the response command issued by the object exchange processing section, the lower layer processing section operating such that the response command is not to be transmitted to the primary station.

Further, a communication method, according the present invention, adopted in a secondary station having an object exchange layer for receiving a request command from a primary station and issuing a response command for the request command so as to receive an object from an object exchange layer of the primary station, the method, including the step of: a lower layer below the object exchange layer, operating, upon reception of the request command issued by the object exchange layer, such that the response command is not to be transmitted to the primary station.

According to the structure and the method, even when the object exchange layer of the secondary station issues an unnecessary response command, the unnecessary response command is not transmitted from the secondary station. For example, in cases where the object exchange layer of the secondary station (e.g., server device) is so configured as to always send a response command in reply to a request command but where the request command from the primary station (e.g., client device) does not require any response command, the lower layer of the secondary station never transmits the response command generated by the object exchange layer.

This makes it possible to reduce electric power required for the transmission of the response command from the secondary station. Further, if such a response command that the primary station does not require is transmitted, the response command is likely to collide with a next request command from the primary station. Thus, the method and the structure allow prevention of such collision.

Further, the communication device according to the present invention may be arranged such that: the lower processing section includes a response analyzing section for analyzing the response command issued by the object exchange layer processing section; and a lower layer control section for determining, according to a type of response command analyzed by the response analyzing section, whether or not the response command is to be transmitted to the primary station.

The structure above allows the lower layer to judge, according to a type of response command, whether or not the response command issued by the object exchange layer is to be transmitted.

Accordingly, for example, in cases where the communication protocol of the object exchange layer is OBEX (OBject EXchange protocol), the communication protocol of the object exchange layer is not modified but a process for not transmitting a CONTINUE response command in reply to a non-final PUT command can be carried out.

Further, the communication device according to the present invention may be arranged such that: the lower layer processing section includes a header information analyzing section for analyzing header information of the response command issued by the object exchange layer processing section; and a lower layer control section determines, according to a type of header information analyzed by the header information analyzing section, whether or not the response command is to be transmitted to the primary station.

The structure above allows the lower layer to judge, according to a type of header information of the response command issued by the object exchange layer, whether or not the response command is to be transmitted.

Accordingly, for example, in cases where the communication protocol of the object exchange layer is OBEX (OBject EXchange protocol), the communication protocol of the object exchange layer is not modified but a process for not transmitting a CONTINUE response command in reply to a non-final PUT command can be carried out.

Further, a communication system according to the present invention includes: the communication device serving as the secondary station; and a communication device serving as a primary station that transmits an object to the communication device.

According to the communication system, when the request command from the primary station requires no response command, the lower layer never transmits the response command issued by the object exchange layer of the secondary station.

As such, the conventional communication protocol for object exchange using the request command and the response command is not changed, but it is possible to exchange an object with a primary station which only receives a minimally required response command.

Further, the communication device according to the present invention may be arranged such that: the communication protocol of the object exchange layer is OBEX (OBject EXchange protocol).

The above structure makes it possible to exchange an object with a device having no transmitting function, even though the OBEX standard, which is widely used in IrDA and Bluetooth®, is not modified.

Note that the communication device may be realized by a computer. In this case, the present invention encompasses (i) a communication program of the communication device, which program realizes the communication device by causing a computer to operate as the sections of the communication device, and (ii) a computer-readable recording medium storing the communication program.

Further, the communication device may be realized by a communication circuit functioning as the sections of the communication device.

Further, the communication device is suitable for a mobile phone that carries out communication with the use of the communication device. According to such a mobile phone, communication can be carried out with high transfer efficiency by using the object exchange protocol (inclusive of OBEX).

Further, the communication device is suitable for a display device that carries out display in accordance with data received by the communication device. According to such a display device, communication can be carried out with high transfer efficiency by using the object exchange protocol (inclusive of OBEX).

Further, the communication device is suitable for a printing device for carrying out printing in accordance with data received by the communication device. According to such a printing device, communication can be carried out with high transfer efficiency by using the object exchange protocol (inclusive of OBEX).

Further, the communication device is suitable for a recording device storing data received by the communication device. According to such a recording device, communication can be carried out with high transfer efficiency by using the object exchange protocol (inclusive of OBEX).

Finally, the communication device of the present invention may be arranged as follows.

(1. A Communication Method by which a Pseudo Response is Made Below OBEX)

A communication method according to the present invention is a communication method for carrying out communication using communication protocols constituting a hierarchical structure at least including an object exchange use protocol for object exchange, which is carried out such that a command request making side device transmits a request command to a responding side device and the responding side device transmits a response command to the command request making side in reply, wherein: a layer below a layer using the object exchange use protocol generates, upon reception of the request command from the layer using the object exchange use protocol, a pseudo response command equivalent to the response command that is in compliant with the object exchange use protocol and that is supposed to be sent in reply to the request command, and the layer below the layer using the object exchange use protocol notifies the pseudo response protocol to the layer using the object exchange use protocol.

(2. A Communication Device in which a Pseudo Response is Made Below OBEX)

A communication device according to the present invention includes: (i) an object exchange layer processing section for carrying out object exchange such that a command request making side device transmits a request command to a responding side device and the responding side device transmits a response command to the command request making side in reply; and (ii) a lower layer processing section, which is positioned below the object exchange layer processing section and which is used for communication, the lower layer processing section including (a) a response generating section for generating a pseudo response command equivalent to the response command and notifying the pseudo response command to the object exchange layer processing section, and (b) a lower layer control section for controlling, upon reception of a request command generation notification from the object exchange layer processing section, the response generating section such that the response generating section generates the pseudo response command and notify the pseudo response command to the object exchange layer processing section.

According to the method and the structure, in the client device, the pseudo response command is generated and is notified to either (i) the layer using the object exchange use protocol or (ii) the object exchange layer processing section.

With this, even though the protocol for object exchange using the request command and the response command is not modified, it is possible to exchange an object with a server device having no transmitting function but having a minimally required receiving function. Further, in the above structure and method, the object exchange use protocol does not need to be modified, so that existing resources can be still used.

(3. A Communication Method by which a Pseudo Response is Made Below OBEX (Timer-Control))

Further, another communication method according to the present invention is a communication method for carrying out communication using communication protocols constituting a hierarchical structure at least including an object exchange use protocol for object exchange, which is carried out such that a command request making side device transmits a request command to a responding side device and the responding side device transmits a response command to the command request making side in reply, wherein: in cases where a predetermined time has been passed since the request command was issued but where no response command is received from the target device, a layer below a layer using the object exchange use protocol generates a pseudo response command equivalent to the request command complying with the object exchange use protocol, and notifies the pseudo response command to the layer using the object exchange use protocol.

(4. A Communication Device in which a Pseudo Response Command is Made Below OBEX (Timer-Control))

Another communication device according to the present invention includes: (i) an object exchange layer processing section for carrying out object exchange such that a client device serving as a command request side transmits a request command to a server device serving as a responding side and the server device transmits a response command to the client device in reply; and (ii) a lower layer processing section, which is positioned below the object exchange layer processing section and which is used for communication, the lower layer processing section, including (a) a response generating section for generating a pseudo response command equivalent to the response command and notifying the pseudo response command to the object exchange layer processing section; (b) a timer, which is activated upon reception of a request command generation notification from the object exchange layer processing section; and (c) a lower layer control section for controlling the response generating section such that the response generating section generates the pseudo response command and notifies the pseudo response command to the object exchange layer processing section, when no response command is received from the server device even though a predetermined time has been passed since the timer started the measurement.

According to the above method and structure, in communication with a device having a transmitting function, the conventional object exchange using the request command and the response command can be carried out. In the meanwhile, in communication with a device having no transmitting function, object exchange can be carried out by generating the pseudo response command in the lower layer and notifying the pseudo response command to either (i) the layer using the object exchange use protocol or (ii) the object exchange layer processing section.

(5. A Communication Method by which a Pseudo Response Command is Made Below OBEX (Type of Command))

Further, another communication method according to the present invention is a communication method for carrying out communication using communication protocols constituting a hierarchical structure at least including an object exchange use protocol for object exchange, which is carried out such that a command request making side device transmits a request command to a responding side device and the responding side device transmits a response command to the command request making side in reply, wherein: a layer below a layer using the object exchange use protocol determines, according to a type of request command issued from the layer using the object exchange use protocol, whether (i) the response is to be received from the responding side device in reply to the request command or (ii) a pseudo response command equivalent to the response command is to be generated so as to comply with the object exchange use protocol and is to be notified to the layer using the object exchange use protocol.

(6. A Communication Device in which a Pseudo Response Command is Made Below OBEX (Type of Command))

Another communication device according to the present invention includes: (i) an object exchange layer processing section for carrying out object exchange such that a client device serving as a command request side transmits a request command to a server device serving as a responding side and the server device transmits a response command to the client device in reply; and (ii) a lower layer processing section, which is positioned below the object exchange layer processing section and which is used for communication, the lower layer processing section, including (a) a response generating section for generating a pseudo response command equivalent to the response command and notifying the pseudo response command to the object exchange layer processing section; (b) a lower layer control section for determining, according to a type of request command issued from the layer using the object exchange use protocol, whether (i) the response is to be received from the server device in reply to the request command or (ii) the pseudo response command equivalent to the response command is to be generated by the response generating section so as to comply with the object exchange use protocol and is to be notified to the object exchange layer processing section.

According to the above method and structure, a minimally required response command such as a response command for a connection request, a disconnection request, or a final data transfer request is received from the server device, so that reliability of the communication is secured. Further, processes of receiving response commands for data transfer requests other than the final data transfer request do not need to be carried out, so that a circuit scale can be reduced.

(7. A Communication Method by which a Pseudo Response is Made Below OBEX (Reference to OBEX Header))

Further, another communication method according to the present invention is a communication method for carrying out communication using communication protocols constituting a hierarchical structure at least including an object exchange use protocol for object exchange, which is carried out such that a command request making side device transmits a request command to a responding side device and the responding side device transmits a response command to the command request making side in reply, wherein: a layer below a layer using the object exchange use protocol makes reference to header information of the request command issued from the object exchange use protocol, so as to determine, according to a type of header information, whether (i) the response command is to be received from the responding side device in reply to the request command or (ii) a pseudo response command equivalent to the response command is to be generated so as to comply with the object exchange use protocol and is to be notified to the layer using the object exchange use protocol.

(8. A Communication Device in which a Pseudo Response is Made Below OBEX (Reference to OBEX Header))

Another communication device according to the present invention includes: (i) an object exchange layer processing section for carrying out object exchange such that a client device serving as a command request side transmits a request command to a server device serving as a responding side device and the server device transmits a response command to the client device in reply; and (ii) a lower layer processing section, which is positioned below the object exchange layer processing section and which is used for communication, the lower layer processing section, including (a) a response generating section for generating a pseudo response command equivalent to the response command and notifying the pseudo response command to the object exchange layer processing section; (b) a header information analyzing section for analyzing header information of the request command issued from the object exchange use protocol; and (c) a lower layer control section for determining, according to a type of header information analyzed by the header information analyzing section, whether (i) the response command is to be received from the server device in reply to the request command or (ii) the pseudo response command equivalent to the response command is to be generated by the response generating section and is to be notified to the object exchange layer processing section.

According to the above method and structure, a minimally required response command such as a response command for a connection request, a disconnection request, or a final data transfer request is received from the server device, so that reliability of the communication is secured. Further, processes of receiving response commands for data transfer requests other than the final data transfer request do not need to be carried out, so that a circuit scale can be reduced.

(9. A Communication Method by which a Response from OBEX is Prevented by the Layer Below OBEX from being Propagated into Lower Layers)

Further, another communication method according to the present invention is a communication method for carrying out communication using communication protocols constituting a hierarchical structure at least including an object exchange use protocol for object exchange, which is carried out such that a command request making side device transmits a request command to a responding side device and the responding side device transmits a response command to the command request making side device in reply, wherein: when receiving the response command from a layer using the object exchange use protocol, a layer below the layer using the object exchange use protocol does not transmit the response command thus received.

(10. A Communication Device in which a Response from OBEX is Prevented by the Layer Below OBEX from being Propagated into Lower Layers)

Another communication device according to the present invention includes: (i) an object exchange layer processing section for carrying out object exchange such that a client device serving as a command request side transmits a request command to a server device serving as a responding side device and the server device transmits a response command to the client device in reply; and (ii) a lower layer processing section, which is positioned below the object exchange layer processing section and which is used for communication, when the lower layer processing section receives the response command issued from the object exchange layer processing section, the lower layer processing section preventing the response command from being transmitted to the client device.

According to the above method and structure, no response command is transmitted to the client device in reply to a request command that is transmitted from the client device and that never requires the transmission of the response command, even in cases where, e.g., the transmission is requested by the object exchange protocol control section of the server device adopting such an object exchange protocol that a response command is always sent in reply to a request command. This allows reduction of electric power required for such transmission. Further, if the server device transmits the response command even though the client device does not require the response command, the response command from the server device is likely to collide with a next request command from the client device. Therefore, the method and structure allow prevention of such collision.

(11. A Communication Method by which a Response from OBEX is Prevented by the Layer Below OBEX from being Propagated into Lower Layers (Type of Command))

Further, another communication method according to the present invention is a communication method for carrying out communication using communication protocols constituting a hierarchical structure at least including an object exchange use protocol for object exchange, which is carried out such that a command request making side device transmits a request command to a responding side device and the responding side device transmits a response command to the command request making side device in reply, wherein: a layer below a layer using the object exchange use protocol determines, according to a type of response command issued from the layer using the object exchange use protocol, whether or not the response command is to be transmitted to the request making side device.

(12. A Communication Device in which a Response From OBEX is Prevented by the Layer Below OBEX from being Propagated into Lower Layers (Type of Command))

Another communication device according to the present invention includes: (i) an object exchange layer processing section for carrying out object exchange such that a client device serving as a command request side transmits a request command to a server device serving as a responding side device and the server device transmits a response command to the client device in reply; and (ii) a lower layer processing section, which is positioned below the object exchange layer processing section and which is used for communication, the lower layer processing section, including (a) a response analyzing section for analyzing the response command issued from the object exchange layer processing section, and (b) a lower layer control section for determining, according to a type of response command analyzed by the response analyzing section, whether or not the response command is to be transmitted to other device.

According to the above method and structure, it is possible for the lower layer to judge, according to a type of response command issued from the layer using the object exchange protocol, whether or not the response command is to be transmitted. This makes it possible that, e.g., the CONTINUE response commands for the non-final PUT commands are never transmitted, even though the OBEX layer, the upper layer, is not modified.

(13. A Communication Method by which a Response from OBEX is Prevented by the Layer Below OBEX from being Propagated into Lower Layers (Reference to OBEX Header))

Further, another communication method according to the present invention is a communication method for carrying out communication using communication protocols constituting a hierarchical structure at least including an object exchange use protocol for object exchange, which is carried out such that a command request making side device transmits a request command to a responding side device and the responding side device transmits a response command to the command request making side device in reply, wherein: a layer below a layer using the object exchange use protocol makes reference to header information of the response command issued from the layer using the object exchange use protocol, and determines, according to a type of header, whether or not the response command is to be transmitted to the request making side device.

(14. A Communication Device in which a Response from OBEX is Prevented by the Layer Below OBEX from being Propagated into Lower Layers (Reference to OBEX Header))

Another communication device according to the present invention includes: (i) an object exchange layer processing section for carrying out object exchange such that a client device serving as a command request side transmits a request command to a server device serving as a responding side device and the server device transmits a response command to the client device in reply; and (ii) a lower layer processing section, which is positioned below the object exchange layer processing section and which is used for communication, the lower layer processing section, including (a) a header information analyzing section for analyzing header information of the response command received and issued from the object exchange layer processing section, and (b) a lower layer control section for determining, according to a type of response command's header information analyzed by the response analyzing section, whether or not the response command is to be transmitted to other device.

According to the above method and structure, it is possible for the lower layer to judge, according to a type of response command issued from the layer using the object exchange protocol, whether or not the response command is to be transmitted. This makes it possible that, e.g., the CONTINUE response commands for the non-final PUT commands are never transmitted, even though the OBEX layer, the upper layer, is not modified.

(15. A Communication Method by which No Response Needs to be Transmitted from the OBEX Layer)

Further, another communication method according to the present invention is a communication method for transmitting an object to a station by using an object exchange use protocol, OBEX (OBject EXchange protocol), wherein: OBEX commands are transmitted one after another even though no OBEX responses are received.

(16. A Communication Method by which No Response Needs to be Transmitted During One-Way Transmission)

The above communication method according to the present invention may be arranged such that: (i) two-way communication in which an OBEX response from the station is required especially after the transmission of each of the OBEX commands and (ii) one-way communication in which no OBEX response does not need to be received from the station are switched therebetween, and while the one-way communication is selected, the OBEX commands are transmitted one after another even though no OBEX responses are received.

(17. A Communication Device in which No Response Needs to be Transmitted from the OBEX Layer)

Another communication device according to the present invention includes an OBEX layer processing section that is able to transmit an object to a station by using an object exchange use protocol, OBEX (OBject EXchange protocol), wherein: OBEX commands are transmitted one after another even though no OBEX responses are received.

(18. A Communication Device in which No Response Needs to be Transmitted During One-Way Communication)

The above communication device according to the present invention further includes a communication method switching section for switching between (i) two-way communication in which an OBEX response from the station is required especially after the transmission of each of the OBEX commands and (ii) one-way communication in which no OBEX response does not need to be received from the station, wherein: while the communication method switching section selects the one-way communication, the OBEX commands are generated and transmitted one after another even though no OBEX responses are received from the other station.

According to the above method and structure, even in cases where, e.g., the client device cannot receive a response command from the server in reply to a request command sent from the client device in the one-way communication using OBEX, object transmission using OBEX can be carried out. Further, the two-way communication can be carried out such that a response from the server is confirmed, whereas the one-way communication can be carried out without any response therefrom. As such, the two-way communication and the one-way communication are realized with the same OBEX protocol.

(19. A Communication Method by which No Response Needs to be Transmitted in Reply to a Non-Final PUT Command)

Another communication method according to the present invention is a communication method for transmitting an object to a station by using an object exchange use protocol, OBEX (OBject EXchange protocol), wherein: non-final PUT commands complying with OBEX are transmitted one after another even though no OBEX responses are received from the station.

(20. A Communication Device in which No Response Command Needs to be Transmitted in Reply to a Non-Final PUT Command)

Another communication device according to the present invention includes an OBEX layer processing section that is able to transmit an object to a station by using an object exchange use protocol, OBEX (OBject EXchange protocol), wherein: only after generating and transmitting a non-final PUT command complying with OBEX, the OBEX layer processing section generates and transmits either a next non-final PUT command complying with OBEX or a final PUT command even though no OBEX response is received from the station.

The above method and structure make it possible to realize object exchange in which CONTINUE response commands for the aforementioned PUT commands are not required.

(21. A Communication Method in which No Response is Transmitted from the OBEX Layer)

Another communication method according to the present invention is a communication method for receiving an object from a station by using an object exchange use protocol, OBEX (OBject EXchange protocol), wherein: no OBEX response is always transmitted in reply to an OBEX command sent from the station.

(22. A Communication Method by which No Response is Transmitted from the OBEX Layer During One-Way Reception)

Further, the above communication method according to the present invention may be arranged such that: (i) two-way communication in which an OBEX response from the station is required especially after the transmission of each of the OBEX commands and (ii) one-way communication in which no OBEX response does not need to be received from the station are switched therebetween, and while the one-way communication is selected, the OBEX response is not always transmitted in response to the reception of the OBEX command.

(23. A Communication Device in which No Response is Transmitted from the OBEX Layer)

Further, another communication device according to the present invention includes an OBEX layer processing section that is able to receive an object from a station by using an object exchange use protocol, OBEX (OBject EXchange protocol), wherein: the OBEX layer processing section does not always transmit an OBEX response upon reception of an OBEX command.

(24. A Communication Device in which No Response is Transmitted from the OBEX Layer During One-Way Reception)

The above communication device according to the present invention further includes a communication method switching section for switching between (i) two-way communication in which an OBEX response from the station is required especially after reception of the OBEX command and (ii) one-way communication in which no OBEX response does not need to be received from the station, wherein: while the communication method switching section selects the one-way communication, the OBEX response is not always transmitted to the station in response to the reception of the OBEX command.

According to the above method and structure, for example, in the one-way communication using OBEX, in cases where the client device does not require the server device to transmit a response command in reply to a request command from the client device, it is possible to carry out such control that unnecessary response commands are not generated and transmitted. Further, in the two-way communication, the response command is transmitted to the client device, so that the client device can check the communication. On the other hand, in the one-way communication, no unnecessary response command is generated and transmitted to the client device. As such, the two-way communication and the one-way communication can be realized with the same OBEX protocol.

(25. A Communication Method by which a Response is not Made to a Non-Final PUT Command)

Further, another communication method according to the present invention is a communication method for receiving an object from a station by using an object exchange use protocol, OBEX (OBject EXchange protocol), wherein: no OBEX responses are transmitted in reply to non-final PUT commands each complying with OBEX, and an OBEX response is transmitted in reply to a final PUT command.

(26. A Communication Device in which No Response is Made to a Non-Final PUT Command)

Further, another communication device according to the present invention includes an OBEX layer processing section that is able to receive an object from a station by using an object exchange use protocol, OBEX (OBject EXchange protocol), wherein: the OBEX layer processing section does not transmit an OBEX response in reply to a non-final PUT command complying with OBEX, but generates and transmits an OBEX response in reply to a final PUT command.

According to the above method and structure, it is possible to carry out such control that only CONTINUE response commands for non-final PUT commands each transmitted from the client device are not generated and transmitted. This improves efficiency of communication band.

(27. A Communication Method in which the Object Exchange Use Protocol is OBEX)

Further, the above communication method may be arranged such that the object exchange use protocol is OBEX. According to the method, it is possible to exchange an object with a device having no transmitting function, even though the OBEX standard, widely adopted as an object exchange use protocol in IrDA and Bluetooth®, is not modified.

(28. Communication Program)

A communication program according to the present invention is a program for causing a computer to perform the steps, which are carried out in accordance with the communication protocols and which are described in any one of aforementioned communication methods. According to the communication program, the above communication methods can be realized by causing the computer to perform the steps carried out in accordance with the communication protocols and described in the aforementioned communication methods.

(29. Recording Medium)

A recording medium of the present invention is computer-readable and stores the above communication program. According to the structure, the communication program is read out from the recording medium, and realizes the communication method by the computer.

(30. Communication System)

A communication system according to the present invention is a communication system for exchanging objects between a client device and a server device, wherein: the server device is not able to transmit a response and the client device is any one of communication devices described above.

According to the communication system, even though the server device cannot transmit any response, the client device generates the pseudo response command and notifies the pseudo response command to the object exchange layer processing section, so that the conventional communication protocol for object exchange using the request command and the response command does not need to be modified but it is possible to carry out object exchange with a server device having no transmitting function but having a minimally required receiving function.

(31. Mobile Phone)

A mobile phone serving as a communication device according to the present invention is a mobile phone realizing any communication described above. According to such a mobile phone, it is possible to carry out either the one-way communication or high transfer efficiency communication by using the object exchange protocol (inclusive of OBEX).

(32. Display Device)

A display device serving as a communication device according to the present invention is a display device realizing any communication described above. According to such a display device, it is possible to carry out either the one-way communication or high transfer efficiency communication by using the object exchange protocol (inclusive of OBEX).

(33. Printing Device)

A printing device serving as a communication device according to the present invention is a printing device realizing any communication described above. According to such a printing device, it is possible to carry out either the one-way communication or high transfer efficiency communication by using the object exchange protocol (inclusive of OBEX).

(34. Recording Device)

A recording device serving as a communication device according to the present invention is a recording device realizing any communication described above. According to such a recording device, it is possible to carry out either the one-way communication or high transfer efficiency communication by using the object exchange protocol (inclusive of OBEX).

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

A communication device, a communication system, a communication method, a communication program, and a communication circuit of the present invention allow object exchange with a device (secondary station) having no transmitting function, even though a protocol for use in object exchange is not modified. Therefore, the present invention is widely applicable to communication using, e.g., a mobile phone, a PDA, a personal computer, and the like. Especially, the present invention is suitable for communication adopting a protocol for use in object exchange in which a client device transmits a request command to a server device and the server device transmits a response command to the client device in reply. A specific example of such communication is (i) infrared communication complying with IrDA, or (ii) wireless communication complying with Bluetooth®.

The invention claimed is:

1. A communication device, which serves as a primary station having an object exchange layer for issuing a request command and receiving a response command for the request command so as to transmit an object to an object exchange layer of a secondary station,
said communication device, comprising:
an object exchange layer processing section for processing a communication protocol of the object exchange layer of the primary station; and
a lower layer processing section for processing a communication protocol of a lower layer positioned below the object exchange layer of the primary station,
the lower layer processing section, including:
a response generating section for generating a pseudo response command indicating a CONTINUE command or a SUCCESS command, the pseudo response command practically serving as the response command from the secondary station, and for notifying the pseudo response command to the object exchange layer processing section; and
a lower layer control section for controlling, upon reception of a request command generation notification from the object exchange layer processing section, the request generating section such that the request generating section generates the pseudo response command for the request command and notifies the pseudo response command to the object exchange layer processing section.

2. A communication device, which serves as a primary station having an object exchange layer for issuing a request command and receiving a response command for the request command so as to transmit an object to an object exchange layer of a secondary station,
said communication device, comprising:
an object exchange layer processing section for processing a communication protocol of the object exchange layer of the primary station; and
a lower layer processing section for processing a communication protocol of a lower layer positioned below the object exchange layer of the primary station,
the lower layer processing section, including:
a response generating section for generating a pseudo response command practically serving as the response command from the secondary station, and for notifying the pseudo response command to the object exchange layer processing section; and
a lower layer control section for controlling, upon reception of a request command generation notification from the object exchange layer processing section, the request generating section such that the request generating section generates the pseudo response command for the request command and notifies the pseudo response command to the object exchange layer processing section,
wherein:
the lower layer processing section further includes a timer, which is activated upon reception of the request command generation notification from the object exchange layer processing section and which measures time from the activation, and
when no response command is received from the secondary station even though a predetermined time has passed since the timer started the measurement, the lower layer control section controls the response generating section such that the response generating section generates the pseudo response command and notifies the pseudo response command to the object exchange processing section.

3. The communication device as set forth in claim 1, wherein:
the lower layer control section of the lower layer processing section determines, according to a type of request command issued by the object exchange layer processing section, whether (i) the response command is to be received from the secondary station and is to be notified to the object exchange layer processing section, or (ii) the pseudo response command is to be generated by the response generating section and is to be notified to the object exchange layer processing section.

4. A communication device, which serves as a primary station having an object exchange layer for issuing a request command and receiving a response command for the request command so as to transmit an object to an object exchange layer of a secondary station,
said communication device, comprising:
an object exchange layer processing section for processing a communication protocol of the object exchange layer of the primary station; and
a lower layer processing section for processing a communication protocol of a lower layer positioned below the object exchange layer of the primary station,
the lower layer processing section, including:
a response generating section for generating a pseudo response command practically serving as the response command from the secondary station, and for notifying the pseudo response command to the object exchange layer processing section; and
a lower layer control section for controlling, upon reception of a request command generation notification from the object exchange layer processing section, the request generating section such that the request generating section generates the pseudo response command for the request command and notifies the pseudo response command to the object exchange layer processing section,
wherein:

the lower layer processing section further includes a header information analyzing section for analyzing header information of the request command issued by the object exchange layer processing section, and the lower layer control section of the lower layer processing section determines, according to a type of header information analyzed by the header information analyzing section, whether (i) the response command is to be received from the secondary station and is to be notified to the object exchange layer processing section, or (ii) the pseudo response command is to be generated by the response generating section and is to be notified to the object exchange layer processing section.

5. A communication device, which serves as a secondary station having an object exchange layer for receiving a request command from a primary station and issuing a response command for the request command so as to receive an object from an object exchange layer of the primary station, said communication device, comprising:

an object exchange layer processing section for processing a communication protocol of the object exchange layer of the secondary station; and a lower layer processing section for processing a communication protocol of a lower layer positioned below the object exchange layer processing section, when the lower layer processing section receives the response command indicating a CONTINUE command or a SUCCESS command and issued by the object exchange processing section, the lower layer processing section operating such that the response command is not to be transmitted to the primary station.

6. A communication device, which serves as a secondary station having an object exchange layer for receiving a request command from a primary station and issuing a response command for the request command so as to receive an object from an object exchange layer of the primary station, said communication device, comprising:

an object exchange layer processing section for processing a communication protocol of the object exchange layer of the secondary station; and a lower layer processing section for processing a communication protocol of a lower layer positioned below the object exchange layer processing section, when the lower layer processing section receives the response command issued by the object exchange processing section, the lower layer processing section operating such that the response command is not to be transmitted to the primary station, wherein:

the lower processing section includes:

a response analyzing section for analyzing the response command issued by the object exchange layer processing section; and a lower layer control section for determining, according to a type of response command analyzed by the response analyzing section, whether or not the response command is to be transmitted to the primary station.

7. A communication device, which serves as a secondary station having an object exchange layer for receiving a request command from a primary station and issuing a response command for the request command so as to receive an object from an object exchange layer of the primary station, said communication device, comprising:

an object exchange layer processing section for processing a communication protocol of the object exchange layer of the secondary station; and a lower layer processing section for processing a communication protocol of a lower layer positioned below the object exchange layer processing section, when the lower layer processing section receives the response command issued by the object exchange processing section, the lower layer processing section operating such that the response command is not to be transmitted to the primary station, wherein:

the lower layer processing section includes:

a header information analyzing section for analyzing header information of the response command issued by the object exchange layer processing section; and a lower layer control section determines, according to a type of header information analyzed by the header information analyzing section, whether or not the response command is to be transmitted to the primary station.

8. The communication device as set forth in claim 1 or 5, wherein:

the communication protocol of the object exchange layer of the primary station and the secondary station is OBEX (OBject EXchange protocol).

9. A communication system, comprising:

the communication device serving as the primary station, as set forth in claim 1; and a communication device serving as a secondary station that receives an object from the communication device.

10. The communication system as set forth in claim 9, wherein:

the communication device serving as the secondary station does not transmit a response command.

11. A communication system, comprising:

the communication device serving as the secondary station, as set forth in claim 5; and a communication device serving as a primary station that transmits an object to the communication device.

12. A communication program for causing the communication device as set forth in claim 1 or 5 to operate, said communication program causing a computer to function as the respective sections.

13. A communication circuit for causing the communication device as set forth in claim 1 or 5 to operate, said communication circuit functioning as the respective sections.

14. A mobile phone, comprising:

the communication device as set forth in claim 1 or 5, said mobile phone carrying out communication by using the communication device.

15. A display device, comprising:

the communication device as set forth in claim 5, said display device carrying out display in accordance with data received by the communication device.

16. A printing device, comprising:

the communication device as set forth in claim 5, said printing device carrying out printing in accordance with data received by the communication device.

17. A recording device, comprising:

the communication device as set forth in claim 5, said recording device storing data received by the communication device.

* * * * *